(12) United States Patent
Zabala Rodriguez

(10) Patent No.: US 10,565,665 B2
(45) Date of Patent: Feb. 18, 2020

(54) COMPUTER-IMPLEMENTED METHODS AND SYSTEMS FOR DETERMINING DEVELOPMENT POTENTIAL

(71) Applicant: GRIDICS LLC, Miami, FL (US)

(72) Inventor: Max Enrique Zabala Rodriguez, Miami, FL (US)

(73) Assignee: GRIDICS LLC, Miami, FL (US)

( * ) Notice: Subject to any disclaimer, the term of this patent is extended or adjusted under 35 U.S.C. 154(b) by 684 days.

(21) Appl. No.: 14/976,901

(22) Filed: Dec. 21, 2015

(65) Prior Publication Data

US 2016/0110824 A1 Apr. 21, 2016

Related U.S. Application Data

(63) Continuation-in-part of application No. 13/467,144, filed on May 9, 2012, now abandoned.

(60) Provisional application No. 61/484,432, filed on May 10, 2011.

(51) Int. Cl.
*G06Q 50/16* (2012.01)
*G06Q 30/00* (2012.01)

(52) U.S. Cl.
CPC ......... *G06Q 50/165* (2013.01); *G06Q 30/018* (2013.01)

(58) Field of Classification Search
USPC .............................................. 705/315, 317
See application file for complete search history.

(56) References Cited

U.S. PATENT DOCUMENTS

| 8,271,431 B1* | 9/2012 | Carrington | G06Q 10/10 705/28 |
| 2002/0138386 A1* | 9/2002 | Maggioncalda | G06Q 40/00 705/36 R |
| 2003/0023412 A1* | 1/2003 | Rappaport | G06Q 10/10 703/1 |
| 2005/0203768 A1* | 9/2005 | Florance | G06Q 30/0643 701/438 |

(Continued)

OTHER PUBLICATIONS

EIC 3600 NPL (Fast and Focused) Search Results—Sep. 27, 2019 (Year: 2019).*

*Primary Examiner* — Amanda C Abrahamson
*Assistant Examiner* — Johnathan J Lindsey, III
(74) *Attorney, Agent, or Firm* — NEO IP

(57) ABSTRACT

Computer-implemented methods and systems are provided for determining an actual maximum density capacity and/or development potential in view of the zoning code applicable to a particular location. Such methods and systems seek to overcome frustrations and alleviate other impediments that affect efficient use of zoning codes. In a first aspect, a computer-implemented system for determining development potential includes at least one input interface for receiving property information; a computer program for calculating a building envelope allowable under the zoning code and for calculating an actual maximum density capacity available for a geographic area of interest using the zoning code and additional factors affecting the area of interest. The results of at least the actual maximum density capacity calculation is provided to an output interface for displaying assessment of zoning code compliance and generating a virtual build of a building permitted under the zoning code for the site.

16 Claims, 62 Drawing Sheets

(56) References Cited

U.S. PATENT DOCUMENTS

| | | | |
|---|---|---|---|
| 2006/0025971 A1* | 2/2006 | Detwiler | A01B 79/005 703/1 |
| 2006/0294062 A1* | 12/2006 | Folchetti | G06Q 30/00 |
| 2007/0050177 A1* | 3/2007 | Kirkland, Jr. | G06Q 10/00 703/1 |
| 2007/0091119 A1* | 4/2007 | Jezyk | G06T 19/00 345/619 |
| 2008/0059220 A1* | 3/2008 | Roth | G06Q 10/10 705/311 |
| 2008/0281673 A1* | 11/2008 | Davis | G06Q 10/06 705/315 |
| 2009/0089018 A1* | 4/2009 | Kelley | G06T 17/05 703/1 |
| 2009/0094077 A1* | 4/2009 | Fosburgh | G06Q 10/00 705/315 |
| 2009/0099954 A1 | 4/2009 | Kilby | |
| 2009/0125283 A1* | 5/2009 | Conover | G06Q 10/10 703/1 |
| 2010/0211512 A1* | 8/2010 | Detwiler | G06Q 10/04 705/315 |
| 2010/0223083 A1* | 9/2010 | Wenzlau | G06Q 10/06 705/315 |
| 2011/0055091 A1* | 3/2011 | Budlong | G06Q 10/00 705/313 |
| 2012/0016638 A1* | 1/2012 | McLean | G06Q 10/06 703/1 |
| 2012/0095730 A1* | 4/2012 | Krebs | G06F 17/5004 703/1 |
| 2012/0259594 A1* | 10/2012 | Khan | G06T 13/60 703/1 |
| 2013/0132041 A1* | 5/2013 | Sigaty | G06F 17/5004 703/1 |
| 2014/0278280 A1 | 9/2014 | Pardo-Fernandez | |
| 2015/0032479 A1 | 1/2015 | Schembari et al. | |
| 2015/0058233 A1 | 2/2015 | Budlong | |

* cited by examiner

Project Proposal Code Compliance
Building Disposition Allowed — 70
Private Frontage Allowed — 80
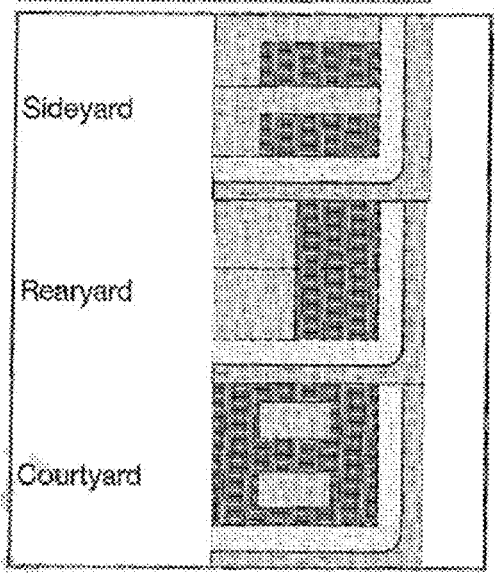
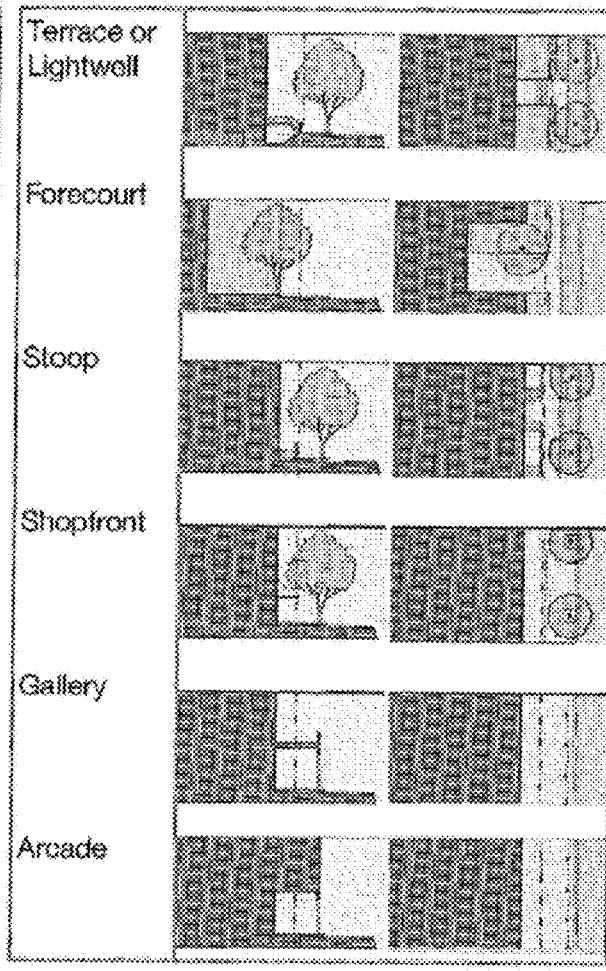
Shared Parking Ratios — 90
| | Required | | M-F 8am-6pm | M-F 6pm-12am | M-F 12am-8am | Sat-Sun 6am-6pm | Sat-Sun 6pm-12am | Sat-Sun 12am-8am |
|---|---|---|---|---|---|---|---|---|
| Residential | | 5 | 60% | 100% | 100% | 80% | 100% | 100% |
| Lodging | 0 Rooms | 0 | 70% | 100% | 100% | 70% | 100% | 100% |
| Office | 0 sqft | 0 | 100% | 20% | 5% | 5% | 5% | 5% |
| Retail | 3,400 sqft | 10 | 90% | 80% | 5% | 100% | 70% | 5% |
| Subtotals | | 15 | 12 | 13 | 6 | 14 | 12 | 6 |
FIG. 3

95 → Lot Density Calculation Worksheet

Lot Information

| | |
|---|---|
| T-Zone | T6 |
| Lot-Width | 18 ft |
| Lot-Depth | 100 ft |
| Irregular Lot | ☐ |
| Full Block Lot | ☐ |
| Primary T-Fare ROW Dim. | 60 ft |
| Secondary T-Fare ROW Dim. (Corner Lot) | 60 ft |
| Rear/Alley T-Fare ROW Dim. | 0 ft |
| Community Type | TND |
| TOD | ☐ |
| TDR | ☐ |

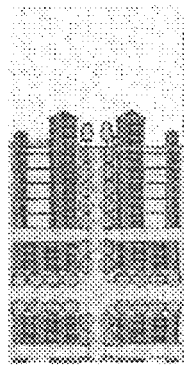
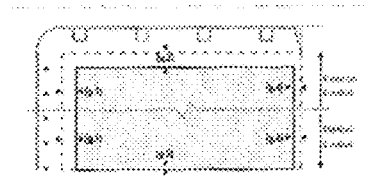
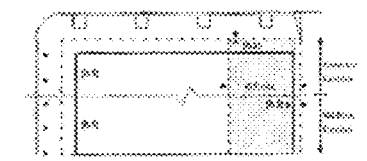
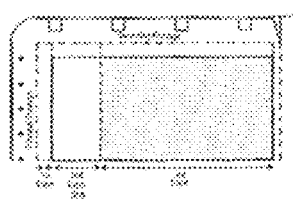

97 → Maximum Lot Capacity

| | |
|---|---|
| Lot Area Net | 1,800 sqft / 0.041 ac |
| Allowed Density | 24/gross acre |
| Developable Units | 3 Units |

Building Disposition Permitted

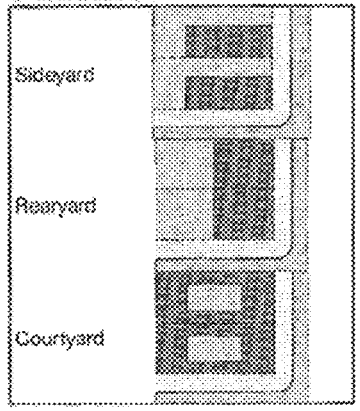

- Sideyard
- Rearyard
- Courtyard

Private Frontage Permitted

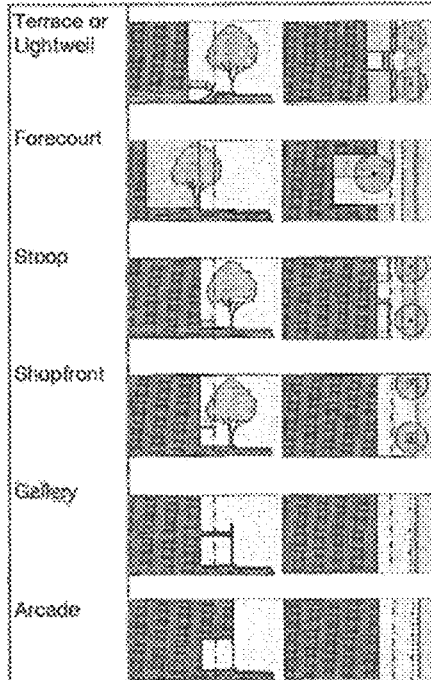

- Terrace or Lightwell
- Forecourt
- Stoop
- Shopfront
- Gallery
- Arcade

Lot Density/Type Compliant

FIG. 4

95 → Lot Density Calculation Worksheet

Case Study Maximum Lot Capacity

Givens

| | | |
|---|---|---|
| T-Zone | T5 | |
| Community Type | TND | |
| Density Allowed | 24/gross acre | |
| Max. Lot Coverage | 70% | |
| Max. Height | 5 stories max. | |
| Development Units | 3 Units | |
| Transferable Units | 70% | 2 Units |
| Primary Frontage | 18 ft | |
| Secondary Frontage | 100 ft | |
| Total Frontage | 118 ft | |

Lot Use/Configuration Compliant

FIG. 5

Case Study Calibration

| | | |
|---|---|---|
| Transferable Units | 2 | 2 Left |
| Residential | 1 | 2 Left |
| Lodging | 0 | |
| Office | 0 | |
| Retail | 0 | |

Civic Pkg Reserve ☐

Pkg. Structure ☐
Primary Frontage Building Depth    50 ft
% Total Frontage Buildout    80%
Secondary Frontage Building Depth    0 ft
% Total Frontage Buildout    70%
Res. Units Avg. Area    2,500 sqft Single-Family Unit ☐

1 story (ies)

Results

| | | |
|---|---|---|
| Residential Units | 1 Units | 4 story (ies) |

Prop. Building Footprint    720 sqft
Resulting Lot Coverage    40%
Resulting Building Height    4 story (ies)
Max. On-Site Pkg Capacity    4 Pkg Spaces
Max. On-Street Pkg Capacity    5 Pkg Spaces    ~99
Max. Lot Pkg Capacity    9 Pkg Spaces
Max. Shared Pkg Required    1 Pkg Spaces

Shared Parking Ratios

| | Required | M-F 8am-6pm | M-F 6pm-12am | M-F 12am-8am | Sat-Sun 8am-6pm | Sat-Sun 6pm-12am | Sat-Sun 12am-8am |
|---|---|---|---|---|---|---|---|
| Residential | 1 | 60% | 100% | 100% | 80% | 100% | 100% |
| Lodging | 0 | 70% | 100% | 100% | 70% | 100% | 100% |
| Office | 0 | 100% | 20% | 5% | 5% | 5% | 5% |
| Retail | 0 | 90% | 80% | 5% | 100% | 70% | 5% |
| Subtotals | 1 | 1 | 1 | 1 | 1 | 1 | 1 |

95 → Lot Density Calculation Worksheet

Table 5B. TND T5- Building and Disposition Configuration

T5

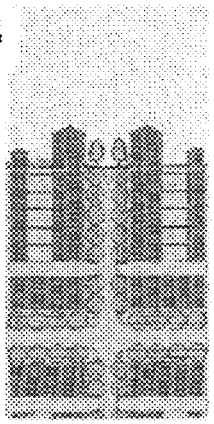

Building Configuration
Main Building Height — 5 stories max.
Outbuilding Height — 2 stories max.
Structured Parking — 60 stories max.

Building Occupation
Given Lot Width — 16 ft
Given Lot Depth — 100 ft
Max. Lot Coverage — 70%
Corner Lot — YES

Building Disposition
Sideyard — Permitted
Rearyard — Permitted
Courtyard — Permitted

Setbacks - Principal Building
Front Setback Principal — 2 ft
Front Setback Secondary — 2 ft
Side Setback — 0 ft
Rear Setback — 3 ft
Frontage Buildout — 80%

Setbacks - Outbuilding
Front Setback — 40 ft
Side Setback — 0 ft
Side Setback at corner — 2 ft
Rear Setback — 3 ft

Lot Calibration Results
Density Allowed — 24/gross acre
Development Units — 3 Units
Transferable Units — 2 Units

Suggested Building Layout
Building Height — 4 stories max.
Residential Units — 1 Units

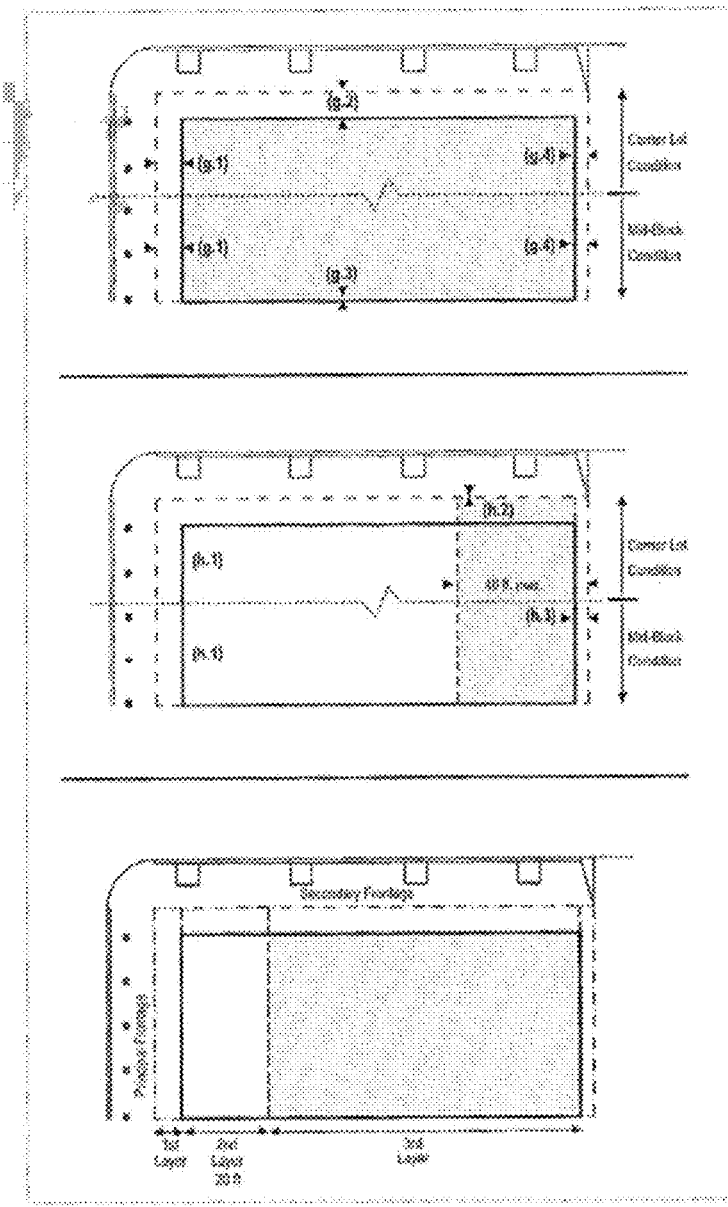

FIG. 6

Lot Density Calculation Worksheet

95 →

Case Study Maximum Lot Capacity

Givens

| | |
|---|---|
| T-Zone | T4 |
| Community Type | TND |
| FAR Allowed | 2 FAR |
| Max. Lot Coverage | 80% |
| Max. Tower Lot Coverage | |
| Max. Height Podium | 5 stories max. |
| Max. Height Tower | 15 stories max. |
| Lot Area | 9,000 sqft |
| Development Area | 18,000 sqft |
| Max. Bldg. Footprint | 7,200 sqft |
| Max. Mixed-Area 30% | 5,400 sqft |

No rows match the filter conditions.

Case Study Calibration

| | |
|---|---|
| Transferable Area | 5,400 sqft  0 Left |
| Residential Area | 14,000 sqft |
| Lodging | 0 sqft |
| Office | 0 sqft |
| Retail | 5,400 sqft |
| Civic Pkg Reserve | ☑ |
| How Many? | 50 Pkg Spaces |
| Pkg. Structure | ☐ |
| *Primary Frontage Building Depth* | 50 ft |
| *% Total Frontage Buildout* | 80% |
| | 0 ft |
| | 70% |
| *Res. Units Avg. Area* | 2,500 sqft |
| | 250 sqft |
| Single-Family Unit | ☐ |
| | 1 story (ies) |

Results

| | | |
|---|---|---|
| Residential Units | 14,000 sqft | 2 story (ies) |
| Retail Area | 5,400 sqft | 1 story (ies) |
| Total Proposed Area | 19,400 sqft | |
| Prop. Building Footprint | 7,200 sqft | |
| Resulting Podium Height | 3 story (ies) | |
| | -5 story (ies) | |
| Max. On-Site Pkg Capacity | 6 Pkg Spaces | |
| Max. On-Street Pkg Capacity | 3 Pkg Spaces | |
| | | 0 stories pkg. deck |
| Max. Lot Pkg Capacity | 59 Pkg Spaces | with Civic Pkg. |
| Max. Shared Pkg Required | 22 Pkg Spaces | |

FIG. 8

Shared Parking Ratios

| | Required | M-F 8am-6pm | M-F 6pm-12am | M-F 12am-8am | Sat-Sun 8am-6pm | Sat-Sun 6pm-12am | Sat-Sun 12am-8am |
|---|---|---|---|---|---|---|---|
| Residential | 8 | 60% | 100% | 100% | 80% | 100% | 100% |
| Lodging | 0 Rooms | 0 | 70% | 100% | 100% | 70% | 100% | 100% |
| Office | 0 sqft | 0 | 100% | 20% | 5% | 5% | 5% | 5% |
| Retail | 5,400 sqft | 16 | 90% | 80% | 5% | 100% | 70% | 5% |
| Subtotals | | 24 | 18 | 21 | 9 | 22 | 19 | 9 |

PROJECT INFORMATION

| | Acres |
|---|---|
| Property Area | 180 ac |
| Community Type | TND |

| Calculations Area/% Reductions | |
|---|---|
| Existing Infrastructure Area | 35 ac |
| Proposed Preservation % | 25% |
| Proposed Infrastructure % | 15% |
| Proposed Civic Space % | 15% |

| CU | TND | |
|---|---|---|
| GROSS AREA | 180 ac | 100.00% |
| NET DEVELOPABLE ACRES | 59.5 ac | 33.06% |
| CIVIC SPACE | 20.25 ac | |
| PRESERVATION | 45 ac | |
| INFRASTRUCTURE | 55.25 ac | |

| | T1 | T2 | T3 | T4 | T5 | T6 | Totals |
|---|---|---|---|---|---|---|---|
| ACRES | 0 ac | 11.9 ac | 23.8 ac | 17.85 ac | 5.95 ac | 0 ac | 59.5 |
| % | 0% | 20% | 40% | 30% | 10% | 0% | 100.00% |
| Ideal Range | | 0% 20% | 0% 50% | 30% 80% | 10% 30% | N/A 8% | |
| Density | | 0.05/net acre | 5/net acre | 18/net acre | 24/net acre | 80/net acre | 3.24/gross acre 9.82/net acre |
| Approximate # Units | | 1 Units | 119 Units | 321 Units | 143 Units | 0 Units | 584 Units |
| $/sqft | N/A | | | | | N/A | N/A |

COMMUNITY UNIT COMPLIANT

| Table 5B TND | | T1 | T2 | T3 | T4 | T5 | T6 |
|---|---|---|---|---|---|---|---|
| Building Configuration | | | | | | | |
| | Principal Building | | 2 stories max. | 2 stories max. | 3 stories max. | 5 stories max. | |
| | Outbuilding | | 2 stories max. | 2 stories max. | 2 stories max. | 2 stories max. | |
| | Structured Parking | | 0 ft | 0 ft | 30 ft | 60 ft | |
| Lot Occupation | | | | | | | |
| | Lot Coverage Max. | | 60% | 60% | 70% | 70% | |
| Setbacks - Principal | | | | | | | |
| | Front Setback Principal | | 24 ft | 24 ft | 6 ft | 2 ft | |
| | Front Setback Secondary | | 12 ft | 12 ft | 4 ft | 2 ft | |
| | Side Setback | | 12 ft | 12 ft | 0 ft | 0 ft | |
| | Rear Setback | | 12 ft | 12 ft | 3 ft | 3 ft | |
| | Frontage Buildout | | 40.0% | 40.0% | 60.0% | 80.0% | |
| Setbacks - Outbuilding | | | | | | | |
| | Front Setback Principal | | 20 ft + bldg. setback | 20 ft + bldg. setback | 20 ft + bldg. setback | 40 ft | |
| | Side Setback | | 3 ft | 3 ft | 0 ft | 0 ft | |
| | Side Setback at corner | | 6 ft | 6 ft | 3 ft | 2 ft | |
| | Rear Setback | | 3 ft | 3 ft | 3 ft | 3 ft | |
| Building - Disposition | | | | | | | |
| | Edgeyard | | ✓ | | | | |
| | Sideyard | | ✓ | ✓ | | | |
| | Rearyard | | | ✓ | ✓ | ✓ | |
| | Courtyard | | | | ✓ | ✓ | |
| Private Frontages | | | | | | | |
| | Common Yard | | ✓ | | | | |
| | Porch & Fence | | ✓ | ✓ | | | |
| | Terrace or Lightwell | | | ✓ | ✓ | ✓ | |
| | Forecourt | | | ✓ | ✓ | ✓ | |
| | Stoop | | | ✓ | ✓ | ✓ | |
| | Shopfront | | | | ✓ | ✓ | |
| | Gallery | | | | ✓ | ✓ | |
| | Arcade | | | | ✓ | ✓ | |

| 5.3.4 | | | T1 | T2 | T3 | T4 | T5 | T6 |
|---|---|---|---|---|---|---|---|---|
| | Newly Platted Lots CLD | min. | | 100 ft | 54 ft | 24 ft | | |
| | | max. | | | 260 ft | 120 ft | | |
| | Newly Platted Lots TND | min. | | | 54 ft | 18 ft | 14 ft | |
| | | max. | | | 260 ft | 120 ft | 180 ft | |
| | Newly Platted Lots RCD | min. | | | | 14 ft | 14 ft | 14 ft |
| | | max. | | | | 120 ft | 180 ft | 500 ft |

| Table 5B | | | | | | |
|---|---|---|---|---|---|---|
| CLD | T1 | T2 | T3 | T4 | T5 | T6 |
| Building Configuration | | | | | | |
| Principal Building | 2 stories max. | 2 stories max. | 3 stories max. | 5 stories max. | | |
| Outbuilding | 2 stories max. | 2 stories max. | 2 stories max. | 2 stories max. | | |
| Structured Parking | 0 ft | 0 ft | 30 ft | 60 ft | | |
| Lot Occupation | | | | | | |
| Lot Coverage Max. | 60% | 60% | 70% | 70% | | |
| Setbacks – Principal | | | | | | |
| Front Setback Principal | 24 ft | 24 ft | 6 ft | 2 ft | | |
| Front Setback Secondary | 12 ft | 12 ft | 4 ft | 2 ft | | |
| Side Setback | 12 ft | 12 ft | 0 ft | 0 ft | | |
| Rear Setback | 12 ft | 12 ft | 3 ft | 3 ft | | |
| Frontage Buildout | 40.0% | 40.0% | 60.0% | 80.0% | | |
| Setbacks – Outbuilding | | | | | | |
| Front Setback | 20 ft + bldg. setback | 20 ft + bldg. setback | 20 ft + bldg. setback | 20 ft + bldg. setback 40 ft | | |
| Side Setback | 3 ft | 3 ft | 0 ft | 0 ft | | |
| Side Setback at corner | 6 ft | 6 ft | 3 ft | 2 ft | | |
| Rear Setback | 3 ft | 3 ft | 3 ft | 3 ft | | |
| Building – Disposition | | | | | | |
| Edgeyard | | | | | | |
| Sideyard | | | | | | |
| Rearyard | | | | | | |
| Courtyard | | | | | | |
| Private Frontages | | | | | | |
| Common Yard | | | | | | |
| Porch & Fence | | | | | | |
| Terrace or Lightwell | | | | | | |
| Forecourt | | | | | | |
| Stoop | | | | | | |
| Shopfront | | | | | | |
| Gallery | | | | | | |
| Arcade | | | | | | |

FIG. 12

| | | T1 | T2 | T3 | T4 | T5 | T6 |
|---|---|---|---|---|---|---|---|
| 4.4.1 | Infill CLD (Area Acres) min. | N/A | 50.0% | 10% | 20% | N/A | N/A |
| | max. | N/A | 100% | 30% | 40% | N/A | N/A |
| 4.4.1 | Infill TND (Area Acres) min. | N/A | 0% | 0 | 30% | 10% | N/A |
| | max. | N/A | 20% | 50% | 80% | 30% | N/A |
| 4.4.2 | Infill RCD (Area Acres) min. | N/A | N/A | N/A | 0 | 10% | 30% |
| | max. | N/A | N/A | N/A | 50% | 50% | 80% |
| 4.5.1.a | Density Calculation NET | N/A | 0.05/gross acre | 5/gross acre | 18/gross acre | 24/gross acre | 80/gross acre |
| | | N/A | N/A | 5,445 sqft | 1,815 sqft | 1,210 sqft | 544 sqft |
| 4.5.1.e | Density Increase RCD-TDR | 0% | 0% | 0% | 40.0% | 50.0% | 60.0% |
| 4.5.2.b | Transferable Building Functions | 0% | 5% | 20.0% | 30.0% | 70.0% | 80.0% |

| 4.5.2.a | Other Functions Ratios | Lodging | 1 Housing Unit/3 Lodging Rooms |
|---|---|---|---|
| | | Office | 1 Housing Unit/1,500 sf |
| | | Retail | 1 Housing Unit/2,000 sf |

| 4.6.2 | Transit Overlay District Density Increase | 80.0% | for land within 660 ft of station |
|---|---|---|---|
| | | 60.0% | for land within 1,320 ft of station |
| | | 40.0% | for land within 2,640 ft of station |

| 4.6.5 | Transit Overlay District Required Parking Modifier | Exempt | for land within 660 ft of station |
|---|---|---|---|
| | | 1.5 | for land within 1,320 ft of station |
| | | 1.2 | for land within 2,640 ft of station |

| 4.7.2 | Civic Zone | 20.0% | Max. of community Unit |
|---|---|---|---|

Table 5B

| RCD | T1 | T2 | T3 | T4 | T5 | T6 |
|---|---|---|---|---|---|---|
| Building Configuration | | | | | | |
| Principal Building | | | | 4 stories max. | 6 stories max. | 12 stories max. |
| Outbuilding | | | | 2 stories max. | 3 stories max. | N/A |
| Structured Parking | 0 | 0 | 0 | 50 ft | 70 ft | 80 ft |
| Lot Occupation | | | | | | |
| Lot Coverage Max. | | | | 70% | 80% | 90% |
| Setbacks - Principal | | | | | | |
| Front Setback Principal | | | | 4 ft | 2 ft | 2 ft |
| Front Setback Secondary | | | | 2 ft | 2 ft | 2 ft |
| Side Setback | | | | 0 ft | 0 ft | 0 ft |
| Rear Setback | | | | 3 ft | 3 ft | 0 ft |
| Frontage Buildout | | | | 60.0% | 80.0% | 80.0% |
| Setbacks - Outbuilding | | | | | | |
| Front Setback Principal | | | | 20 ft + bldg. setback | 40 ft | N/A |
| Side Setback | | | | 0 ft | 0 ft | N/A |
| Side Setback at corner | | | | 3 ft | 2 ft | N/A |
| Rear Setback | | | | 3 ft | 3 ft | N/A |
| Building - Disposition | | | | | | |
| Edgeyard | | | ☐☐☐☐ | ☑☑☑☐ | ☐☑☑☐ | ☐☐☑☐ |
| Sideyard | | | | | | |
| Rearyard | | | | | | |
| Courtyard | | | | | | |
| Private Frontages | | | | | | |
| Common Yard | | | ☐☐☐☐☐☐☐☐ | ☑☑☑☑☑☑☑☐ | ☐☐☐☑☑☑☑☐ | ☐☐☐☑☑☑☑☐ |
| Porch & Fence | | | | | | |
| Terrace or Lightwell | | | | | | |
| Forecourt | | | | | | |
| Stoop | | | | | | |
| Shopfront | | | | | | |
| Gallery | | | | | | |
| Arcade | | | | | | |

File Edit View Favorites Tools Help

Zonar demo V. 4.00

Lot Information

Density Calculation Method | Density
T-Zone | T3
Lot-Width | 54
Lot-Depth(Leave blank if lot is irregular) | 100

Irregular Lot
Full Block Lot ☑
Primary T-Fare ROW Dim. | 60
Secondary T-Fare ROW Dim. A | 50
Rear/Alley T-Fare ROW Dim.
Secondary T-Fare ROW Dim. B
Secondary T-Fare ROW Dim. C
Community Type | TBD
TOD   Enter Distance to Station | 1,200
TDR

Lot Density/Type Compliant

Current Lot may be Subdivided into up to 1 Lots 54 ft 100      12   24   12      50 ft

60

Maximum Lot Capacity

TRUE    5,400 sqft

How Many?
Lot Area Acres    0.00 ac
Gross Density Allowed    14.00
Developable Units    0 Units

Building Disposition Permitted

Edgeyard

Private Frontage Permitted

Common Yard
Porch & Fence

Lot Information

| | |
|---|---|
| T-Zone | T6-48A-O |
| Lot Width (Principal Frontage) | 250 ft |
| Lot Depth (or Secondary Frontage) | 200 ft |
| Irregular shape block | ☐ |
| Abutting Side T-Zone (Side B) | T6 |
| Abutting Rear T-Zone (Side C) *This is reflected on Section Diagram* | T6 |
| Abutting Side T-Zone (Side D) | T6 |
| More than one Frontages | ☑ |
| Alley accessible to Lot | ☐ |
| Primary T-Fare ROW Dim. A | 60 ft |
| T-Fare ROW Dim. (B) | Primary 60 ft |
| T-Fare ROW Dim. (C) | Secondary 50 ft |
| T-Fare ROW Dim. (D) | Secondary 50 ft |

LOCATION VARIABLES (SPECIAL AREA PLANS)

| | | |
|---|---|---|
| Density (DU) Increase Areas (Article 4.Diagram 9) | 500/gross acre | ☐ |
| Established Setback (Frontage A) | 15 ft | ☐ |
| Established Setback (Frontage B) | 30 ft | ☐ |
| Established Setback (Frontage C) | 15 ft | ☐ |
| Established Setback (Frontage D) | 10 ft | ☐ |
| TOD | 0-1320 | ☐ |
| Transit Station | 0-1320 | ☐ |

ADDITIONAL OPTIONS

| | | |
|---|---|---|
| Will propose a LEED certified BLDG | Platinum | ☐ |
| Will participate in Affordable Housing Public Benefit Program | $3,300,000.00 | ☐ |
| Will participate in Public Housing Public Benefit Program | $4,125,000.00 | ☐ |

Lot Density/Type Compliant

Current Lot may be Subdivided into up to 2 Lots  Min. 100 ft

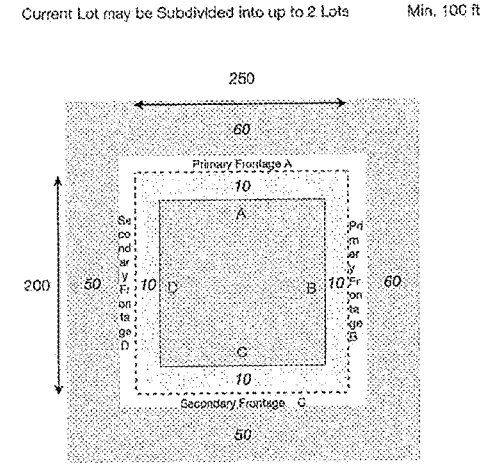

Maximum Lot Capacity

| | |
|---|---|
| Lot Area Net (SQF) | 50,000 sqft |
| Lot Area Acres | 1.15 ac |
| Density Allowed | 150.00 |
| DU allowed | 172 Units |
| FLR | 11.00 |
| Allowed FLR | 550,000 sqft |
| Lot Coverage | 80% |
| Min. Open Space | 10% |
| Principal Bldg Max. Height | 8 stories max. |
| Principal Bldg Min. Height | 2 stories max. |
| Principal Tower Height | 48 stories max. |
| Max. Bonus Height | 0 stories max. |
| Ancillary Bldg Max. Height | N/A |
| Max. Building Area Allowed | 550,000 sqft |
| Max. Building Footprint | 7,980 sqft |
| Max. Office/Com. Allowed | 240,000 sqft |
| Max. Office Area Allowed | 160,000 sqft |
| Max. Office Height Allowed | 4 stories max. |
| Max. Comm. Height Allowed | 2 stories max. |
| Max. Comm. Area Allowed | 80,000 sqft |
| Max. Comm. Establishment Area | 4,000 sqft |
| Max. Assembly Seating Capacity | N/A |

Building Function: Use

- R Allowed by RIGHT
- W Allowed by WARRANT
- E Allowed by EXCEPTION

Residential

| | |
|---|---|
| Single Family Residence | R |
| Community Residence | R |
| Two Family Residence | R |
| Multi Family Housing | R |
| Dormitory | R |
| Home Office | R |
| Live - Work | R |

Lodging

| | |
|---|---|
| Bed & Breakfast | R |
| Inn | R |
| Hotel | R |

Office

| | |
|---|---|
| Office | R |

Commercial

| | |
|---|---|
| Auto-Related Establs. | W |
| Entertainment Establs. | R |
| Food Service Establs. | R |
| Alcohol Beverage Serv. | E |
| General Commercial | R |
| Marine Related Comm. | W |
| Open Air Retail | W |
| Place of Assembly | R |
| Recreation Establs. | R |

Civic

| | |
|---|---|
| Community Facility | W |
| Recreation Facility | R |
| Religious Facility | R |

Civic Support

| | |
|---|---|
| Community Support Fac. | W |
| Infrastructure and Util. | W |
| Marina | W |
| Public Parking | W |
| Transit Facilities | W |

Educational

| | |
|---|---|
| Childcare | W |
| College / University | W |
| Elementary School | W |
| Learning Center | R |
| Middle / High School | W |
| Pre-School | R |
| Research Facility | R |
| Special Training/ Vocatio. | W |

Industrial

Private Frontage Permitted

- Forecourt
- Stoop
- Shopfront
- Gallery
- Arcade

FIG. 17

Case Study Maximum Lot Capacity

Lot Use/Configuration Compliant

Givens

| | |
|---|---|
| T-Zone | T6-48A-O |
| Abutting T-Zone - Side B | T6 |
| Abutting T-Zone - Side D | T6 |
| Abutting T-Zone - Rear C | T6 |
| Lot Area Net (SQF) | 50,000 sqft |
| Lot Area Acres | 1.15 ac |
| Density Allowed | 500.00 |
| DU allowed | 573.00 |
| FLR | 11.00 |
| Allowed FLR | 550,000 sqft |
| Lot Coverage | 80.00% |
| Min. Open Space | 10.00% |
| Principal Bldg Max. Height | 8 stories max. |
| Principal Bldg Min. Height | 2 stories max. |
| Principal Tower Height | 48 stories max. |
| Max. Bonus Height | 0 stories max. |
| Ancillary Bldg Max. Height | N/A |
| Max. Building Area Allowed | 550,000 sqft |
| Max. Building Footprint | 7,980 sqft |
| Max. Office/Com. Allowed | 240,000 sqft |
| Max. Office Area Allowed | 160,000 sqft |
| Max. Office Height Allowed | 4 stories max. |
| Max. Comm. Height Allowed | 2 stories max. |
| Max. Comm. Area Allowed | 80,000 sqft |
| Max. Comm. Establishment | 4,000 sqft |
| Max. Assembly Seating | N/A |
| Max. Liner Area | 7,980 sqft |

Case Study Calibration

| | | |
|---|---|---|
| Max. DUA (Density) Allowed | *573 Units* | |
| Max. DUA (FLR) | *290 Units* | |
| or Max. Lodging Rooms Allowed | *1,146 Rooms* | |
| Max. Office Area Allowed | *160,000 sqft* | 100,000 Left |
| Max. Commercial Area Allowed | *80,000 sqft* | 65,000 Left |
| Max. Off./Comm. Area Combined | *137,500 sqft* | 62,500 Left |

| | |
|---|---|
| Residential | 250 Units |
| Dwelling Units Average Gross Area | 1,500 sqft |
| Lodging | 80 Rooms |
| Lodging Rooms Average Area | 500 sqft |
| Office | 60,000 sqft |
| Commercial | 15,000 sqft |

Civic Pkg Reserve 

Pkg. Structure 
Underground? 
Levels Underground? 1 

Results

| | | | |
|---|---|---|---|
| Max. Building Footprint | 40,000 sqft | | |
| Aprox. Liner Building Footprint | 7,980 sqft | | |
| Tower Footprint | 18,000 sqft | | |
| Resulting Lot Coverage | 80% | | |
| Total Building Height | 22 story (ies) | | |
| Total Building Area | 550,000 sqft | | |
| Residential Units | 375,000 sqft | 14 story (ies) | of tower footprint |
| | | 2.72 story (ies) | of full footprint |
| Lodging Rooms | 40,000 sqft | 1 story (ies) | |
| Office Area | 60,000 sqft | 2.4 story (ies) | of full footprint |
| Commercial Area | 15,000 sqft | 1.68 story (ies) | of liner footprint |

Office Area may be subdivided into max. of 4 space(s)

| | | | |
|---|---|---|---|
| Max. On-Street Pkg Capacity | | 41 Pkg Spaces | |
| Pkg. Structure | 90 spaces/level | 270 Pkg Spaces | 3 stories pkg. deck |
| Pkg. Underground | 138 spaces/level | 138 Pkg Spaces | 1 stories pkg. deck |
| Max. Lot Pkg Capacity | | 449 Pkg Spaces | Includes On-Street Pkg |
| Max. Shared Pkg Required | | 384 Pkg Spaces | Pkg Spaces Required Include Sharing Factor |

ZONING FEASIBILITY REPORT

[your logo here]

| | |
|---|---|
| Folio Number(s) | XXXXXXXXX<br>XXXXXXXXX<br>XXXXXXXXX |
| Address (s) | Address<br>Address<br>Address |
| City | City |
| Report Date | Date |

FIG. 29A

[your logo here]  TABLE OF CONTENTS

| Folio Number | Various | Lot Area | xxx,xxx sqft | JOHN DOE |
| Address | Various | Zoning Code | Miami21 (May 2015) | Company |
| City | City of Miami | Parcel Zoning | T6-80-O (CBD) | Address |
| | | | | City, State |
| | | | | Phone Number |

ZONING ALLOWANCES
Property Location ............................................................................................................ 1
Allowed Uses .................................................................................................................... 2
Maximum Lot Capacity ..................................................................................................... 3
Illustrations ....................................................................................................................... 4

CAPACITY ANALYSIS
Maximum Capacity ........................................................................................................... 5
Illustrations ....................................................................................................................... 6

FIG. 29B

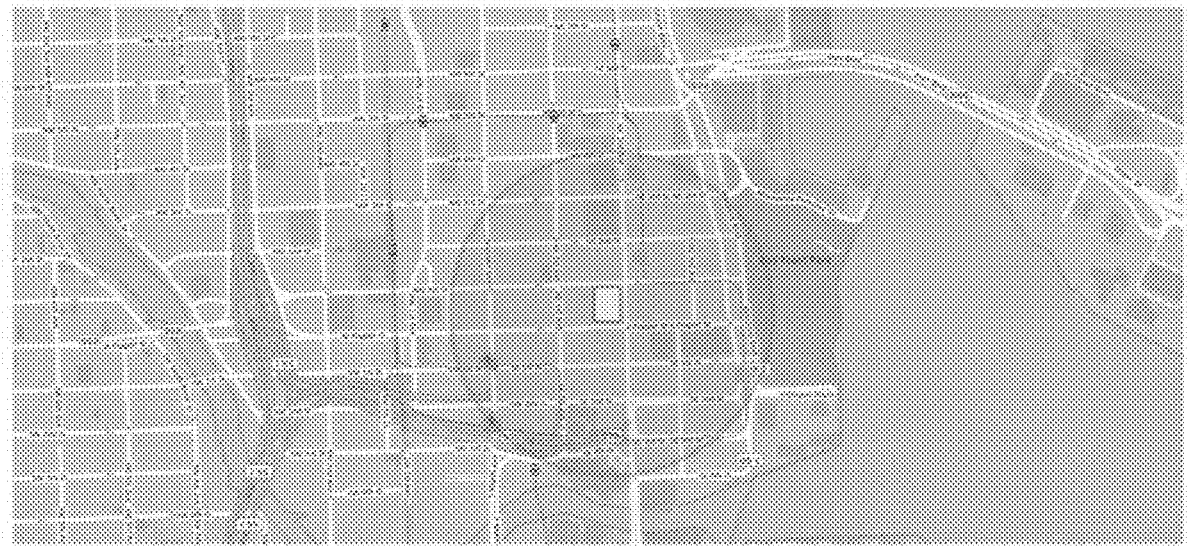
FIG. 29C

[your logo here]

ZONING ALLOWANCES
Property Description and Assumptions

| Folio Number | Various | Lot Area | xxx,xxx sqft | JOHN DOE |
| Address | Various | Zoning Code | Miami21 (May 2015) | Company |
| City | City of Miami | Parcel Zoning | T6-80-O (CBD) | Address |
| | | | | City, State |
| | | | | Phone Number |

This is a sample report for a hypothetical lot in the city of Miami. This sample includes parking reduction benefits due to the proximity to Metro rail and Metro Mover, this allows this building to reduce parking requirement by 50%.
This sample is also within the CBD Density increase overlay, therefore it has a much higher residential density than the originally allowed in this particular zone.
The proposal shows a mixed-use building, including residential condo units, office and retail, including parking structure, On-street parking
The Parking structure is designed as a regular type, where two lanes and two head-in parking rows in each parking bay PAGE 2 of 9

FIG. 29D

[your logo here]

ZONING ALLOWANCES
Allowed Uses

| | | | |
|---|---|---|---|
| Folio Number | Various | Lot Area | xxx,xxx sqft |
| Address | Various | Zoning Code | Miami21 (May 2015) |
| City | City of Miami | Parcel Zoning | T6-80-O (CBD) |

JOHN DOE
Company
Address
City, State
Phone Number

RESIDENTIAL
| | |
|---|---|
| Single Family Residence | R |
| Community Residence | R |
| Ancillary Unit | N |
| Two Family Residence | R |
| Multi Family Housing | R |
| Dormitory | R |
| Home Office | R |
| Live - Work | R |
| Work - Live | N |

LODGING
| | |
|---|---|
| Bed & Breakfast | R |
| Inn | R |
| Hotel | R |

OFFICE
| | |
|---|---|
| Office | R |

COMMERCIAL
| | |
|---|---|
| Auto-Related Commercial Establishment | W |
| Entertainment Establishment | R |
| Entertainment - Adult | N |
| Food Service Establishment | R |
| Alcohol Beverage Service | E |
| General Commercial | R |
| Marine Related Commercial | W |
| Open Air Retail | W |
| Place of Assembly | R |
| Recreation Establishment | R |

INDUSTRIAL
| | |
|---|---|
| Auto-Related Industrial Establishment | N |
| Manufacturing and Processing | N |
| Marine Related Industrial Establishment | N |
| Products and Services | N |
| Storage/Distribution Facility | N |

CIVIC
| | |
|---|---|
| Community Facility | W |
| Recreation Facility | R |
| Religious Facility | R |

CIVIC SUPPORT
| | |
|---|---|
| Community Support Facility | W |
| Infrastructure and Utilities | W |
| Major Facility | N |
| Marina | W |
| Public Parking | W |
| Rescue Mission | N |
| Transit Facilities | W |

EDUCATIONAL
| | |
|---|---|
| Childcare | W |
| College / University | W |
| Elementary School | W |
| Learning Center | R |
| Middle / High School | W |
| Pre-School | R |
| Research Facility | R |
| Special Training/ Vocational | W |

R - Allowed by Right   W - Allowed by Warrant   E - Allowed by Exception   N - Allowed by Locations PAGE 3 of 9

FIG. 29E

[your logo here]

ZONING ALLOWANCES
Maximum Lot Capacity

| | | | | | |
|---|---|---|---|---|---|
| Folio Number | Various | Lot Area | xxx,xxx sqft | | JOHN DOE |
| Address | Various | Zoning Code | Miami21 (May 2015) | | Company |
| City | City of Miami | Parcel Zoning | T6-80-O (CBD) | | Address |
| | | | | | City, State |
| | | | | | Phone Number |

BUILDING INTENSITY

| | |
|---|---|
| Dwelling Units per Acre | 1,000 du/ac |
| Dwelling Units allowed | 2,524 Units |
| Maximum Office/Comm Allowed | 2,538,584 sqft |
| Maximum Office Area Allowed | 2,642,500 sqft |
| Max. Commercial Establishment Area | 55,000 sqft |
| Floor Land Ratio (FLR) | 24 |
| Maximum Bldg Area Allowed | 2,642,500 sqft |
| Maximum Building Footprint | 87,953 sqft |
| Maximum Lot Coverage | 80% |
| Minimum Open Space | 10% |

HEIGHT LIMITATIONS (LEVELS)

| | |
|---|---|
| Maximum Building Height | 80 Levels |
| Podium Building Max. Height | 8 Levels |
| Podium Building Min. Height | 2 Levels |
| Tower Allowed Height | 80 Levels |
| Tower Bonus Max. Height | N/A |
| Maximum Office Height Allowed | UL |
| Maximum Commercial Height Allowed | UL |

SETBACKS

| | |
|---|---|
| Primary Frontage Minimum Setback | 10 ft |
| Secondary Frontage Minimum Setback | 10 ft |
| Side Minimum Setback | 0 ft |
| Rear Minimum Setback | 0 ft |
| Second Layer Dimension | 15 ft |

This represents the maximum allowable building envelope based on zoning regulations.

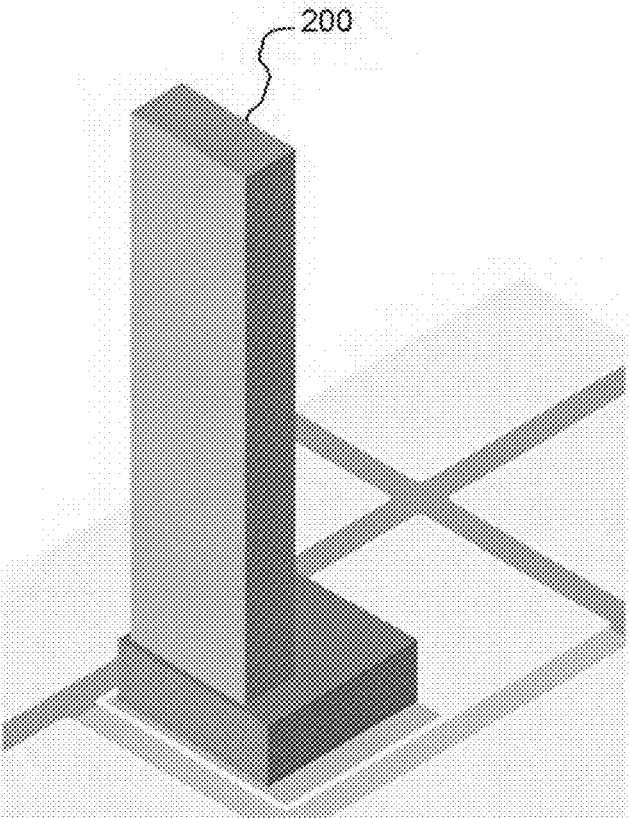
3D MASSING

PAGE 4 of 9

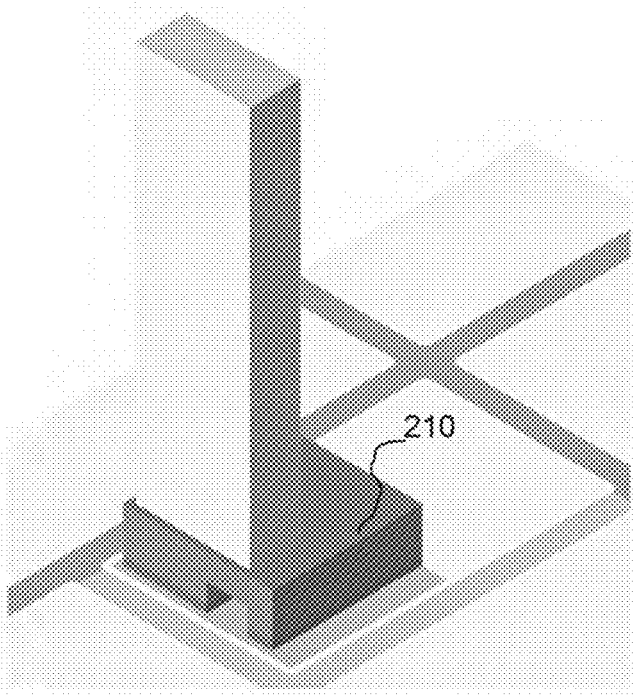
FIG. 29I

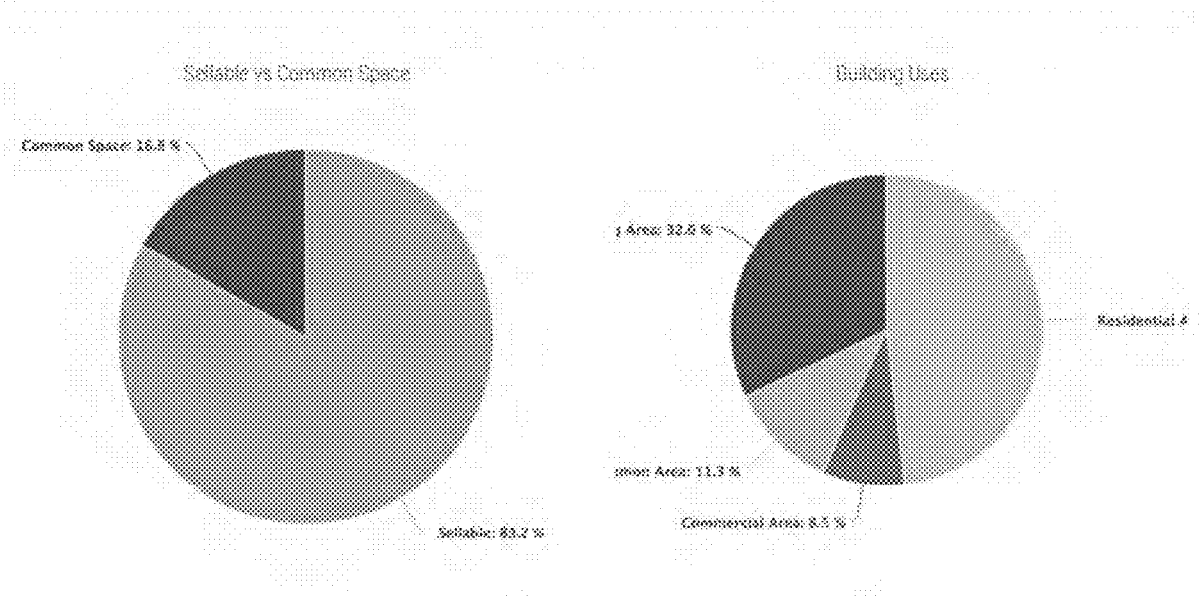
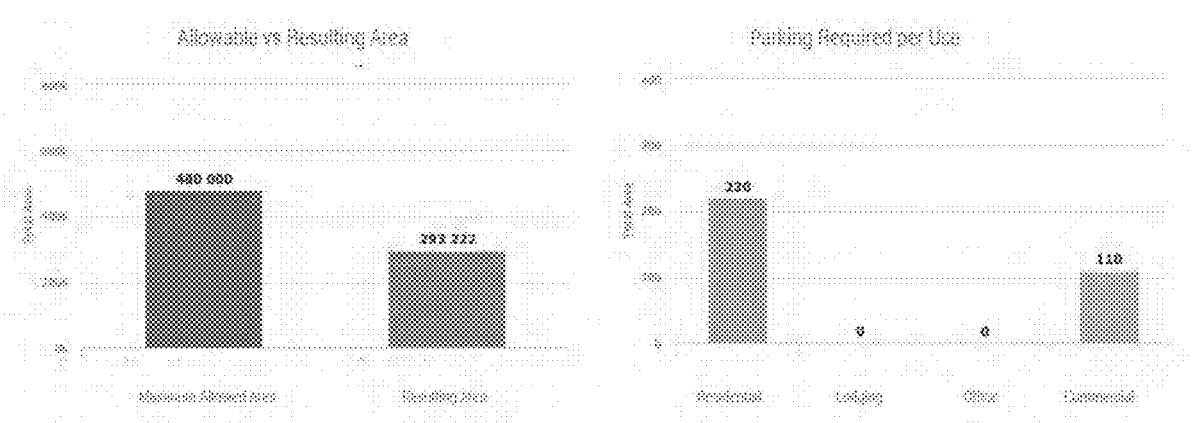
FIG. 29K

Building Parameters

| Parameter | Value |
|---|---|
| Parallel Parking Length | 22 |
| Head-in Parking Length | 19 |
| Diagonal Parking Length | 12 |
| Area of Parking Surface | 350 |
| Area of Parking Structure | 370 |
| Parking Structure Type | regular |
| Minimum parking spaces/fir | 10 |
| Liner Building Depth | 35 |
| Min Tower Length or Depth | 30 |
| Maximum Tower Depth | 30 |
| Max Tower Length Residential | 180 |
| Max Tower Length Commercial | 225 |

Fig. 32

| Maximum Lot Capacity | |
|---|---|
| Lot Area Net | 62,500 ft² |
| Lot Area Acres | 1.435 acres |
| Residential Density | 500 du/acre |
| DU Allowed | 717 DU |
| FAR | 22 |
| Max Built Area | 1,375,000 ft² |
| Lot Coverage | 80 % |
| Min Open Space | 10 % |
| Principal Building Max Height | 8 Levels |

| Results | |
|---|---|
| Max Building Footprint | 50,000 |
| Residential Tower Footprint | 14,400 |
| Commercial Tower Footprint | 0 |
| Resulting Lot Coverage | 80 |
| Total Build Height | 36 |
| Total Build Area | 740,160 |
| Residential Units | 616,800 |
| Lodging Rooms | 0 |
| Office Area | 0 ft² |
| Commercial Area | 0 ft² |
| Assumed Building Common Space Area | 123,360 ft² |
| Max. On-Street Pkg Capacity | 0 |
| Off-Site Parking | 0 |
| Pkg. Structure | 832 |
| Pkg. Underground | |
| Max. Lot Pkg Capacity | 832 |

Lot Information

Zoning Code
Miami

Zone
T6

Sub-Zone
36A

Type
Open

Irregular Shape Lot

Lot Width Dimension
250 ft

Lot Depth Dimension
250 ft

Frontage (A) Length
50 ft

More than One Frontage

On-Street Parking Available

Lot Abuts Different Zones

Fig. 35

Irregular Shape Lot

Lot Width Dimension

| 250 | ft |

Lot Depth Dimension

| 250 | ft |

Frontage (A) Length

| 50 | ft |

More than One Frontage

On-Street Parking Available

Lot Abuts Different Zones

Facing a Civic Space

Transit Oriented Development (TOD)

Near Transit Corridor

Fig. 36

Location Variables
Density Override 
Established Setback (A) 
Established Setback (B) 
Established Setback (C) 
Established Setback (D) 
Max Height Override 
Fig. 37

Additional Options
Will Propose LEED 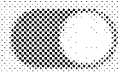
LEED Level
Silver
Brownfield Redevelopment 
Public Benefit (Trust Found Donation) 
Public Benefit (On Site) 
Public Benefit (Off Site) 
Will participate in Public Parks and Open 
Will participate in Public Parks and Open 
Will Donate a Civic Space or Civil Space 
Fig. 38

COMPUTER-IMPLEMENTED METHODS AND SYSTEMS FOR DETERMINING DEVELOPMENT POTENTIAL

CROSS-REFERENCE TO RELATED APPLICATIONS

The present application is a continuation-in-part of U.S. patent application Ser. No. 13/467,144, filed on May 9, 2012, which claimed the benefit of Provisional Patent Application No. 61/484,432, filed on May 10, 2011; those applications being incorporated herein, by reference, in their entireties.

BACKGROUND OF THE INVENTION

Field of the Invention

The field of the present invention relates to computer-implemented methods and systems for using a zoning code applicable to a particular site or target area (such as a neighborhood) to determine actual density capacity and/or development potential for the site or target area and/or for calibrating and designing zoning codes and/or visualizing impact of proposed amendments to existing zoning codes.

Background

Most developed municipalities in the world use zoning to regulate land use. To implement zoning, municipalities enact regulations called zoning codes. Various types of zoning codes are used by municipalities to regulate urban design, planning and development.

In one type of code, called a form-based code, each property is allocated within a specified density zone. Density zones are included on a zoning map, which has colorized representations of each specified density zone. Density zones may be affected by surroundings in municipalities, including, but not limited to, public transit systems, historic preservation sites, and various types of civic uses.

Model form-based codes, such as the SmartCode developed by Duany Plater Zyberk & Company, are frequently adopted by municipalities to create neighborhoods that incorporate character and reflect community vision. In using these types of codes, once the allocation of property is complete, the code is often manually referenced by real-estate professionals to assess density capacity. If necessary, a developer may increase density capacity after consideration of several factors, like bonuses or incentives, which are codified in the zoning code.

Another important type of zoning code is single-use or "Euclidean" zoning, in which every day uses are separated from each other, and land with similar uses is grouped together. This is a common type of zoning code that exists in multiple cities around the world, however most of those cities are moving towards replacing these codes with form-based codes or other mixed-use alternatives.

Real-estate professionals may then determine building criteria in accordance with the municipality's zoning code. For example, a real-estate professional may choose to consider various massing configurations, heights, uses, parking options and layouts. After the criteria are determined, the real-estate professional will typically continue with a lengthy and costly process of analysis and design to determine the real development capacity for a site or target area. Only then will the real-estate professional submit a permit application to the municipality, requesting review and approval. The municipality then engages in a similar process to assess whether the developer is in compliance with the zoning code.

While this process is suitable for some, many real-estate professionals find manual reference to zoning codes time-consuming and frustrating, particularly real-estate professionals seeking to assess alternative criteria or investment due diligence. Instead of seeking one set of criteria for development, real-estate professionals may want to try alternative uses, densities, building configurations, incentives, etc. In addition, municipalities may also find manual reference to zoning codes particularly frustrating, upon reviewing multiple criteria and interpretations submitted by real-estate professionals.

U. S. Patent Application Publication No. 2011/0055091 to Budlong discloses a system and method for transforming real estate data and municipal codes and zoning rules into usable data for non-land use experts. Similarly, U. S. Patent No. 2009/0125283 to Conover discloses a method and apparatus for automatically determining compliance with building regulations.

However, there is a significant difference between determining zoning allowances and calculating the actual capacity of a lot, assemblage of lots or geographical area, permitted by the combination of all regulations and limitations in zoning codes. In most instances, the actual development or density capacity is significantly different from the general zoning allowances.

Actual development capacity entails volumetric analysis of zoning regulations in addition to real world limitations that may or may not be included in zoning codes. This includes, but is not limited to, parking, access and circulation, volumetric requirements, environmental constraints (such as FAA height restrictions, flood levels, etc.), access to transportation, legal easements, historical designations and other factors.

Building capacity is extremely important to developers, architects, governments and planners, because it provides the necessary context for understanding the impact that development of the lot, assemblage of lots or geographical area will have to important metrics, such as building costs, taxable values, demographics and infrastructure services.

As such, there is a clear need for methods and systems which seek to relieve the frequent frustrations, impediments and time consuming processes encountered by municipalities and real-estate professionals in determining actual density capacity and/or development potential of a site or area. There is a further need for methods and systems that consider all applicable limitations on a specific site to calculate an actual capacity (and not just the allowed capacity under the code) available for use on the site, including clear analytics and charts.

SUMMARY OF THE INVENTION

The present invention is directed toward methods and systems for determining actual density capacity and/or development potential on the basis of the site specific zoning code regulations and real-world site specific conditions and limitations, with uses and other parameters desired by the real-estate professional (i.e., a developer, architect, city worker who uses zoning in their job, government planner, etc.). The invention, therefore, seeks to overcome frustrations and alleviate other impediments that affect efficient analysis of density capacity and/or development potential of a site or area of interest.

In a first aspect, a computer-implemented system for determining actual density capacity and/or development potential based on analysis of the zoning code and site-specific factors includes at least one input interface for receiving property information; at least one computer program, stored in non-transitory computer memory and executed by a processor of the computer, is configured to calculate zoning code criteria and assess actual density capacity and/or development potential based on the specific zoning code, regulations and other limitations, using the property information; and at least one output interface for displaying the resulting assessment information. In one particularly preferred embodiment, a geographical information system (GIS) is accessed by the computer, under direction from the at least one computer program to look at conditions for an actual geographic site under investigation.

In a second aspect, a computer program for determining zoning code compliance and/or development potential based on the zoning code applicable to a particular site includes a computer-usable non-transitory storage medium having computer readable program code executed by a processor of a computer for (A) entering, by way of human intervention or GIS, lot information for a property; (B) calculating parameters specified by the zoning code based upon the entered lot information; (C) determining whether the calculated parameters are in compliance with zoning code parameters; and (D) outputting whether the calculated parameters are in compliance with zoning code regulations and site specific limitations.

And, in a third aspect, a computer-implemented method of determining zoning code compliance and/or development potential includes inputting property information into a computer-implemented interface; calculating parameters specified in a zoning code; assessing data particular to the site in view of the zoning code applicable to the site to calculate an actual capacity of a lot; and then outputting the results via an output interface i.e., a report provided using a computer-implemented interface.

BRIEF DESCRIPTION OF THE DRAWINGS

The drawings described herein are for illustrative purposes only and are not intended to limit the scope of the present disclosure. In the drawings:

FIGS. 2-3 show interface examples that could be used by a municipality;

FIGS. 4-9 show interface examples that could be used by a real-estate professional and, in particular, a property developer;

FIG. 10 shows an interface example that could be used by a real estate professional and, in particular, a community developer;

FIGS. 11-14 show calibration tables, which could be customized based upon municipality specific information and zoning codes;

FIG. 15 shows interface examples for Lot Density/Type Compliance in a web based application;

FIG. 16 shows interface examples for Lot Use/Configuration Compliance in a web based application.

FIGS. 17-21 show interfaces of customized and calibrated version of the system for an implemented Zoning Compliance System for a municipality;

FIGS. 29A-29K are one example of a report generated in accordance with one particular embodiment of the invention;

FIGS. 32-38 illustrate exemplary input interfaces or GUIs that can be provided to permit selections for the foregoing options, among others, to be made from various input screens of one particular embodiment of the present invention.

DETAILED DESCRIPTION OF THE PREFERRED EMBODIMENTS

Figure 1:
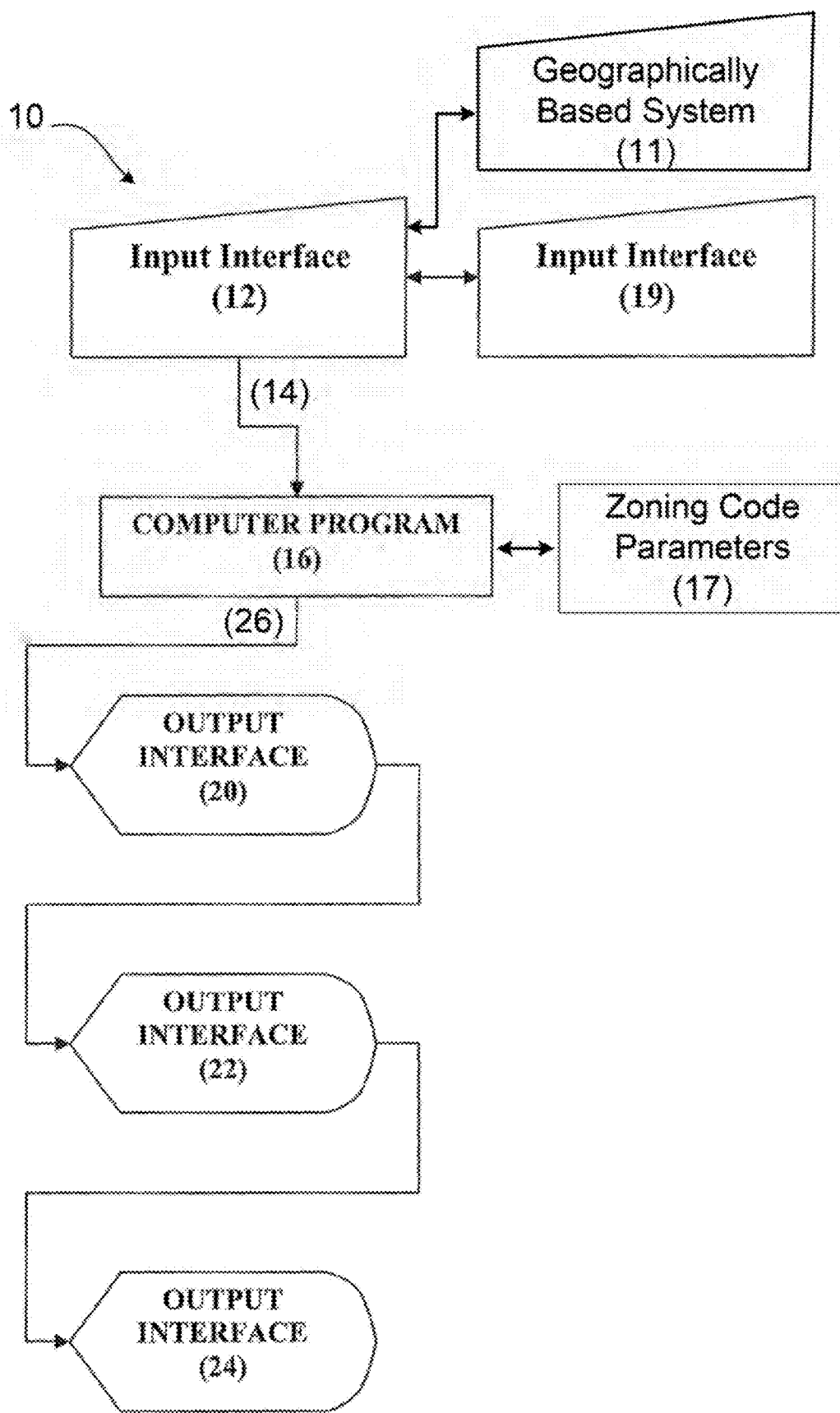
FIG. 1 is a schematic view of a computer-implemented system for determining zoning code compliance and/or the development potential of a particular site based on the zoning code applicable to that site.

Turning in detail to the drawings, FIG. 1 illustrates schematically a computer implemented system 10 for determining at least one of zoning code compliance or the development potential of a particular site using zoning codes applicable to that site. The system 10 can have different interfaces and complexity, depending on the target audience. Where the target audience is a developer who is not familiar with a particular zoning code, the system 10 can use simplified interfaces. The system 10 includes an input interface 12 for receiving property information 14; a computer program 16 (executed on a computer containing the computer program 16) for calculating zoning code criteria 17 and assessing zoning code compliance and development potential, using the property information 14; and output interfaces 20, 22, 24 for displaying the resulting assessments 26.

A user, such as a developer or a municipal employee, will initially input property information 14 into an input interface 12. The input interface 12 is any interface configured for manual or automatic input by an individual or a computer. Types of input interfaces can include: a tactile or virtual keyboard, a mouse, a smart keyboard, a phone keypad, a voice recognition interface or any other interface that allows a user to input property information. Other contemplated input interfaces include Google® Earth, Google® Maps and/or geographic information systems (GIS) or another mapping service. Preferably, the system 10 is configured to extract basic lot information from geographically based sources or systems 11. Users can navigate to a property, using these geographically based systems 11 and link with the system 10 such that all necessary property information is extracted.

The property information 14, includes, but is not limited to, a zoning category, zoning designation or Density Zone specifier, lot width, lot depth, primary right-of-ways (ROW), community type, and property surroundings. The community type may be regional corridor development, traditional neighborhood development, cluster development, or any other community types outlined by the zoning code.

After initial input, the system 10 further includes one or more computer programs 16 or computer-executed codes that calculate zoning code parameters based upon the inputted property information 14. The computer program 16 may be uploaded or downloaded onto any computer or server, using web-based interfaces, computer discs, etc. The program 16 may be pre-loaded with, or have external access to, zoning code parameters 17 for a designated municipality. In one particular embodiment of the invention, zoning code parameters include, but are not limited to, form-based codes, such as those based upon SmartCode version 9.2 or higher, and/or Euclidian codes.

The computer program 16 is configured to utilize the processor to calculate, for example, Zoning designation graphical parameters, lot area, lot allowed density, lot developable units, building disposition, and permitted areas for frontage in accordance with specific methods discussed herein below. In addition, the computer program 16 can have a separate input interface 19 that is linked to outside sources (by wired or wireless communication) to update zoning codes used by the computer program 16 after codification. This allows the program 16 to calculate code parameters in real-time.

Based upon the calculated parameters, the system 10 further provides output interfaces 20, 22 which provide, by display or otherwise, information to the user including assessment 26 of the zoning code compliance. Output interfaces 20, 22 can include, but are not limited to, printers, computer monitors and/or screens coupled to cell phones, tablet devices, etc. A first output interface 20 will display, for example, whether the proposed property information 14 complies with lot density ranges and community types, which are codified with the specified zoning code, and what options may be available in compliance with the specified zoning code. For example, if the inputted property information 14 has a width larger than that required by the zoning code, the program will display if the property may be subdivided, or if the lot area is larger than allowed, so development is not possible. Note that the output interface can be combined with the input interfaces, for example, as illustrated in FIGS. 25-27B and 38-40.

A second output interface 22 providing a table or other suitable graphical representation, is presented to the user. Preferably, the graphical representation has an appearance, which is similar to a generic page within the written zoning code. The interface 22 may, however, be customized by a developer or a municipality for demonstration and marketing purposes, among other things. Preferably, the second output interface 22 does not include densities, mix of uses, lot coverages, building setbacks, etc. However, the second output interface 22 does include additional information related to the property site and density zone, such as maximum building height and lot coverage. This second interface 22 further refines the initial information displayed in the first output interface 20. Moreover, in this interface 22, a user may test several mixes of uses such as commercial, lodging, retail, and residential. And, in this interface, a user may optionally "test" additional options such as the addition of a parking structure or nearby area for parking.

Optionally, for larger property sites, the system 10 may include a third output interface 24 generated using additional computer software 16 or computer executed code. The additional software or computer-executed code is configured to determine proposals for re-zoning a property, using different mixtures of zoning densities, open spaces, and infrastructure areas. Each density zone will display, for example, an estimated number of dwelling units based on the allowed density within each zone. Note that the first, second and third output interfaces 20, 22, 24 may be presented to the user on the same or different physical devices (i.e., on the same display or printer, or different displays or printers), as desired.

FIGS. 2-14 show various images of a first embodiment of a system using a spread sheet application. Types of suitable spreadsheet applications include Microsoft® Excel, iWork® Numbers, and Quattro Pro, among others. The system may, however, be implemented using any type of computer-based application, including custom applications and APIs, as will be discussed below.

Figure 2:
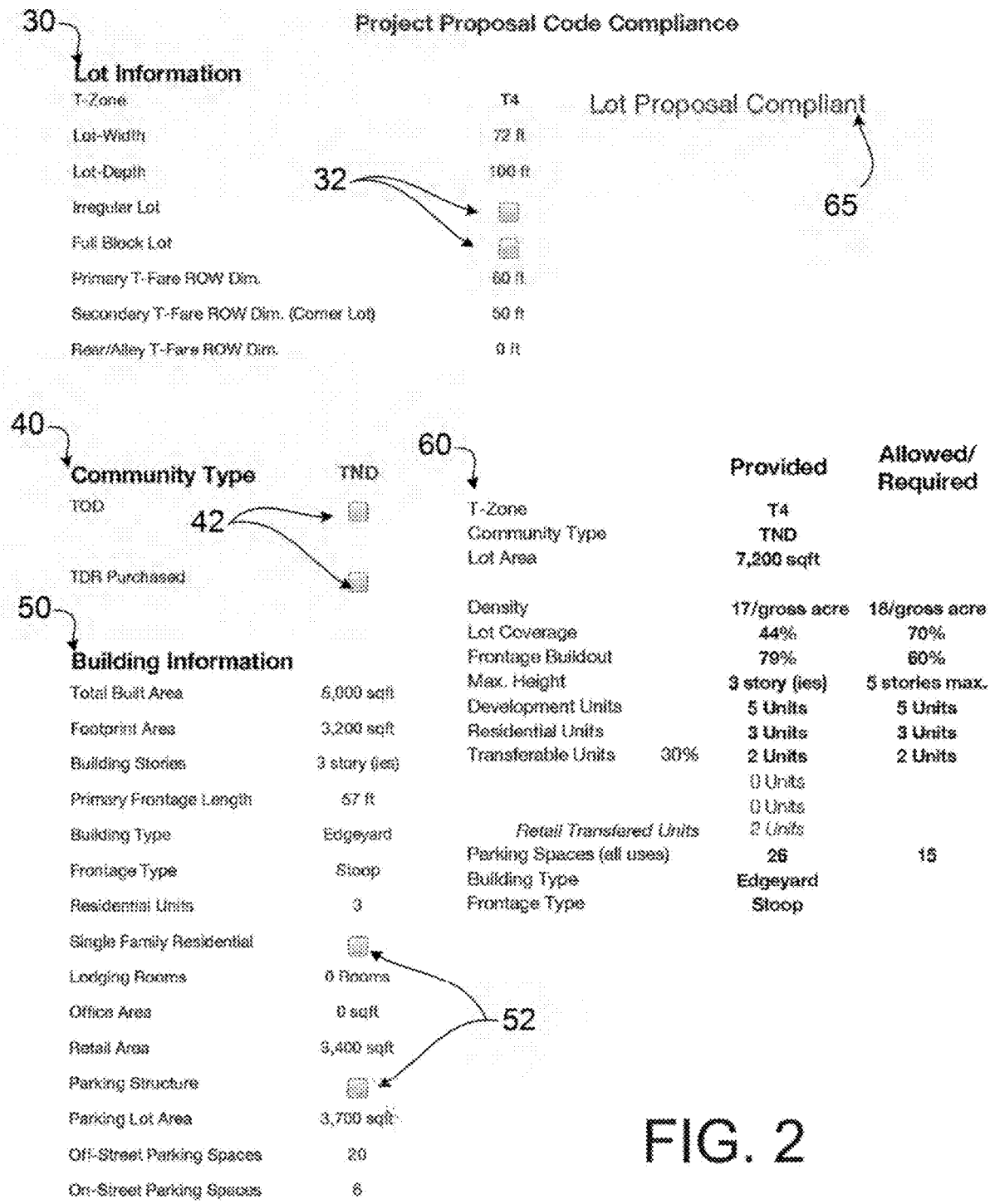
Figure 7:
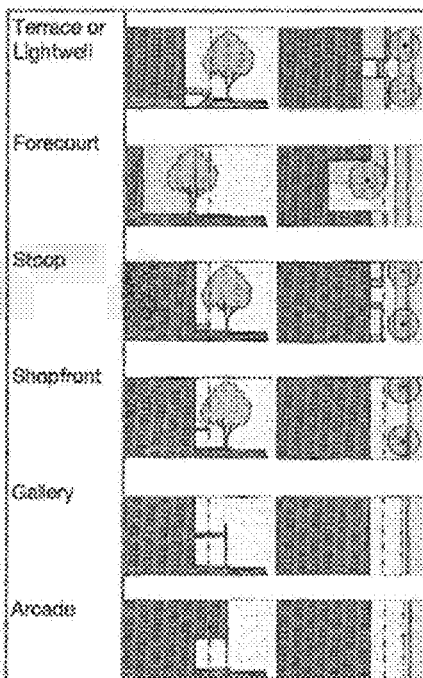
Figure 9:
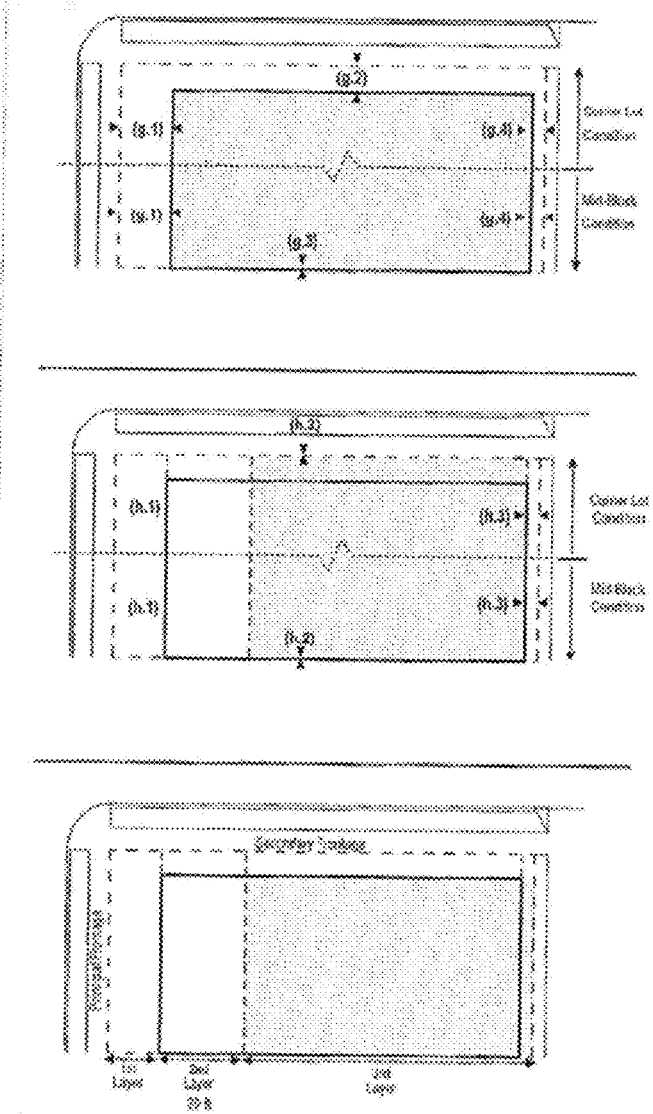

More particularly, FIGS. 2-3 show output interfaces that would be seen by a user, such as a city employee or real-estate professional. In this example, the employee would enter, manually and/or by electronic data transfer from a source of geographical data, all of the specific parameters required for a permit application. After input, the system would indicate in real-time whether or not the parameters are in compliance with the codified zoning code. If the parameters are non-compliant, then the system will be configured to display the reason(s) for non-compliance and whether the parameters could be modified upon application of a variance. Additionally, system 10 can include a warning system that alerts the user of potential issues that may result in a development that is not compliant with the regulations.

Referring now to FIGS. 1 and 2, FIG. 2 shows exemplary interfaces that could be used by a municipality. The left side of FIG. 2 show interfaces displaying inputted property information 14 such as lot information 30, community type 40, and building information 50. In this particular example, the Lot Information Section has areas for zoning designation, lot-width, lot-depth, dimensions for primary right-of-ways, and rear or alley right-of-ways. This section also includes selection boxes or check boxes 32, which allow a user to indicate whether the lot is a full block lot and/or an irregular lot. The Community Type Section 40 of the present example also includes selection boxes 42, which allow a user to indicate whether the community type is a Transit-Oriented Development (TOD) or Transfer of Development Rights ("TDR") Purchased type. The Building Information Section 50 provides an input interface for Total Built Area, Footprint Area, Building Stories, Primary Frontage Length, Building Type, Frontage Type, Residential Units, Lodging Room, Office Area, Retail Area, Parking Lot Area, and the number of Off-Street and On-Street Parking Spaces. This Section also includes selection boxes 52 where a user may input whether the building is Single Family Residential or whether the building includes a Parking Structure. Note that, as an alternative to the selection boxes 32, 42, 52, the information for those entries, and all entries can be imported electronically from a remote geographical information source or provider.

The right side of FIG. 2 provides examples of output interfaces, showing various calculated, pre-determined, or determined parameters 60. In this example, a comparison of information provided and information allowed is shown. Such values, in this example include: zoning category or designation, Community Types, Lot Area, Density, Lot Coverage, Frontage Buildout, Maximum Height, number of developmental, residential, and transferable unity, Parking Spaces (according to all uses), Building Types, and Frontage Type, among others. The top right corner shows an identifier 65, indicating whether the Lot Proposal, based on inputted values, is compliant.

FIG. 3, for example, schematically shows an output interface illustrating types of allowed building dispositions and private frontages. The upper left side of FIG. 3 shows three types of building dispositions 70: a sideyard, a rearyard, and a courtyard. The upper right side of FIG. 3 shows four types of allowed private frontages 80: a terrace or lightwell, a forecourt, a stoop, a shopfront, a gallery, and an arcade. The bottom portion 90 of FIG. 3 shows an example of an output interface, showing Shared Parking Ratios over specified periods of time or specified ratios. Here, times and days of the week are shown in the output interface table 90 based on the type of residential space: lodging, office, and retail.

FIGS. 4-9 show output interfaces (e.g., screens, displays, printouts, etc.) that would be seen by a user, such as a developer or other real-estate professional, or an employee of a developer or other real estate professional. In FIGS. 4-6, the form-based code is density based, and in FIGS. 7-9, the form-based code is FAR (floor area ratio) based or FLR (floor lot ratio). In this example, once a user inputs lot information in an initial input interface, or imports the information from a GIS, they can then "test" the project. Such testing will allow users to further develop their projects in subsequent interfaces.

Each of these examples shows Section of a Lot Density Calculation Worksheet 95. Each example may include a Lot Information Section, Givens Section, or a general Input Area, where a user can input values. These types of input areas may include zoning category or designation, lot-width, lot-depth, dimensions for primary right of ways, rear or alley right-of-ways, Setback Values for Principal and Secondary Buildings (e.g. an outbuilding). One of these sections may also include selection boxes or other yes/no indicator check boxes, which allow a user to indicate whether the lot is a full block lot and/or an irregular lot. A Community Type Section may also be provided, which includes selection boxes, which allow a user to indicate whether the community type is a Transit-Oriented Development (TOD) or Transfer of Development Rights ("TDR") Purchased type. Worksheet sections may further include schematic representations of lot density and/or lot conditions. The latter, for example, can include corner lot conditions, mid-block conditions, and/or proposed frontages. Maximum Lot Capacity Sections can also be configured to show calculated, predetermined, or determined values for lot area, allowed density, and the number of Developable Units. Finally, a Results Section may indicate Lot Calibration Results, summarizing the density allowed and type of unit (e.g. developmental or density), a Suggested Building Layout, and a General Indicator, which states whether or not the Lot Density/Type is compliant. Additionally, a Maximum Lot Capacity 97, which optionally includes maximum parking space capacity 99, is provided. As discussed herein, actual maximum capacity calculated can differ significantly from the maximum allowable capacity under the zoning code, due to environmental and other factors. As such, the actual maximum capacity may be a lower number than the maximum allowable capacity under the zoning code, knowledge of which is important to the real-estate professional when analyzing the development potential of an area of interest.

FIG. 10 shows a community development interface. In this interface, a user, such as a community developer or other real-estate professional, would use the system to analyze certain property yield. The yield could include parameters in terms of units, densities, and open space, among other parameters. In the example shown in FIG. 10, an input area may be provided such that a user may enter Property Area and/or Community Types. Calculation Area/% Reductions Section may be also included based upon the Existing Infrastructure Area and/or percentages of Proposed Preservation, Proposed Infrastructure, and Proposed Civic Space. A separate Indicator may also be used to signal whether or not a Community Unit is compliant. FIG. 10, for example, shows the term "Community Unit Compliant" because the determined values indicate compliance.

FIGS. 11-14 show various types of calibration tables. These tables can be customized by a user based on the specific requirements, laws, etc. of a municipality. Moreover, these tables may be configured to represent databases from which the calculations used in the system are derived. Each of these tables may include data entered into the table relating to Building Configurations, Lot Occupation/Coverage, Setback Configurations, Building Dispositions, Private Frontages, Newly Platted Lots, Infill, Densities, Transferable Building Functions, Transit Overlays, and Civic Zones.

Figure 16:
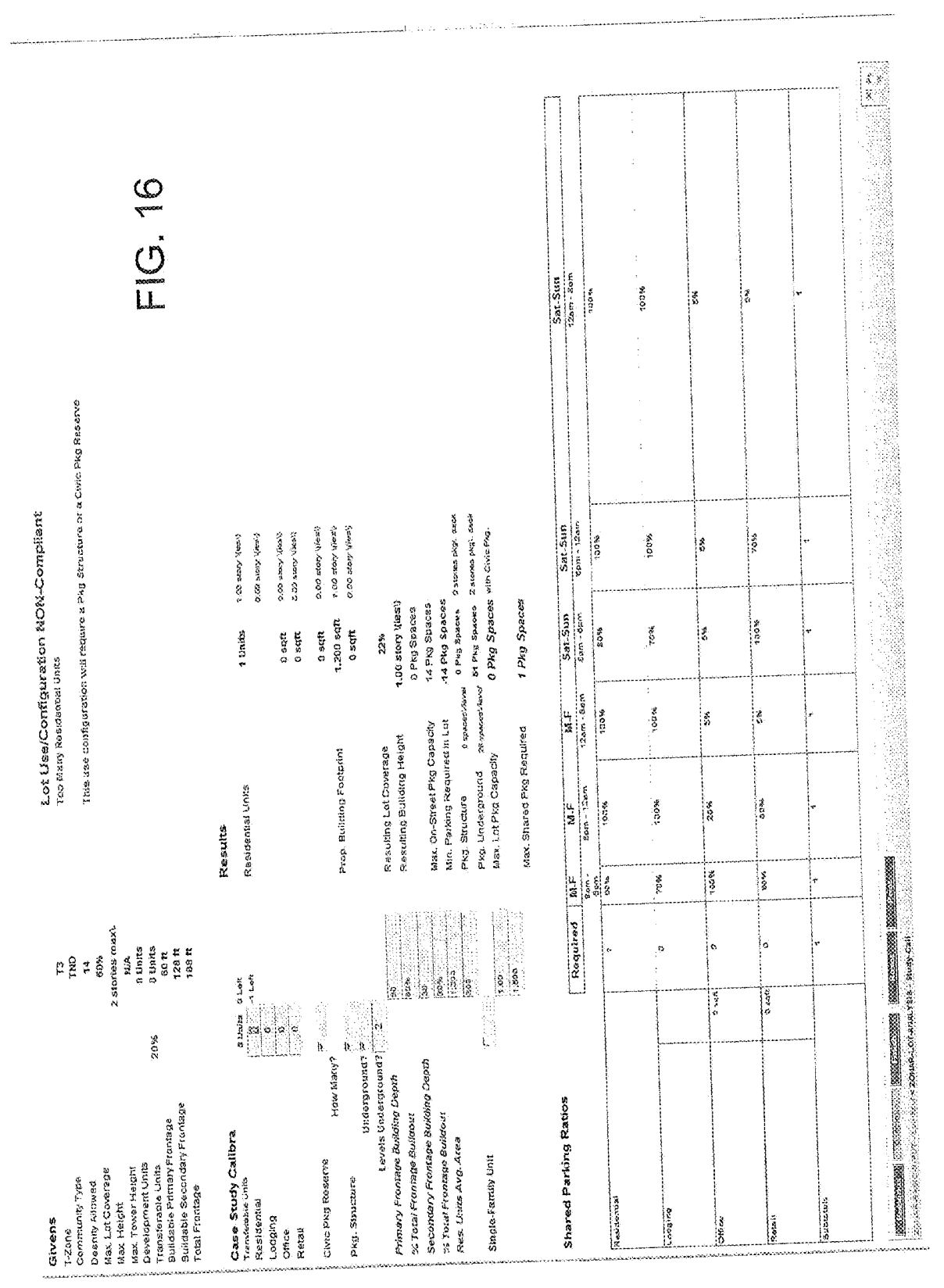

FIGS. 15 and 16 show alternative views of Zoning Compliance software interfaces. FIG. 15 shows interface examples that could be used by a municipality. The left side of FIG. 15 provides input interfaces for property information such as zoning category or designation, lot-width, lot-depth, dimensions for primary and secondary right of ways, and primary and secondary rear or alley right-of-ways. This section also includes selection boxes, which allow a user to indicate whether the lot is a full block lot and/or an irregular lot. The Community Type Section includes selection boxes, which allow a user to indicate whether the community type is a Transit-Oriented Development (TOD) or Transfer of Development Rights ("TDR") Purchased type. If a TOD type is selected an option is included to enter a pre-specified distance to a transit station, for example. The Interfaces shown in FIG. 15 also includes sections for Maximum Lot Capacity, Building Disposition, and Private Frontage, where the latter two sections indicate the type of permitted building disposition and/or private frontage. These interfaces further include indicators, which allow a user to assess whether or not the Lot Density/Type is compliant and how many subdivisions are allowed. A schematic representation of the lot may also be included showing perimeter values, for example.

FIG. 16 shows interface examples to determine whether or not a Lot Use or Configuration is Compliant. This example includes a Givens Section, a Case Study Calibration Section, a Results Section, and a Shared Parking Ratios Section. These interfaces further include indicators, which allow a user to assess whether too many residential units where specified and/or whether the configuration will require one or more parking structures or a reserve for off-site parking.

FIGS. 17-21 show interfaces from an implemented system for determining zoning code compliance or development potential of a site based on the zoning codes applicable to that site. The system implements a code, which sets forth municipally sanctioned standards for specified zones and refers to the municipality's zoning map. The map illustrates designated zones for each property type, which is regulated by the code. In use, the system includes two primary steps for those interested in assessing zoning code compliance or determining development potential of the site. The first step including finding a property to be assessed on the municipality's zoning map. After finding the property on the map, a user would determine the type of zoning that applies to the property. In one particular embodiment, such a determination is made using GIS data for the site obtained electronically and imported into the system. The type of zoning will reflect the zoning regulations that are currently in force in the municipality, including general regulations for each municipal zone, urban standards, and building placement standards.

In using this system, various property parameters are entered by a user. Afterwards, results will indicate whether lot density/type is compliant, as well as indicate possible subdivisions. Lot information is initially input into the system. Such information includes zoning category or designation, lot-width, lot-depth, types of abutting side and rear zones, and right of way dimensions. Selection boxes are also included for a user to indicate whether there is more than one frontage, whether an alley is accessible to the lot. Additional location variables may also be input into the system and include an indication of density increase areas, established setbacks, and distances to TOD's and transit stations. Additional customized options may also be included, depending on the municipality's specifications and include, but are not limited to indications of building certifications and participation in affordable public housing programs. Schematic representations may be included, as shown in FIG. 17, as well as Compliance Indicators. Implemented systems can also include more detailed interfaces having Maximum Lot Capacity, Building Function: Use, and Private Frontage Permitted Sections.

Figure 18:
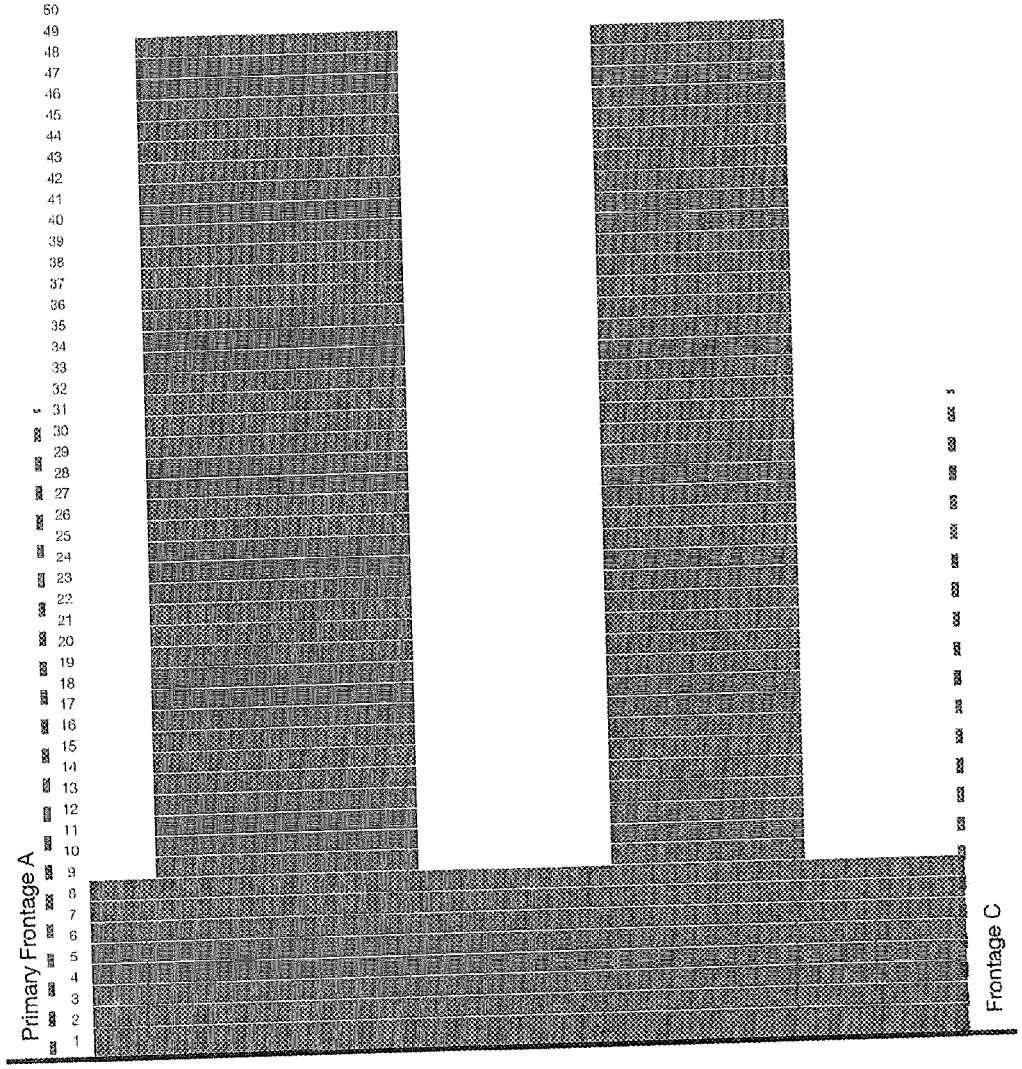

FIG. 18 is a graphical representation of a possible building section/elevation based on code determined setbacks, lot coverage, maximum heights, maximum number of high-rise towers allowed, and maximum footprints.

FIG. 19 shows interfaces for determining whether a Lot Use/Configuration is compliant. Here, a Givens Section is shown including parameters relating to zoning category or designation, new lot area, lot area acreage, allowed density, DU density (Dwelling Units), FLR, Building heights, footprint, allowed areas, maximum community heights, maximum office heights, maximum assembly eating, and maximum liner building areas. Furthermore, the user could test different mixes of uses, such as number of DU, average area of each DU, amount of lodging units, average area of lodging units, commercial area, office area, and parking structure alternatives.

Figure 20:
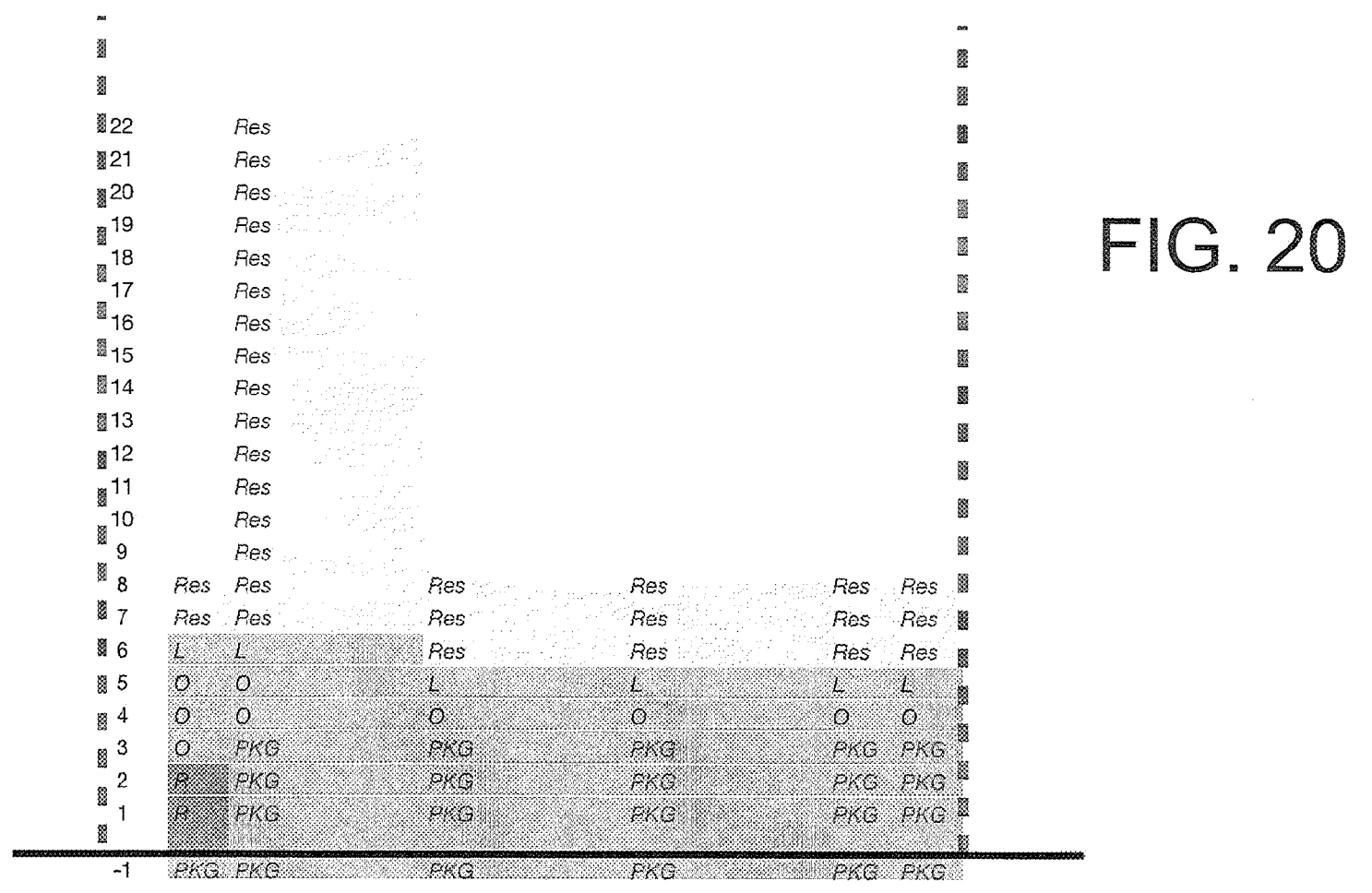
Figure 21:
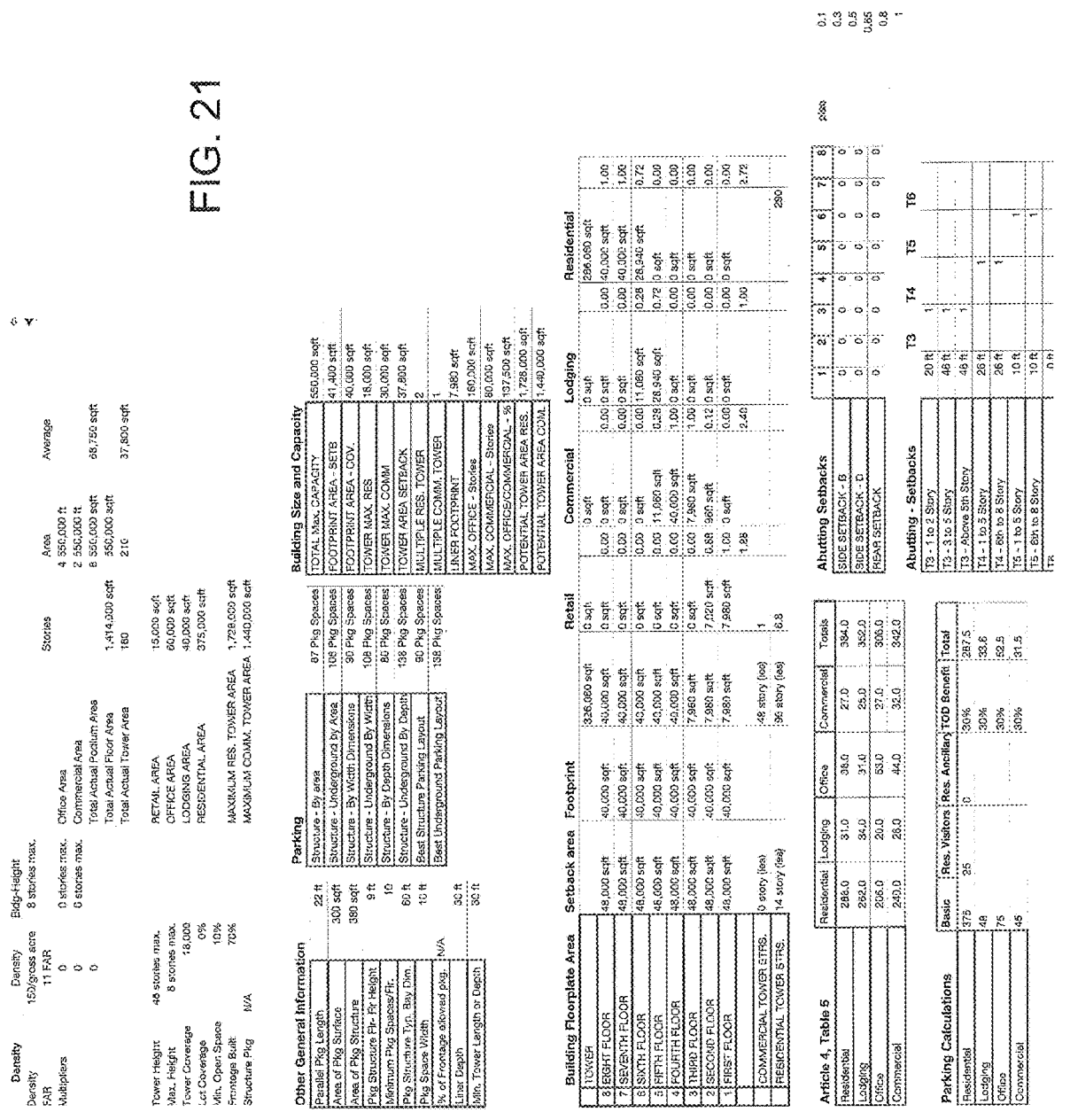

FIG. 20 is a graphical representation of the resulting possible building section based on all the given parameters, and on the input parameters selected by the user. This diagram depicts typical location of uses according to best practices standards (Commercial goes on ground level, Office goes above Commercial, Lodging goes below private residences, and Private Residences goes above all other uses.), also the parking structure required to meet the needs of the selected uses, and the repercussion it will have on the building use distribution. FIG. 21 depicts some of the calibration tables of standard and modifiable parameters, information which affect most of the calculations. Some of these parameters are, typical parking spot dimensions, minimum and maximum liner building dimensions, and maximum and minimum high-rise tower footprints.

Referring back to FIG. 1, there will now be described another particular embodiment of the system 10. More particularly, in one particular embodiment of the invention, the system 10 will be used to determine the zoning limitations for a specific site. In the present embodiment, the conditions of an actual site to be evaluated will be obtained, preferably, by GIS. To this end, a user can take a computer, smartphone, tablet or other device (i.e., the local device) to the specific site and, utilizing wireless communication, access a geographical information source to obtain GIS data for the site. The local device can be executing the computer program 16 locally, or computer program 16 can be executed on a remote computer or server in communication with the local device. For example, the system of the present invention can be accessed in known ways, including, but not limited to access via mobile application (i.e., mobile App), Website application, or application program interface (API), so that users can ingest information in their own in-house applications or through $3^{rd}$ party applications. In one particular embodiment, the system 10 is embodied as an API based service providing results based on predetermined presets based on Folio Number, Address or Building ID. Such an API would give the user the ability to automatically electronically retrieve information pertinent to the specific site from public data sources and provide the results of multiple calculations.

The system 10 is configured to work with all zoning parameters for a specific site identified by manual entry of the Folio Number, Address or Building ID for the site, by GPS location, or by other identification manually or automatically determining the location. Among the site specific conditions the system 10 is configured to address are frontages, abutting lots, dimensions, elevation changes, custom location variables, etc. Other zoning parameters addressed by the system 10 include, but are not limited to:

Land Assemblages;
Multiple Frontages;
Frontage towards waterfronts, beaches, civic spaces and more;
Abutting lot limitations;
Lot dimension and area limitations;
Lot coverage and minimum open space requirements;
Eco-friendly certifications, such as LEED certifications;
Brownfield re-development bonuses;
Transfer of Development Rights (TDR);
Available bonuses;
Special area plans;
Overlay districts;
Site specific variances;
Multimodal parking regulations, minimums and maximums;
Shared parking reductions;
Off-Street Parking Benefits;
Distance to Transit Oriented Development (TOD);
Transit Oriented Development (TOD) bonuses; and
Selected parking structure types (i.e., regular, angled, parallel, robotic, etc.).

In particular, the user of the system 10 (i.e., the real-estate professional, such as a developer, architect, municipal worker, etc.) can easily enter and/or adjust the settings for a particular site of interest, or even experiment with a hypothetical site in order to get an idea of a property to look for, using input interfaces (in the present case, graphical user interfaces (GUIs) on the screen of an electronic computing device, such as a tablet, computer or smartphone). Illustrative examples of input interfaces used in one particular embodiment of the invention are provided in FIGS. 25-28.

Figure 25:
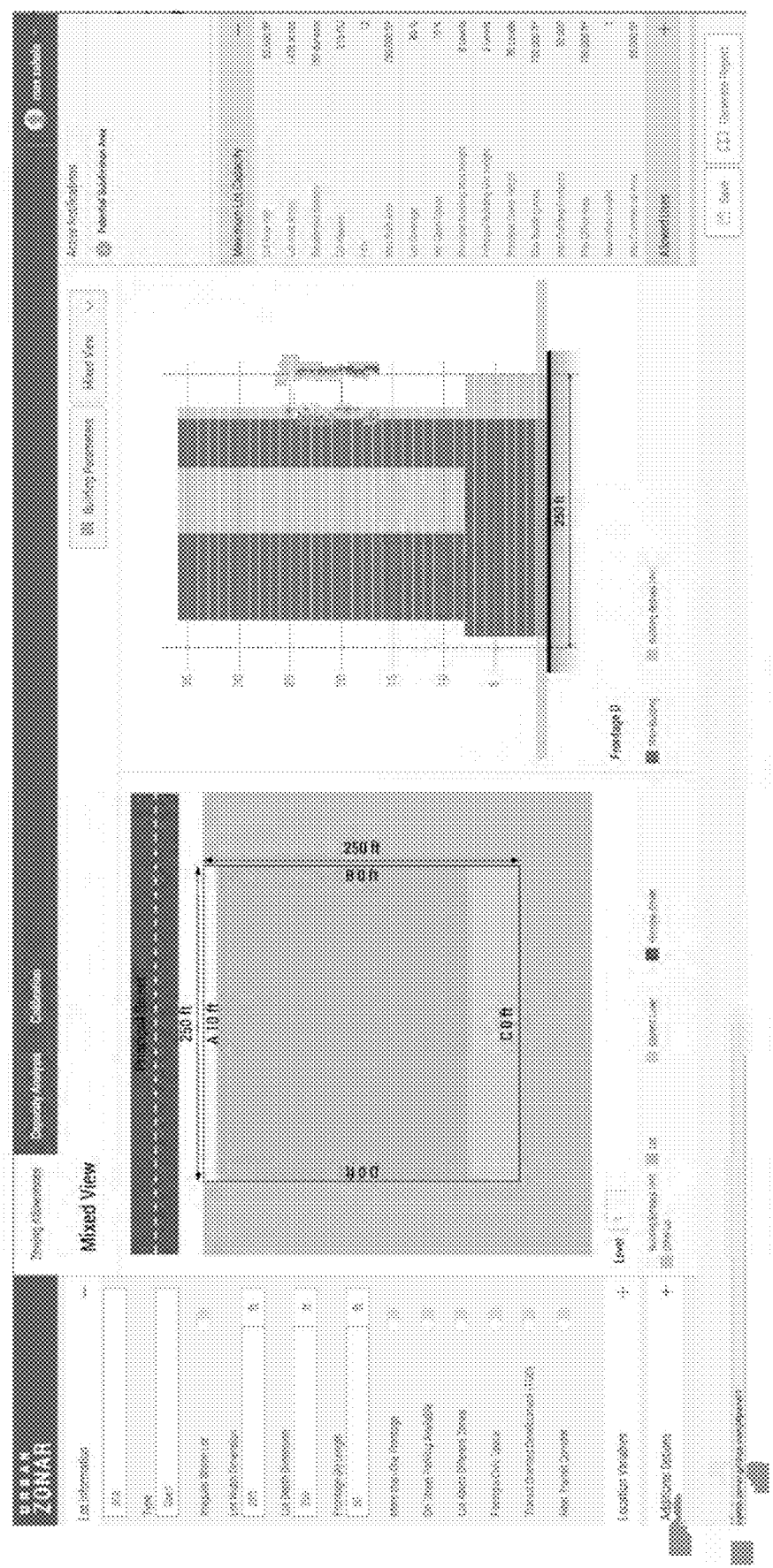
FIGS. 25-28 show exemplary online interfaces useful with one particular embodiment of the invention, including an online interface in which zoning allowances are displayed, capacity analysis is displayed, calibration pages are illustrated that can be used to calibrate zoning codes, and a modules page where custom modules may be calibrated.
Figure 26:
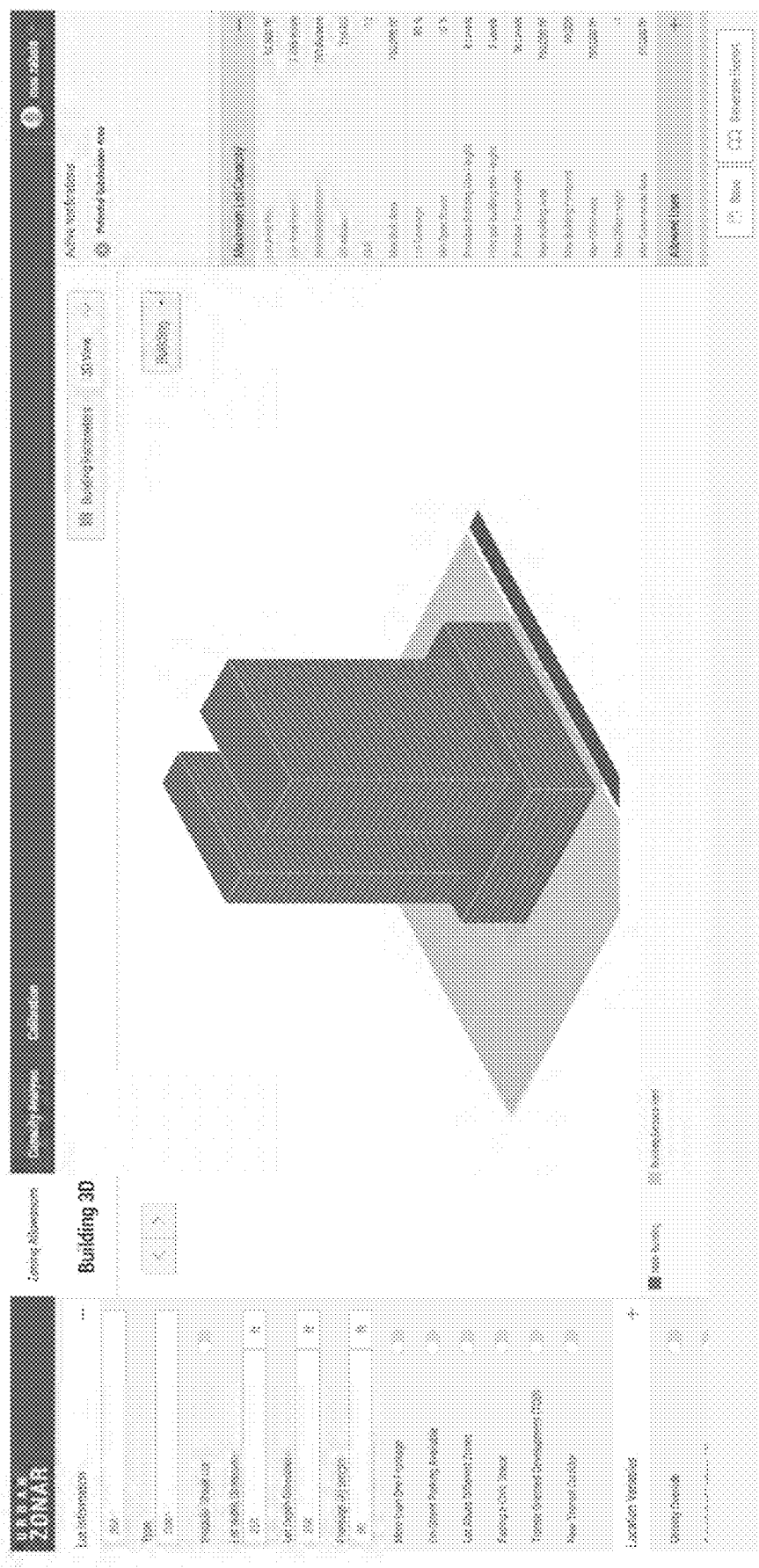

More particularly, FIGS. 25 and 26 show screen shots of an exemplary input interface or GUI in which the user adjusts the calibration for a site of interest to determine zoning allowances, i.e., to generate, in real time, a building envelope allowable under the zoning code (i.e., a code compliant building). In the present preferred embodiments, the building envelope generated in this step sets the maximum values allowable under the zoning code, absent a zoning overlay in conflict with, and taking precedence over, the generally applicable zoning code. Additionally, changes to the zoning allowances can be effectuated in real time by making changes via the input interface. In the present example, the dimensions of a lot, the frontages, the applicable zoning code and type, among other things, can be selected for use in generating a view of allowances under the selected zoning code. Additionally, sliders can be provided on the left that can be adjusted using a pointing device such as a mouse, or, on a touchscreen, a stylus or finger of the user, to adjust the parameters for a building on a particular site of interest. Results for adjustments made on the left are illustrated on the right of the screen and are updated in real time, as is the 3D illustration of the building.

Figure 27A:
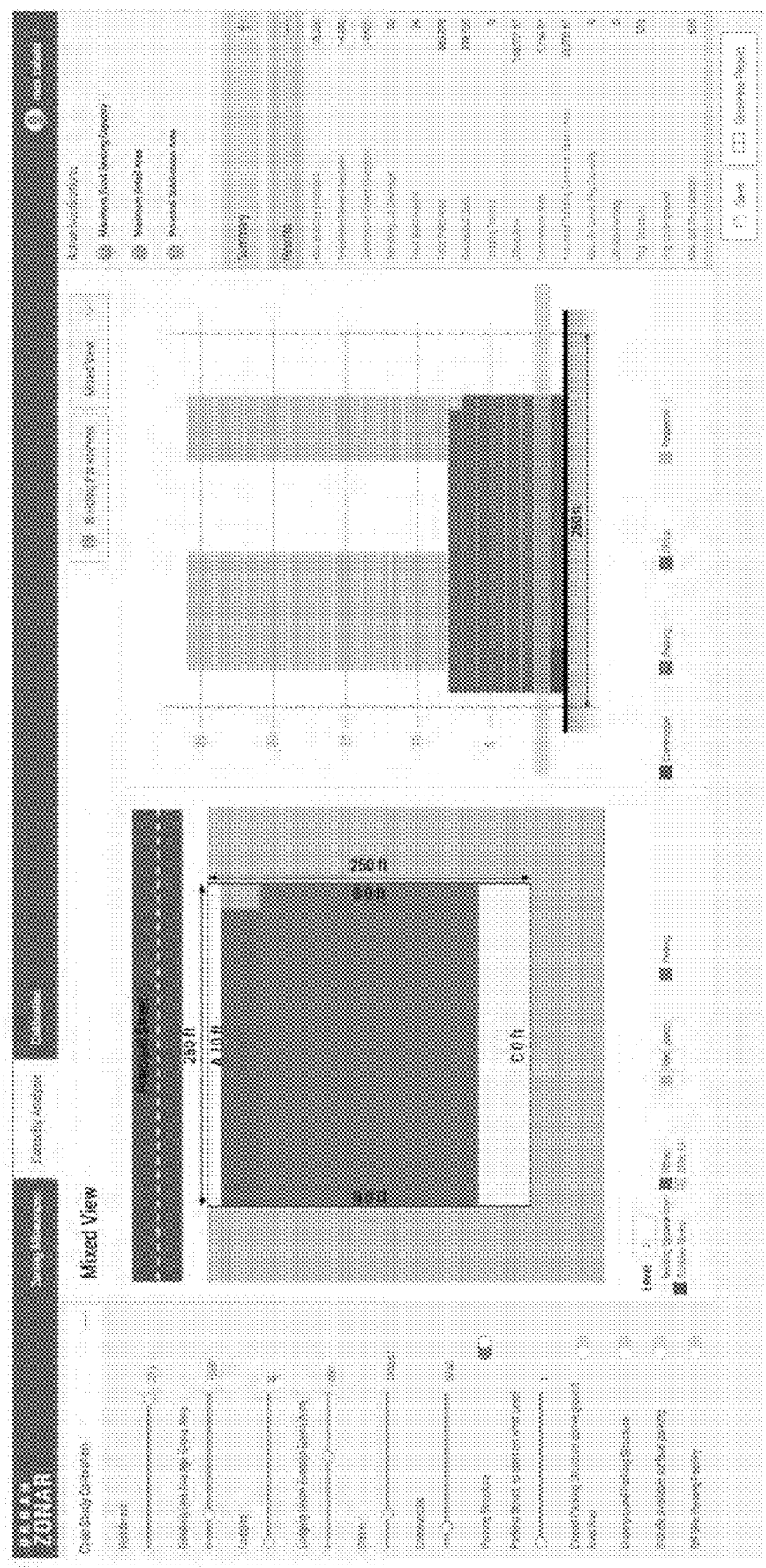
Figure 27B:
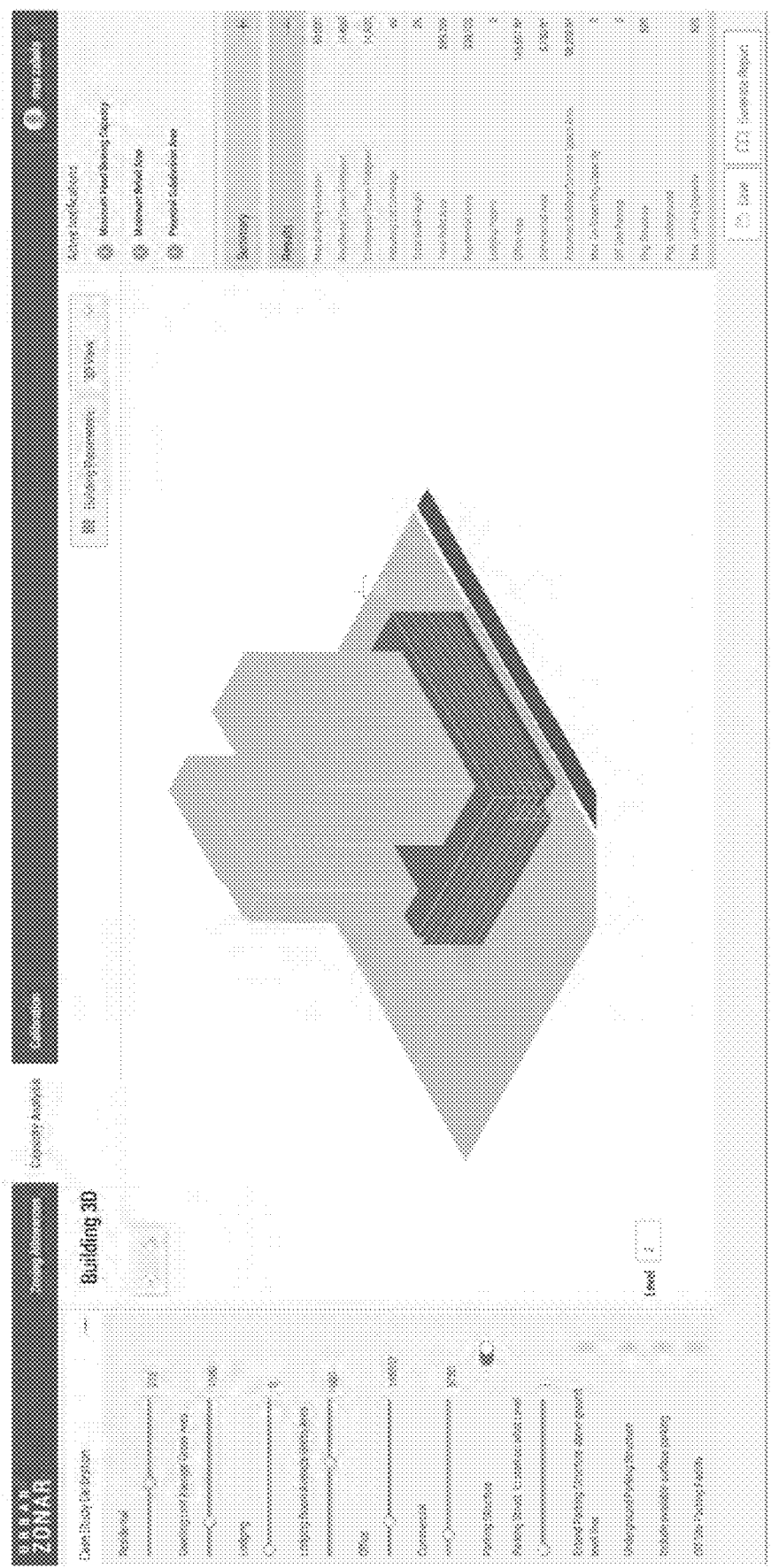

FIGS. 27A and 27B illustrate exemplary input interfaces or GUIs used for calculating and/or modifying, in real time, the actual capacity available for a site entered in the input interface of FIG. 25. As with the input interfaces of FIGS. 25 and 26, FIG. 27 includes sliders and radio buttons (left side) actionable by the user to adjust certain parameters of a site in order to find the actual density capacity results (right side) available for the site, in real time.

Figure 28:

FIG. 28 illustrates one exemplary input interface of GUI useful in making adjustments to the calibration applied to the system. For example, a municipality or architect can adjust or tweak the preset zoning regulations and overlays programmed as modules in the system to see how code changes or changes in other factors would affect the density capacity for a site entered in FIG. 25. This can be informative regarding future changes made or variances obtained in the zoning regulations or other factors that affect a site. In the particular example, the GUI of FIG. 28 is being used to change preset values in the module for parcel zoning T6-12-R, to see what effect these changes would have on the actual density capacity possible for the site.

Figure 41:
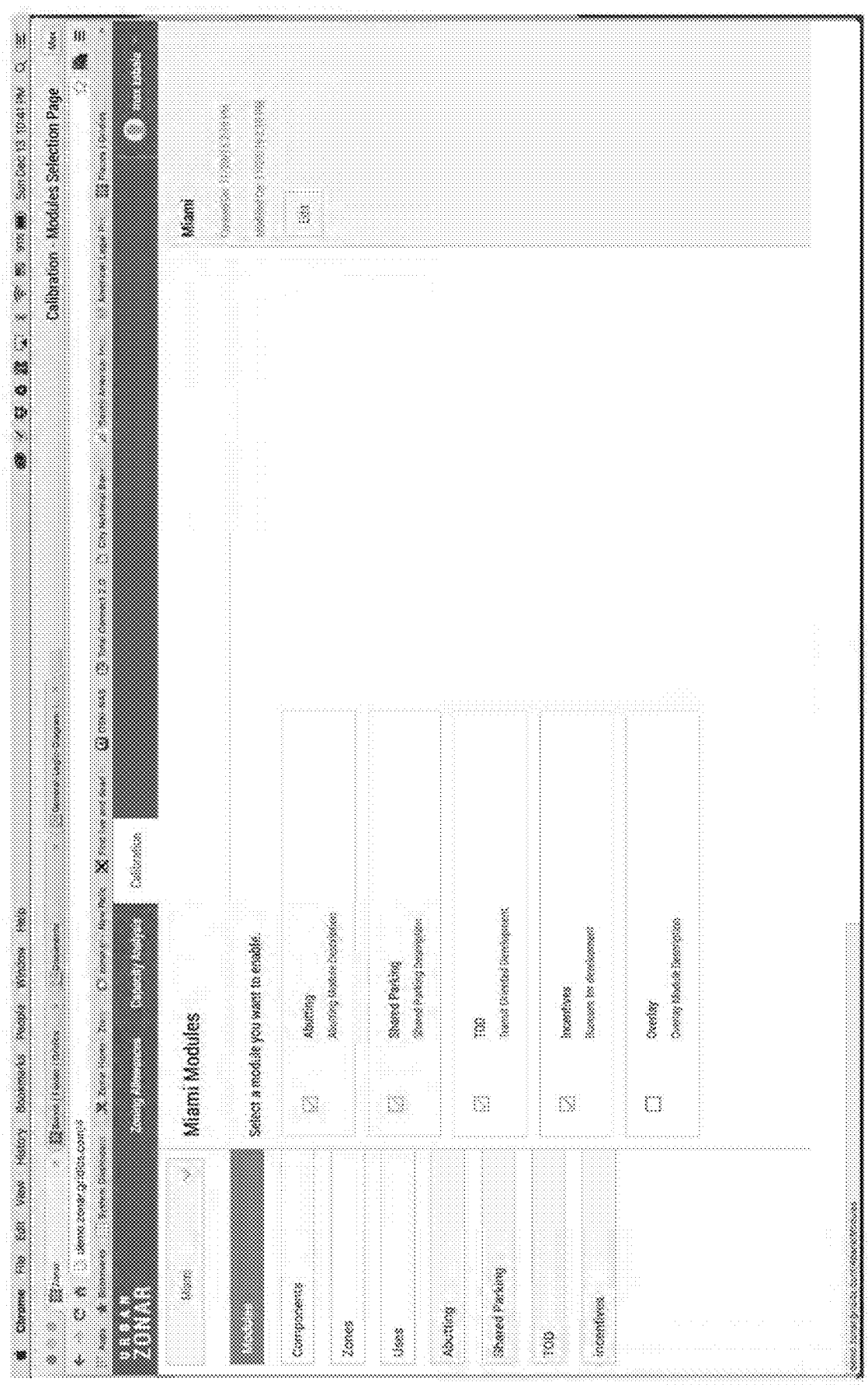
Figure 42:
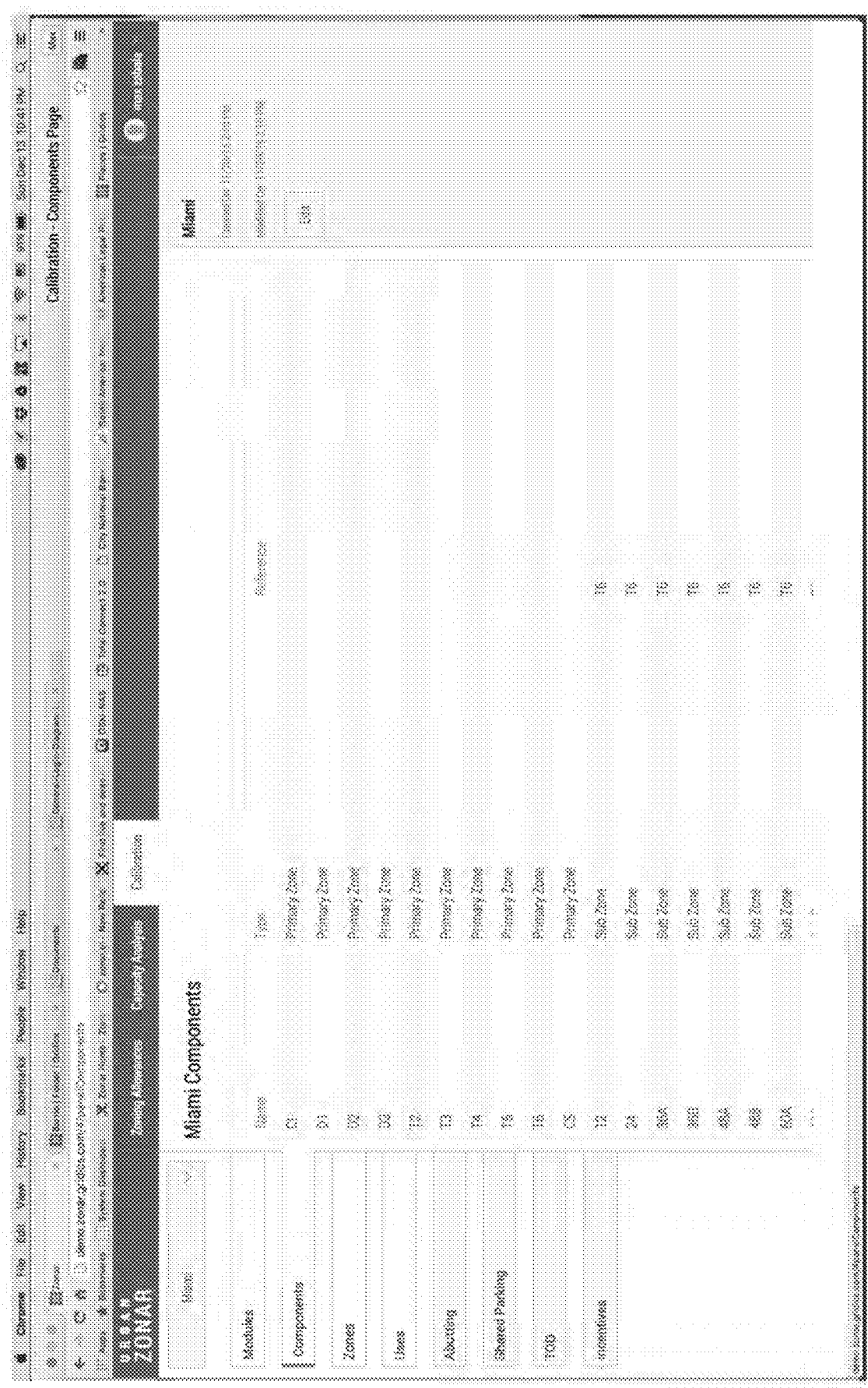
Figure 43:
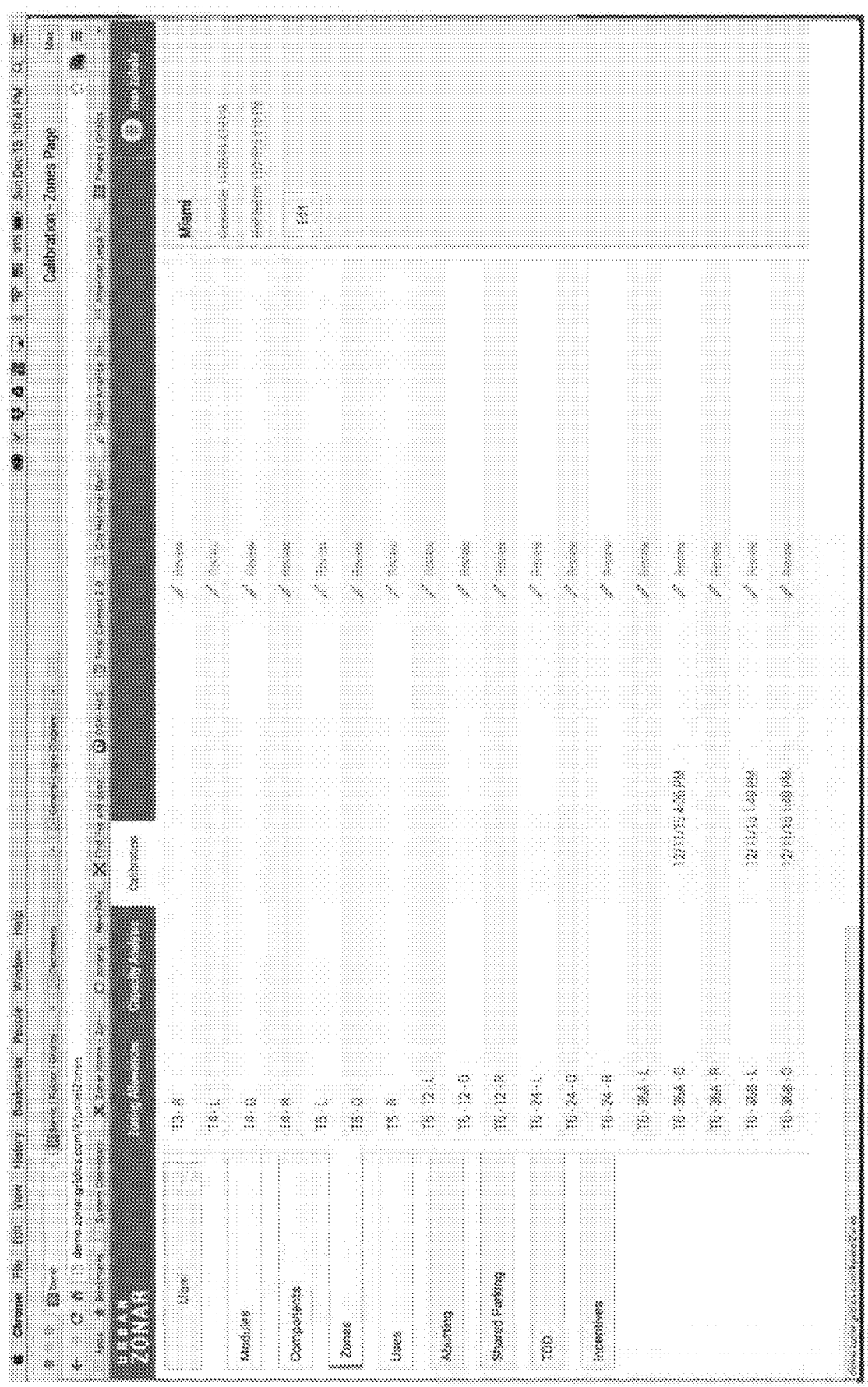
Figure 44:
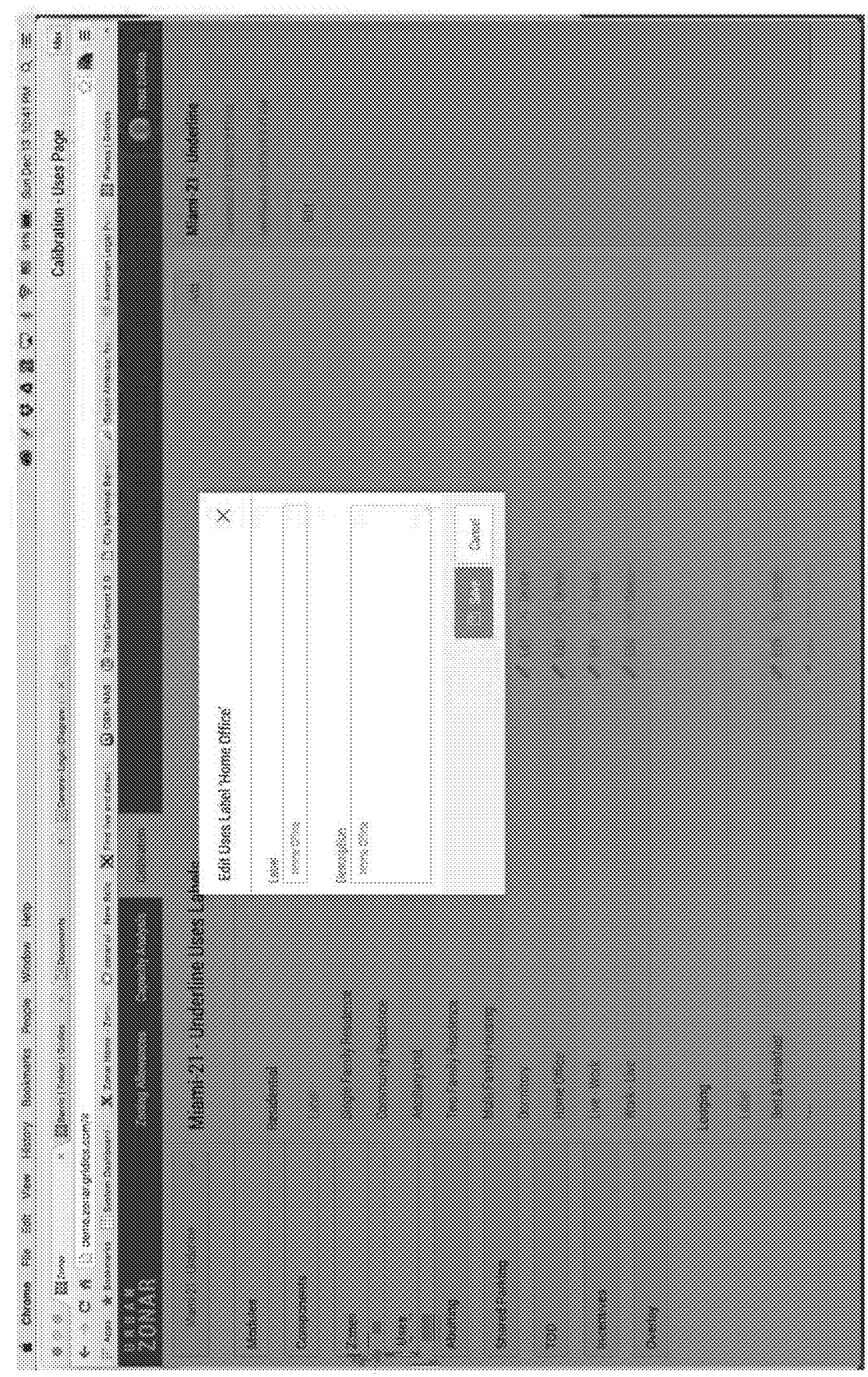
Figure 45:
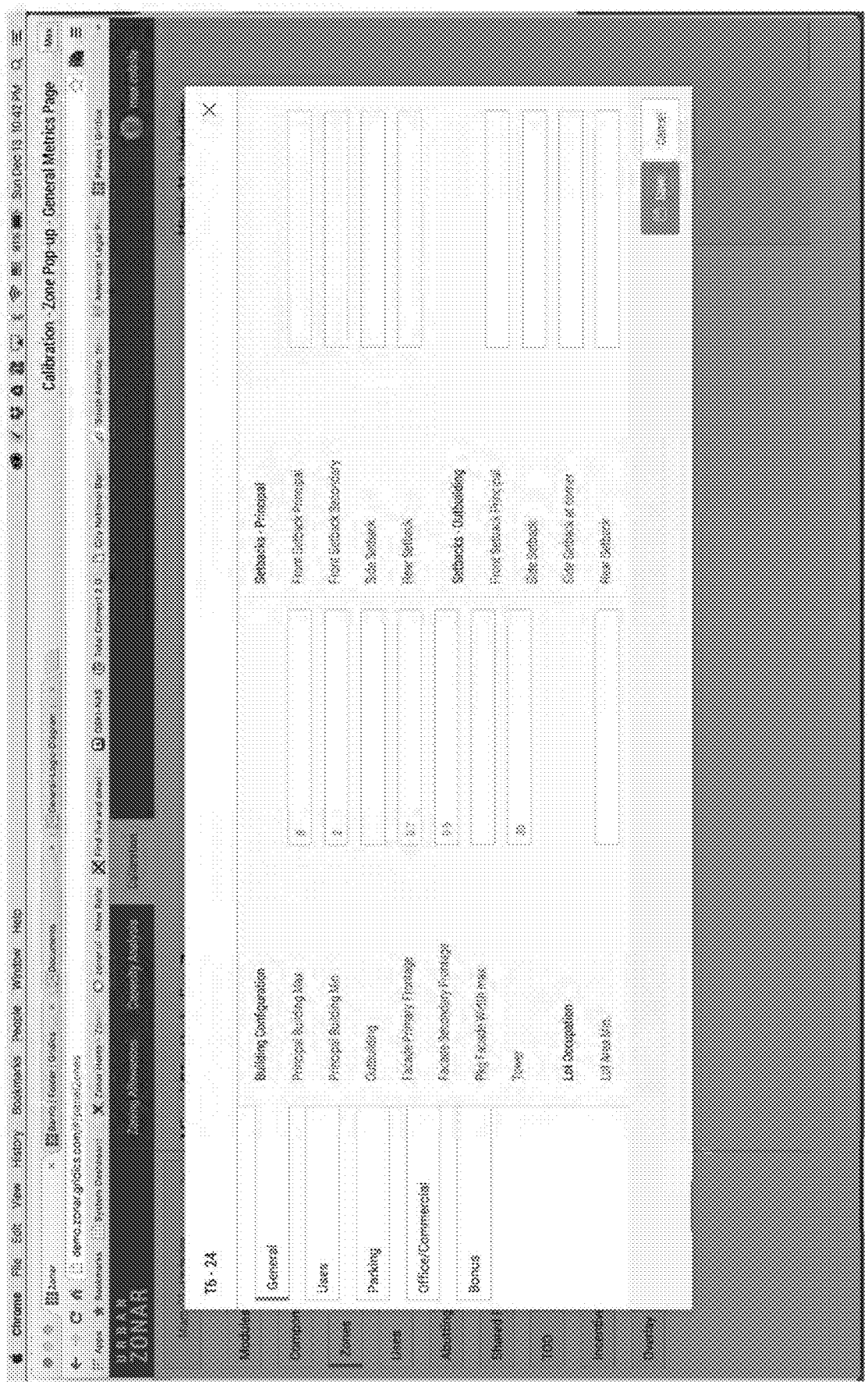
Figure 46:
Figure 47:
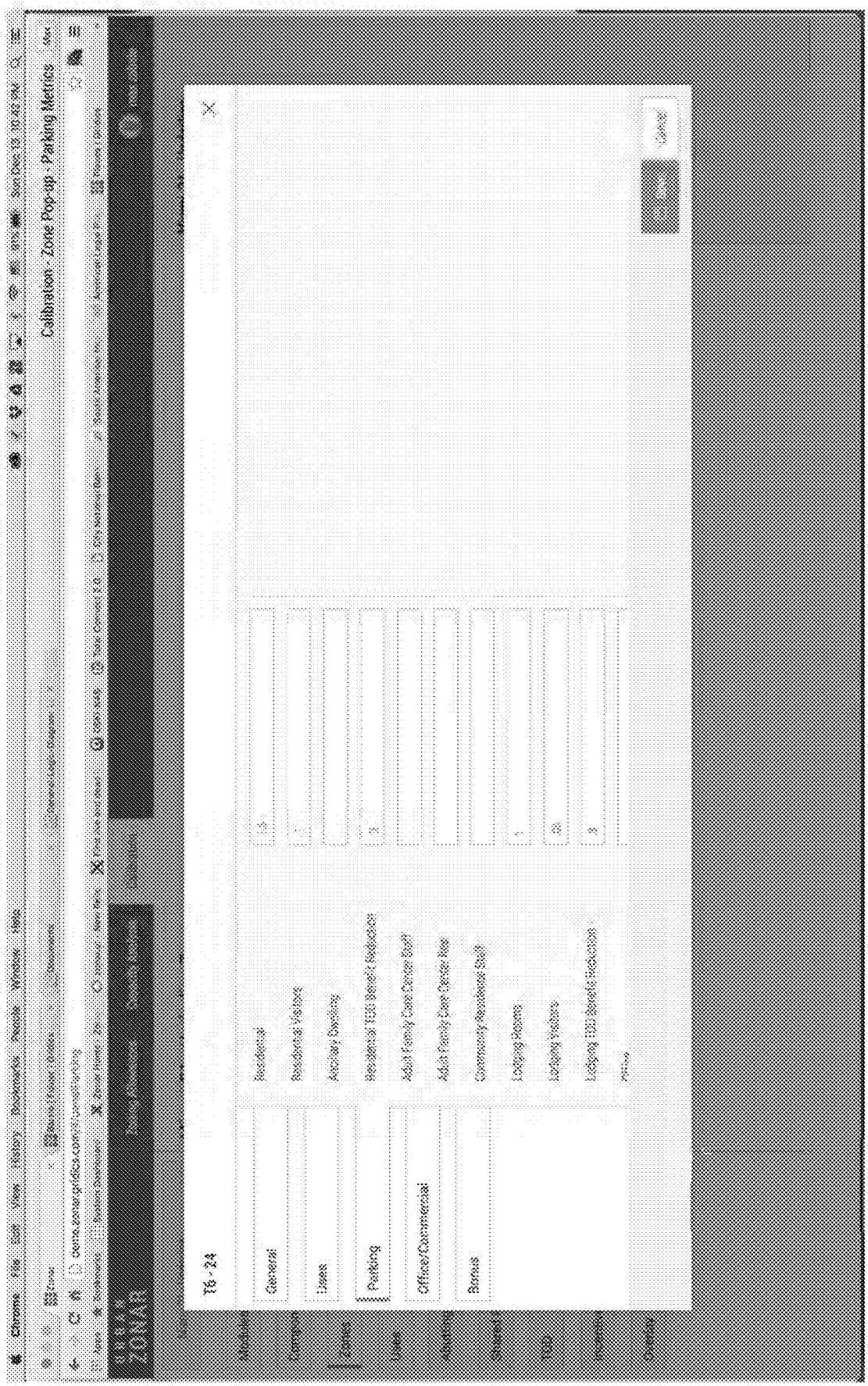
Figure 48:
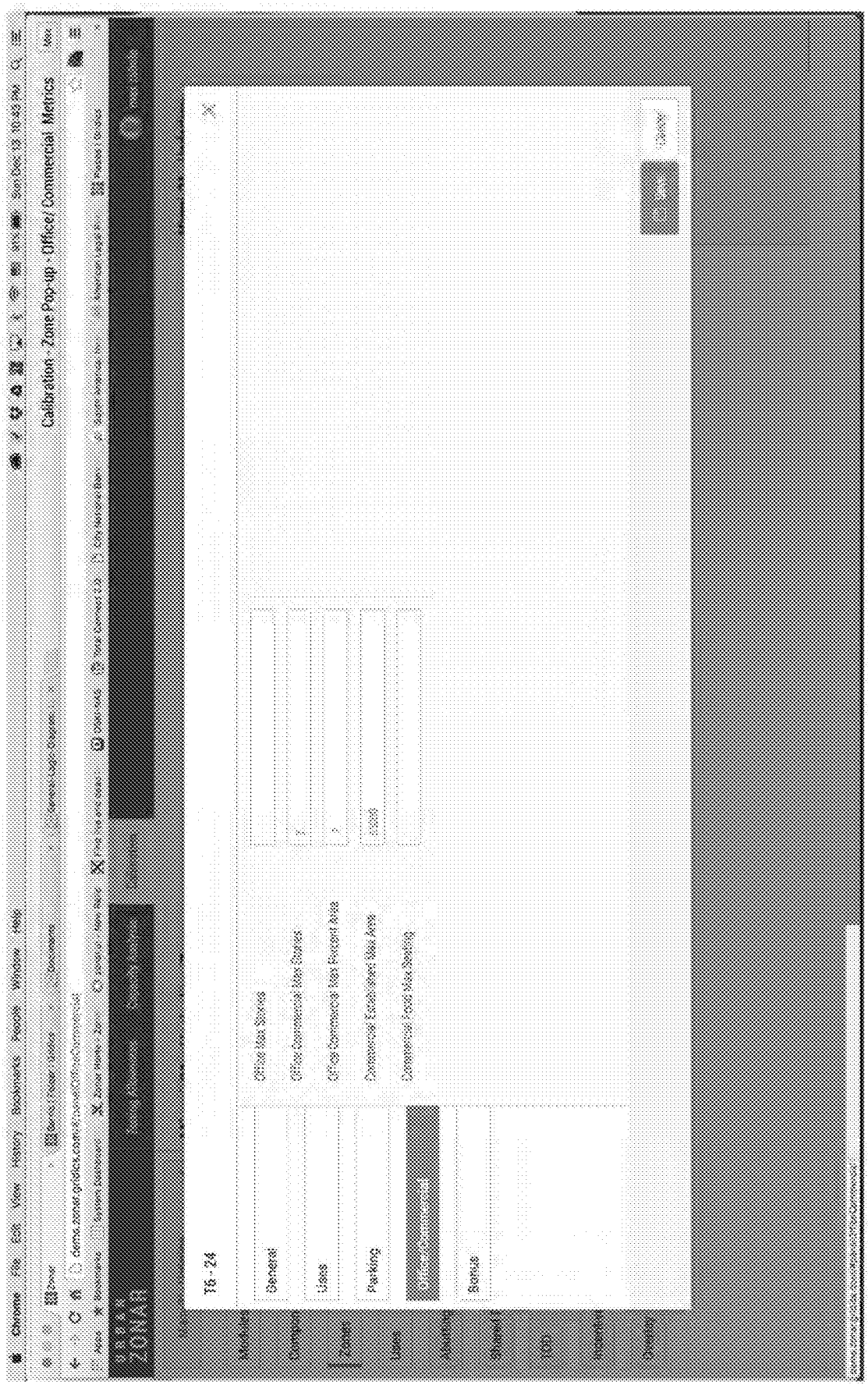
Figure 49:
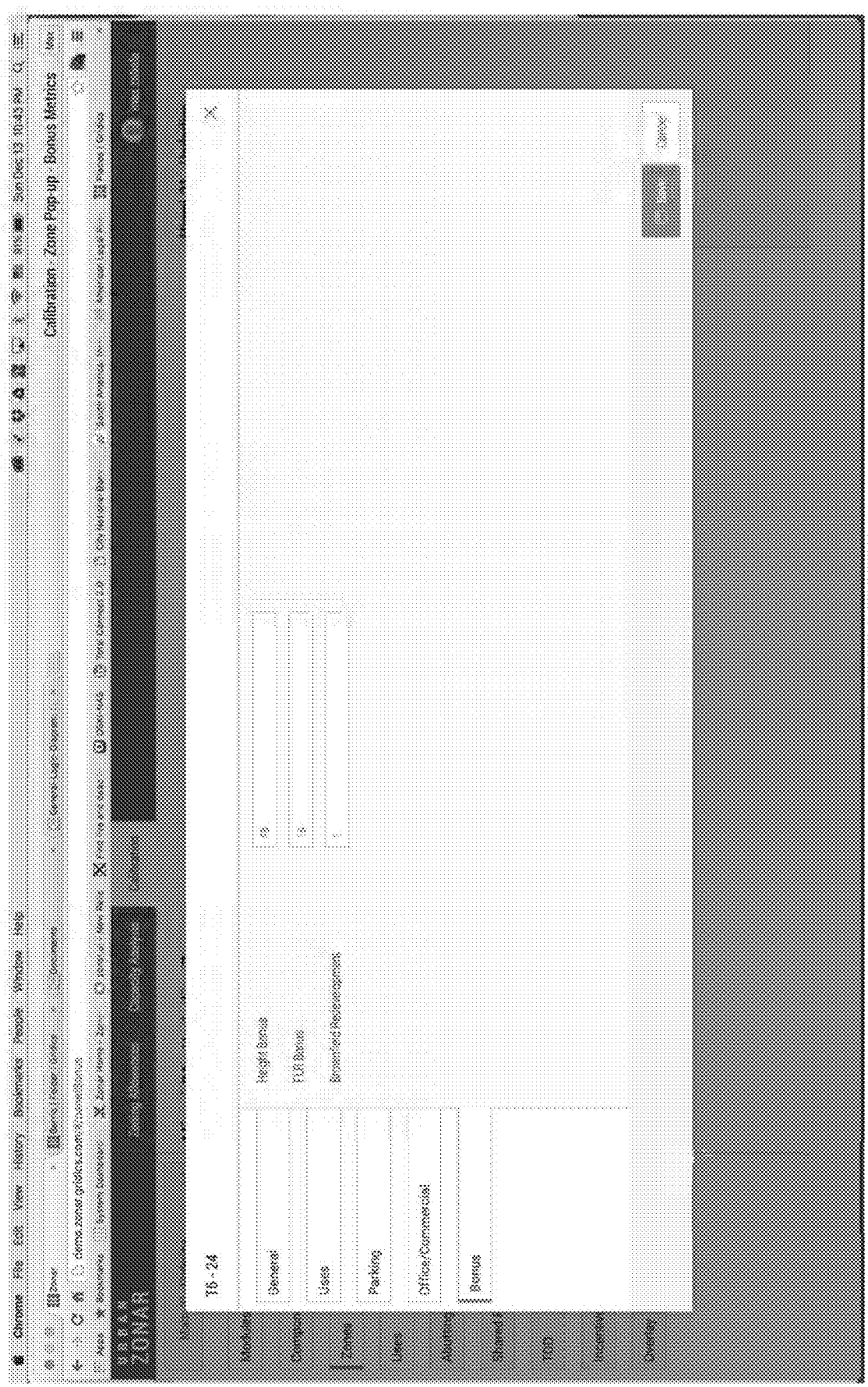
Figure 50:
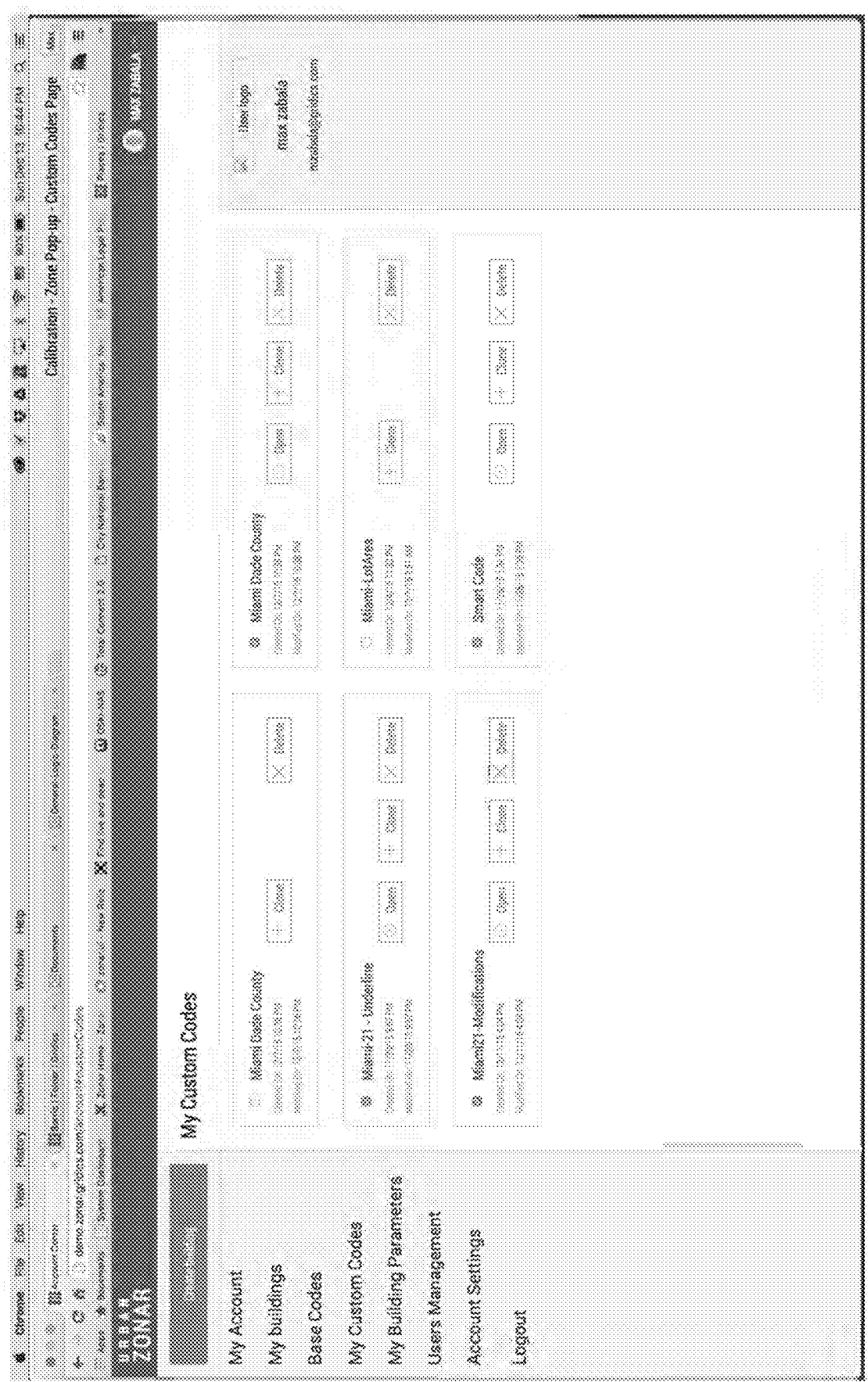
Figure 51:
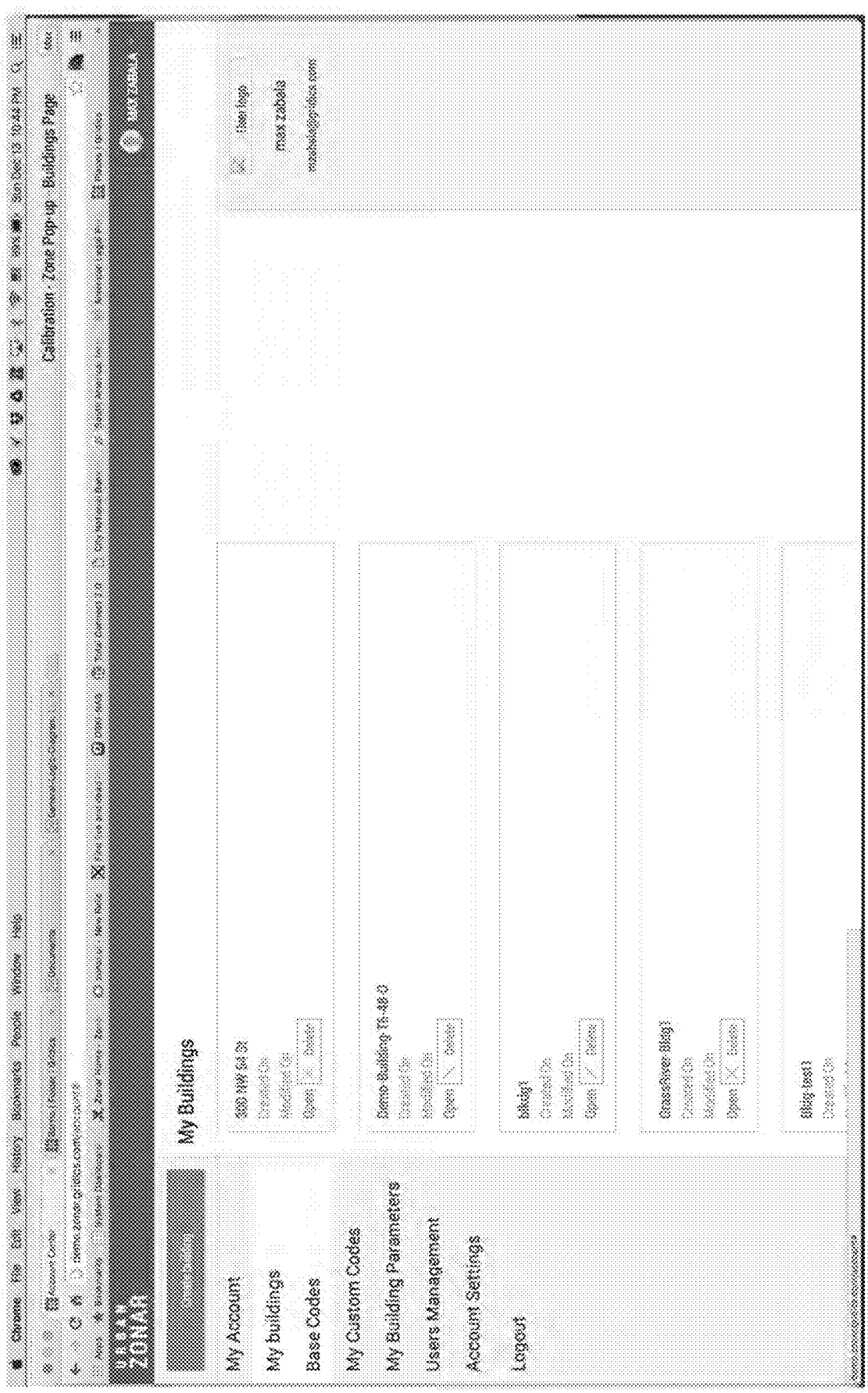

Note that, although the discussion herein relates to a specific site, the system 10 can be used to calculate multiple properties/parcels as a single development, also known as a land assemblage, if desired. Alternatively, the system 10 can be used to calculate multiple properties as multiple developments in order to calculate development capacity in larger areas, neighborhoods, or districts. Additionally, custom software modules (illustrated in FIG. 41, for example) interfacing with computer program 16 can provide unlimited customization for the system 10. For example, the system 10, and in particular the computer program 16, can be customized for different cities of for hypothetical cities with minimum intervention to the main computer program 16. Further, the system 10 can allow for multiple application solutions for specific users. For example, a custom App can be provided for real-estate professionals, or for a particular city, or for architects, etc.

Figure 39:
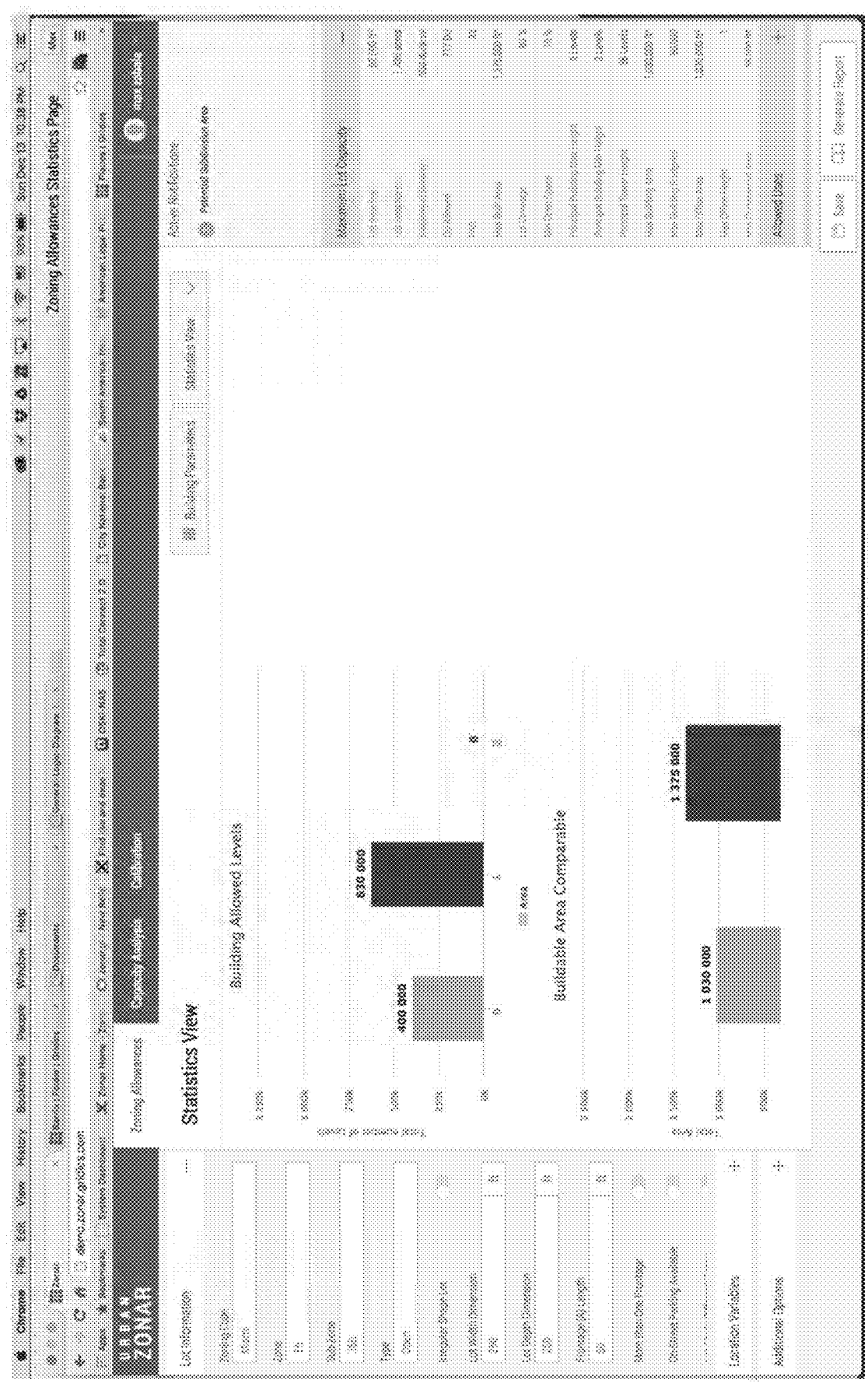
FIGS. 39-51 illustrate further screen shots exemplary input interfaces useful with a system in accordance with another embodiment of the invention.
Figure 40:
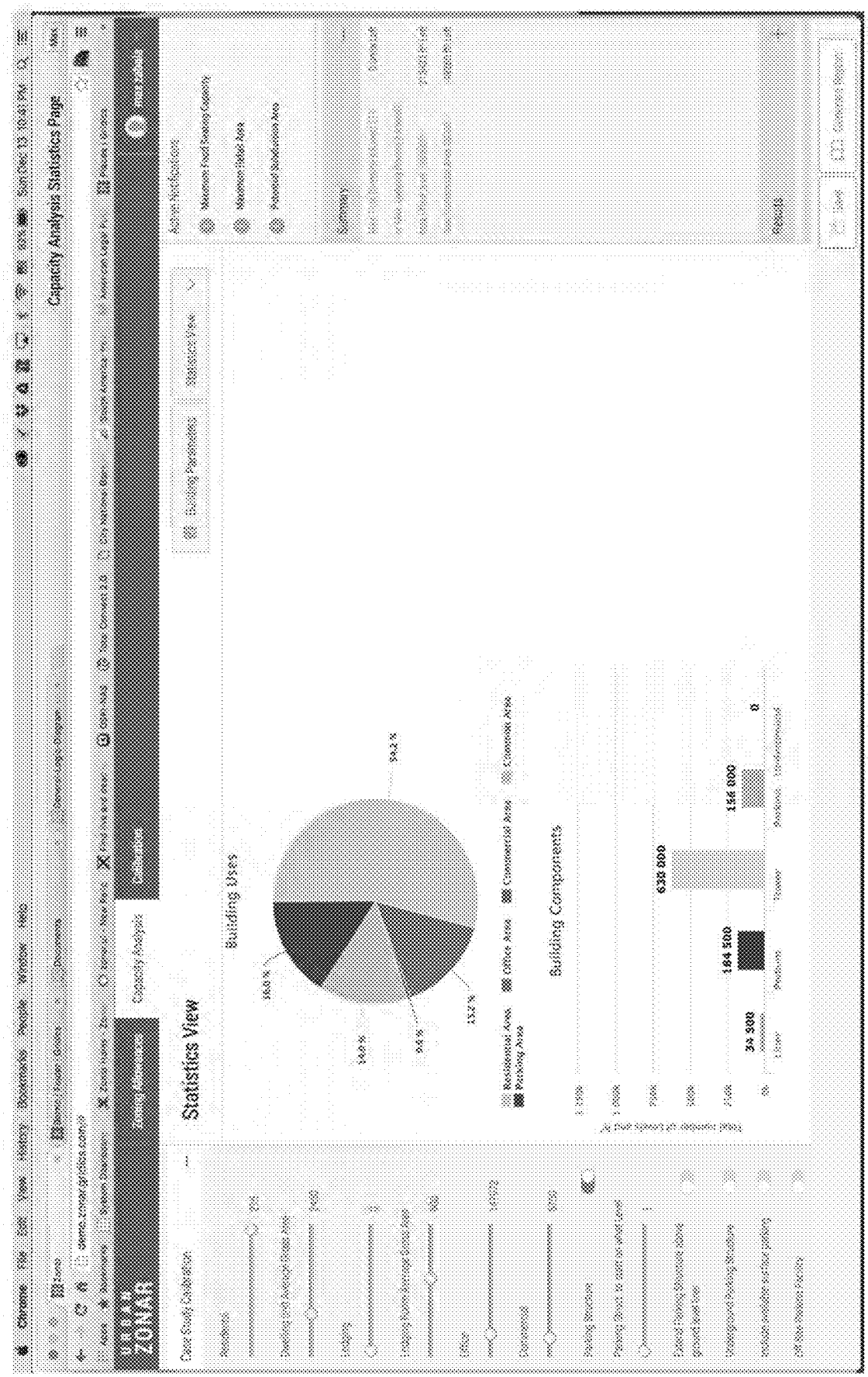

Additionally, it should be noted that the system 10 can be configured to generate additional data and reports, including statistical bar graphs, pie charts and reports, and to allow further calibrations to be made to a zoning code or regulations, based on the user inputs made to the input interfaces of FIGS. 25-28. Further screen shots illustrating further exemplary input interfaces (GUIs) for a system 10 in accordance with another embodiment of the invention are illustrated in FIGS. 38-50. For example, FIG. 38 illustrates a statistics view, instead of the 3D building view, generated from the zoning allowances for a particularly described site under a specific zoning code (i.e., Miami Zone T6, Sub-zone 36B). FIG. 39 illustrates one exemplary statistics view for the actual building capacity for a particular site. FIGS. 40-50 illustrate further input interfaces that allow user inputs to change, in real time, the calibration of a zoning code or a zoning code overlay to alter preset values to investigate changes to the site density capacity based on future or possible changes to the zoning regulations.

In one particular embodiment of the invention, among other functions, the computer program 16 is configured to perform three main functions: 1) Zoning Allowances; 2) Capacity Analysis; and 3) Calibration.

The Allowances segment of the system shows a user what the zoning code says they can build, as limited by the law.

The Capacity segment of the system is used to virtually build the actual building by optimizing user or based on user input. In one particular embodiment of the invention, the calculations for building the virtual build are done for each building floor independently (i.e., ground floor, $2^{nd}$ floor, $3^{rd}$ floor, etc.), thus allowing for maximum flexibility and accuracy. Setbacks, lot coverage, maximum footprint area, or other parameters, may be different on each level of a development. The system 10 calculates each level independently with those parameters specific to that level, if different from the level below. In one embodiment (illustrated, for example, in FIGS. 32, 36 and 38), the Capacity segment is configured to permit the user to control (usually via a GUI) multiple features of the build that may change the overall capacity of a development, including but not limited to, for example:

Number of towers (reduction from maximum permitted);
Modification of tower and base footprints;
Choice of a variety of parking layouts, above and below ground;
Modify common areas % increase for all uses of a development;
Modify tower and liner dimensions, such as maximum depth, maximum length, minimum length;
Amount of off-site parking for calculation;
Additional parking capacity to be provided on-site;
Control type of parking structure;
Control type of street parking provided; and
Select from available incentive options.

FIGS. 32-38 illustrate exemplary input interfaces or GUIs that can be provided to permit selections for the foregoing options, among others, to be made from various input screens of one particular embodiment of the present invention.

The Calibration segment allows users to clone (i.e., copy the zoning regulations of another municipality) and modify existing zoning code to test new regulations, rules or parameters that can affect the use of the specific site. In other words, the system 10 will allow a user to design and test new zoning codes—i.e., to instantly see the effects on buildings or neighborhoods due to changes in zoning code parameters or regulations. Users calibrate the system, using for example, the output interfaces illustrated in FIGS. 41-49, to instantly modify setbacks, parking requirements, lot coverage, building capacity, transit oriented development, ecofriendly regulations, and other zoning parameters, and immediately see the effects and demand needs. Zoning code can be cloned and changed in order to see the before and after effects of potential zoning modifications. Calibration can be used to show changes in the output interfaces (reports) based on potential zoning modifications. Some of the values users can immediately see as a result of a calibration, based on potential zoning changes, include, but are not limited to:

Changes in taxable value;
Value of developable land in current market rates for that geospatial point;
Changes in infrastructure demands, such as electricity, water, sewer, roads;
Potential residential and daytime populations;
Changes in parking; and
Non-compliancy of lots or lots having limited development potential.

Figure 30:
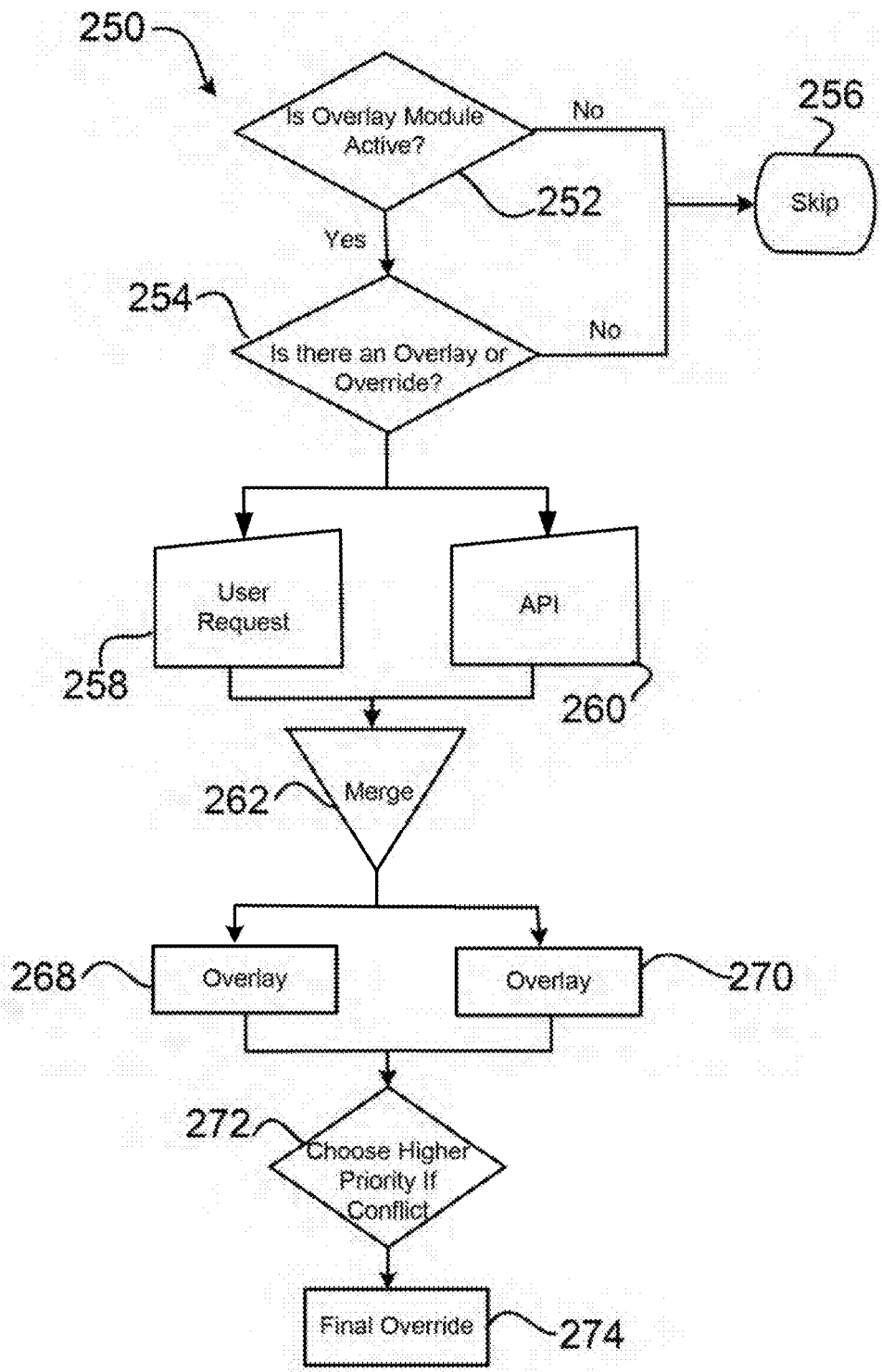
FIG. 30 is a simplified logic diagram for explaining how multiple zoning overlays can be used in connection with one particular embodiment of the invention.

Additionally, the Calibration segment can be used to calibrate areas in which multiple zoning codes apply (i.e., general and specific zoning codes). Referring now to FIGS. 1 and 30, there is shown a simplified logic diagram 250 useful in explaining how multiple zoning overlays work simultaneously, thus overriding the base zoning regulations, in accordance with one particular embodiment of the invention. More particularly, the system 10 of one embodiment of the invention is configured by software 16 to permit displays of areas in which the zoning codes have general regulations calibration, and also specific overlays that might override all or portions of those general regulations. For example, an historic district might have a different permissible density or maximum height allowance under the zoning code than is allowed by the general zoning code for that area. As such, it would be helpful to have multiple zoning overlays (i.e., the general zoning overlay and the specific historic district overlay for the area) work simultaneously. In one embodiment of the invention, the software 16 of the system first determines if an overlay module is active. Step 252. If so, the system 10 determines if there is a specific overlay for the general zoning code in the area of interest or another type of override to the general zoning code applicable to the area. Step 254. If the overlay module is not running, or if there is no overlay or override for the area of interest, the rest of the method 250 is skipped. Step 256. If an overlay or override is present, then information from the user request 258 and/or obtained by an API 260 executing in the system 10 is merged (Step 262) and an overlay 268 is, or overlays 270 are, generated for the zoning code. In the event that a conflict occurs between the overlays to the applicable zoning code, the method 250 of the present embodiment selects the overlay having the higher priority, and the final override to the applicable zoning code is applied. Steps 272 and 274. Thus, the system of the present embodiments permits specific zoning regulations for an area of interested to overlay general zoning regulations in that area, and can be used to generate displays and user reports accordingly.

With regard to the Allowances and Capacity segments discussed above—one very common issue is the inherent differences between the Zoning Allowances and the Actual Capacity of a specific site or lot, assemblage of lots or geographical area (i.e., a specific area of interest). In most instances, the actual capacity permitted by the combination of all regulations and limitations in zoning codes is significantly different from the general zoning allowances. Zoning may dictate certain limitations that are commonly used as the basis to determine allowances. However, the actual capacity is determined by multiple other limitations that affect the final results (setback, parking requirements, density, etc.). This is illustrated, more particularly, in a comparison of FIGS. 31A-31C.

In fact, actual development capacity entails volumetric analysis of zoning regulations in combination with real world limitations that may not be reflected in the zoning codes. This includes, but is not limited to, parking, access and circulation, volumetric requirements, environmental constraints (such as FAA height restrictions, flood levels, etc.), access to transportation, legal easements, historical designations and other factors. The system 10 considers all limitations applicable to the specific site and/or assemblages, and provides both results, the Zoning Allowances and the Actual Capacity, to the user.

In one particular embodiment of the invention, the system 10 virtually builds a building on a specific site to calculate actual capacity, calculating the size of each parking space, parking type (parallel, straight in, etc.) ramps, circulation, including elevator cores, parking, etc. In planning for a building on a particular site, the system 10 is configured to calculate its values on a floor by floor basis to give accurate level by level results and to allow for variations from level to level. The system is additionally configured to receive and work with GIS data and/or GIS shapes imported from a remote source, or dimensions can be manually input, as desired.

The system provides the user with screens, displays and/or reports (hereafter, "output interfaces") via one or more of a display device, screen, API, printer or the like. For example, in connection with the Allowances segment of the system, the zoning limitations are analyzed in connection with the site specific data to inform the user what is allowed to be built on the site, according to the code and site specific limitations. The Allowances Results (provided via an output interface) can include, but are not limited to, one or more of:

Allowable heights, allowable floors, developable rights;
Maximum developable area size by use; Maximum number of residential/lodging units;
Maximum developable area size of Commercial or Office uses;
Parking requirements by building use and/or type;
Allowable uses;
Floor area/land ratio, setbacks;
Potential sub-divisions;
Required pedestrian or vehicular passages; and
Available bonuses and/or incentives.

Similarly, after the system 10 builds the virtual building in connection with the Capacity segment, the user is provided with Capacity Results informing the user (via an output interface 20, 22 or 24) of one or more of:

Total area by building component/type;
Total common space (corridors, elevators, stairs, common spaces, structure, etc.);
Total sellable area by use/type;
Total parking available by type or location; and
Offsite parking/shared parking.

Additionally, the output interfaces 20, 22, 24 can include reports on other elements generated by the system according to specific site information and zoning codes, such as, for example, Value Results, Infrastructure Demands and Display of Information. For example, a Value Results report provided via one of output interfaces 20, 22, 24 can include, but is not limited to, reporting:

Taxable value by geospatial location and use;
Tax amount by geospatial location and use;
approximate total sellable value by use based on current market rates; and
Approximate construction costs by building component.

An output interface including Infrastructure Demands can report, among other things, the actual impacts under the zoning code for:

Power;
Water;
Sewer;
Trash;
Vehicular trip;
Multimodal parking;
Public transit; and
Office workers/residential population.

Output interfaces or displays 20, 22 and 24 can additionally display other types of information, including graphical information. This Display of Information can include, but is not limited to, one or more of:

Site plan;
Individual level-by-level plan;

Multiple building elevations;
Multiple Sections;
Isometric 3D views;
Sectional 3D views;
Allowable building envelope vs. actual building floor plates;
Pannable and zoomable 3D on maps;
Statistics charts
Demographic Statistics; and
Building metrics.

Figure 31C:
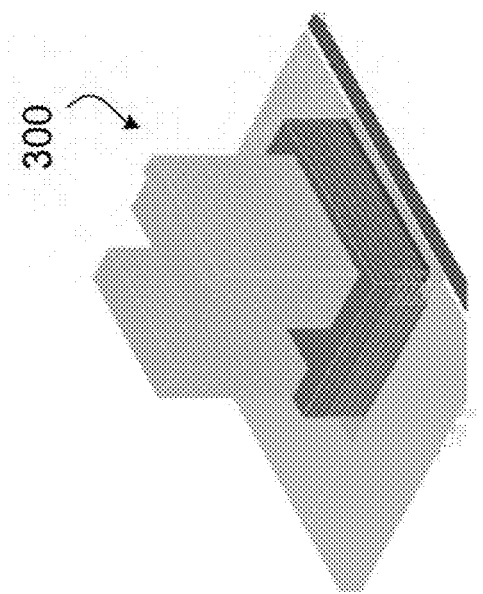
FIGS. 31A-31C, there is show different 3D building views generated by the system according to one embodiment of the invention and provided to the user via an output interface.
Figure 31B:
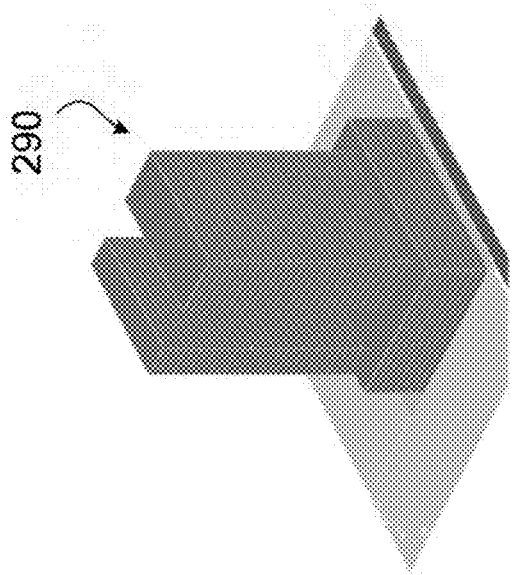
Figure 31A:
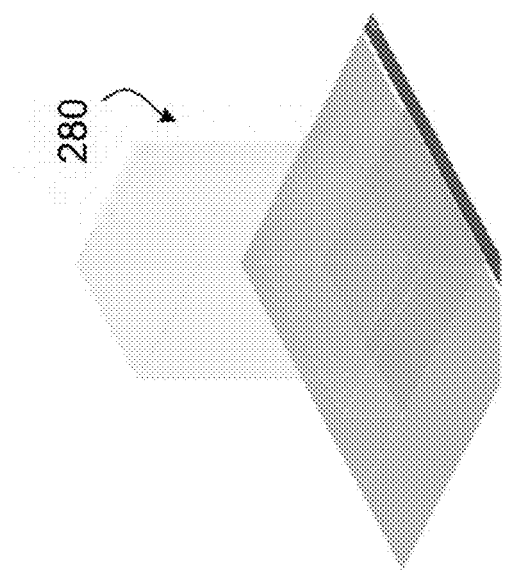

For example, referring now to FIGS. 31A-31C, there is shown different 3D building views generated by the system 10 and provided to the user via an output interface. More particularly, FIG. 31A illustrates a 3D building 280 generated for a particular site of interest, based only on setback limitations applicable to that site. FIG. 31B illustrates a 3D building 290 that would be allowable for the same site if only the allowances permitted by the zoning code were considered. FIG. 31C illustrates a 3D building 300 generated showing the actual capacity that can be built on the same site, taking into account all limitations that affect the final capacity allowances (setback, parking requirements, density, lot shape, FAA regulations, etc.) for that particular site. As can be seen, a building 290 may comply with the zoning code for a particular location, but may not actually be buildable for that location. The present invention permits a real-estate professional to see the actual capacity of a building 300 that can be built on a site, taking into account all factors, and not merely a compliance with the zoning code. As such, the system 10 of the present invention goes beyond what is provided by systems that determine zoning compliance, by showing the user the actual potential for a site.

Figure 22:
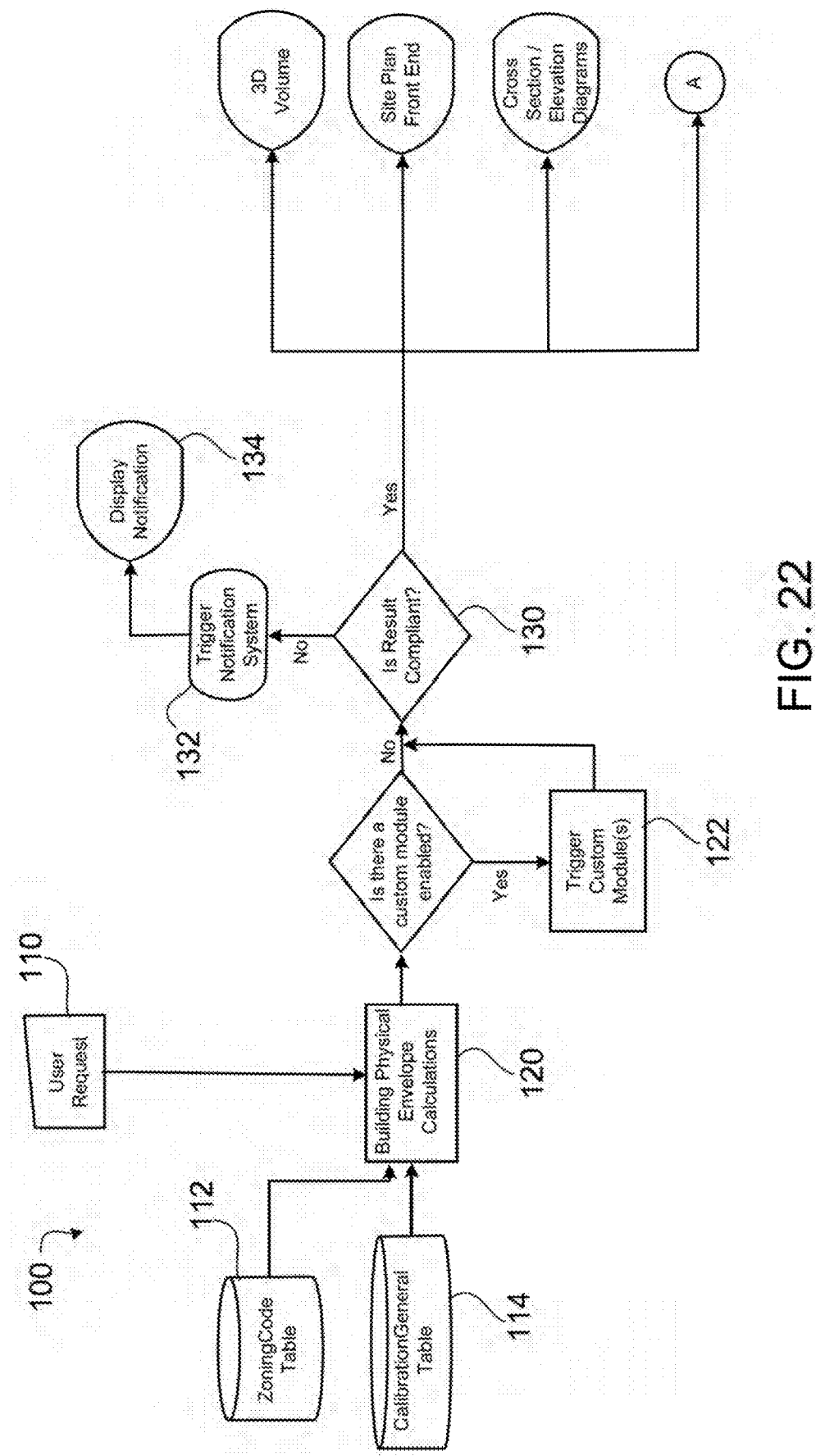
FIGS. 22-24 show a general logic diagram for a method in accordance with one particular embodiment of the invention.
Figure 23:
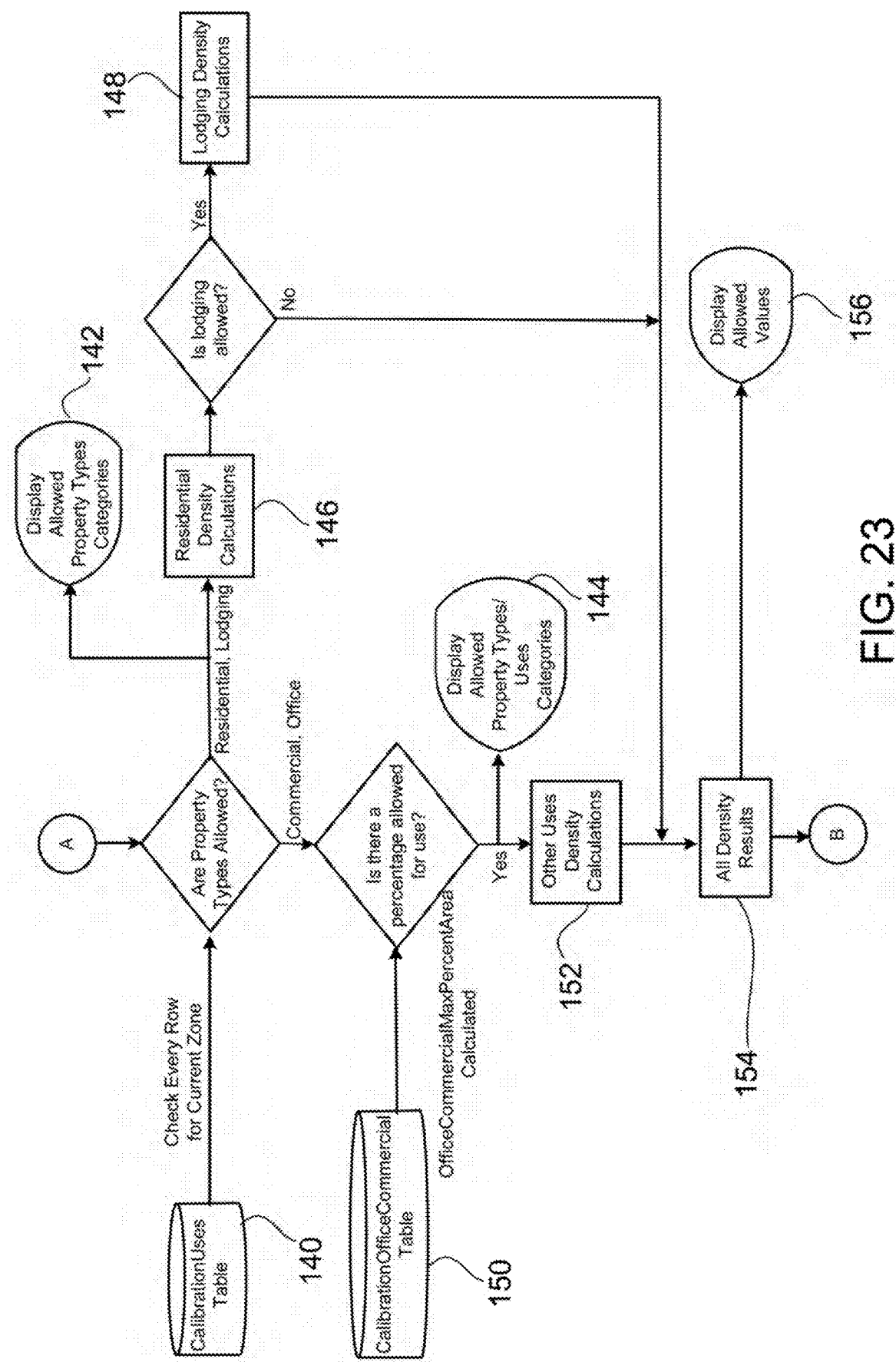
Figure 24:
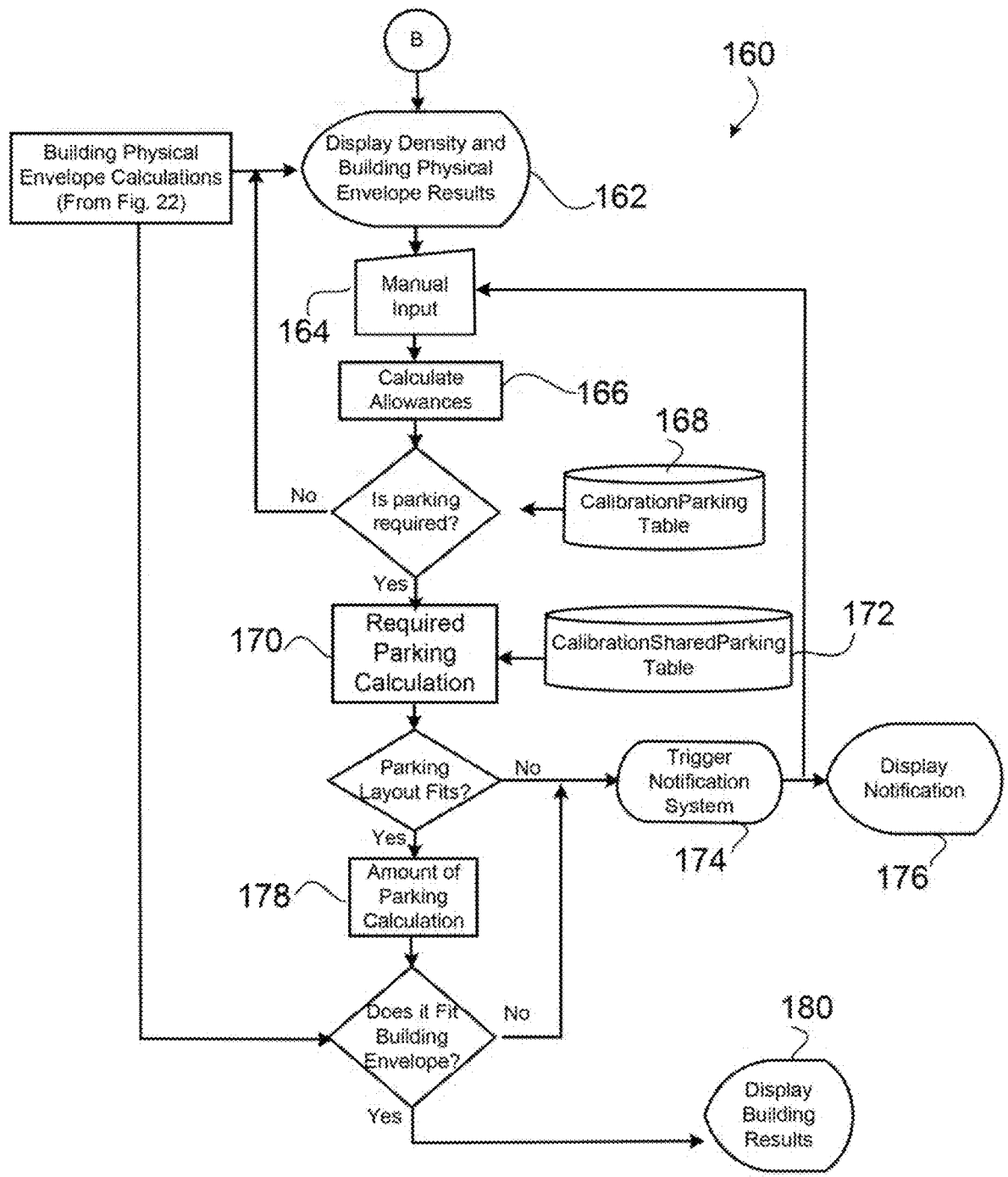

FIGS. 22-24 show a general logic diagram for a method of calculating actual capacity or density and potential for a specific area in accordance with one particular embodiment of the invention. The method is implemented on a computer of system 10 which is particularly configured by software (i.e., computer program or programs 16) to execute the method.

Referring now to FIGS. 1 and 22, there will be described on exemplary method 100 for determining an envelope for a building to be built on a particular site, in accordance with one particular embodiment of the present invention. The method is initiated by a user request made on an input device of the system 10. For example, a request 110 can be made using a keyboard of a laptop or tablet, a touchscreen of a mobile device or via another electronic device interface. The request may be received in an input interface of the system 10, which may be a graphical user interface (GUI), a computer or Internet form, virtual radio buttons, etc. In one particular embodiment of the invention, the user initiates a request via an API running on the user's local computing device (i.e., laptop, tablet, smartphone, etc.). Once the request is made, the system 10 obtains GIS data electronically (wirelessly, or via a wired connection, as desired) for a specific site indicated in the input interface or by GPS and uses that information to designate a zoning code applicable to the particular site, and to obtain data relating to the particular site (i.e., setbacks, frontages, etc.). Alternately, or in addition to GIS data or other electronic data imported to the interface from a remote site, the user can manually enter data relating to the specific site using the input interface.

In order to determine the development potential and zoning compliance of a particular site, the system 10 utilizes the data for a particular site obtained from public data, geographical services and manual inputs, to determine zoning limitations and uses that fit within those zoning limitations for a particular site. The information is used to generate a physical building envelope for a building or buildings that is allowable, according to the zoning codes, for a site or sites (i.e., an area of interest). The system 10 accesses the applicable zoning code data 112 for the site and any calibration data 114 indicated by the user via the calibration input interfaces of the system 10 to perform calculations necessary to generate the building physical envelope. These calculations take into account, but are not limited to, such factors as lot size, shape, frontages, setbacks, abutments number of levels permitted, whether a tower is permitted and, if so, the height and levels for such a tower, whether there are bonuses available (i.e., brownfield bonus, height bonus, etc.), building and/or tower footprint, building capacity, etc. If a custom software module is provided, that module is triggered 122 in order to adapt the calculations to the customized options (i.e., different cities, different users, etc.). The resulting calculations are then checked against the zoning code limitations for the site and/or the calibrated limitations to see if the result is compliant 130. If not, a notification system is triggered 132, and an output interface displaying a notification of non-compliancy 134 is provided to the user informing the user that the building envelope is not compliant with the zoning limitations. If the result is compliant, output interfaces are provided to the user including, but not limited to, displays of the 3D volume of the building envelope (see, for example, 200 of FIG. 25B), the site plan front end and cross section/elevation diagrams. The system 10 then proceeds to calculate the building density according to the zoning code limitations (See, FIG. 23).

The building envelope calculations from FIG. 22 are used to calculate the building density, as shown more particularly in FIG. 23. More particularly, in order to determine density or capacity, the system 10 checks the applicable data 140 to determine and display the property types allowed for the site 142, 144. If residential use and/or lodging are allowed, the residential density allowed under the code is calculated 146. If lodging is allowed, the lodging density is additionally calculated 148.

If the site is zoned for commercial or office use, the site and zoning data 150 is checked to see if there is a percentage allowed for this use. If so, the system calculates the density for other uses 152. The density calculations 146, 148, 154 are combined to provide all density results 154, which are provided to the user via an output interface displaying allowed density values 156, or via another medium (such as a printout). The density results are additionally provided to a building analysis logic (See, FIG. 24).

Referring now to FIG. 24, there is illustrated one particular flow diagram of a method 160 for further analyzing (and displaying 162) the calculated density and physical envelope results based on the information provided by the user 164 when the request was made, or thereafter. More particularly, allowances are calculated 166 based on the zoning code, calibrations, density and physical envelope previously calculated. Additionally, in one embodiment, zoning and calibration information 168 is accessed to determine if parking space is required. If it is determined that parking is required, a parking layout is calculated 170 based on the parking data 172 for the site, including but not limited to, applicable zoning, available space, the type of spaces, the amount of shared parking, etc. The system then determines if the parking layout fits and, if not, triggers a notification system 174 to display a notification of the non-compliancy to the user 176. If the parking layout fits the site, the amount of parking is calculated 178. If the parking calculated is determined to fit the building envelope, the results are displayed to the user in an output interface 180. Otherwise, a notification is provided to the user 176 and the system reverts to manual inputs from the user 164 to adjust the relevant system parameters.

Figure 29G:
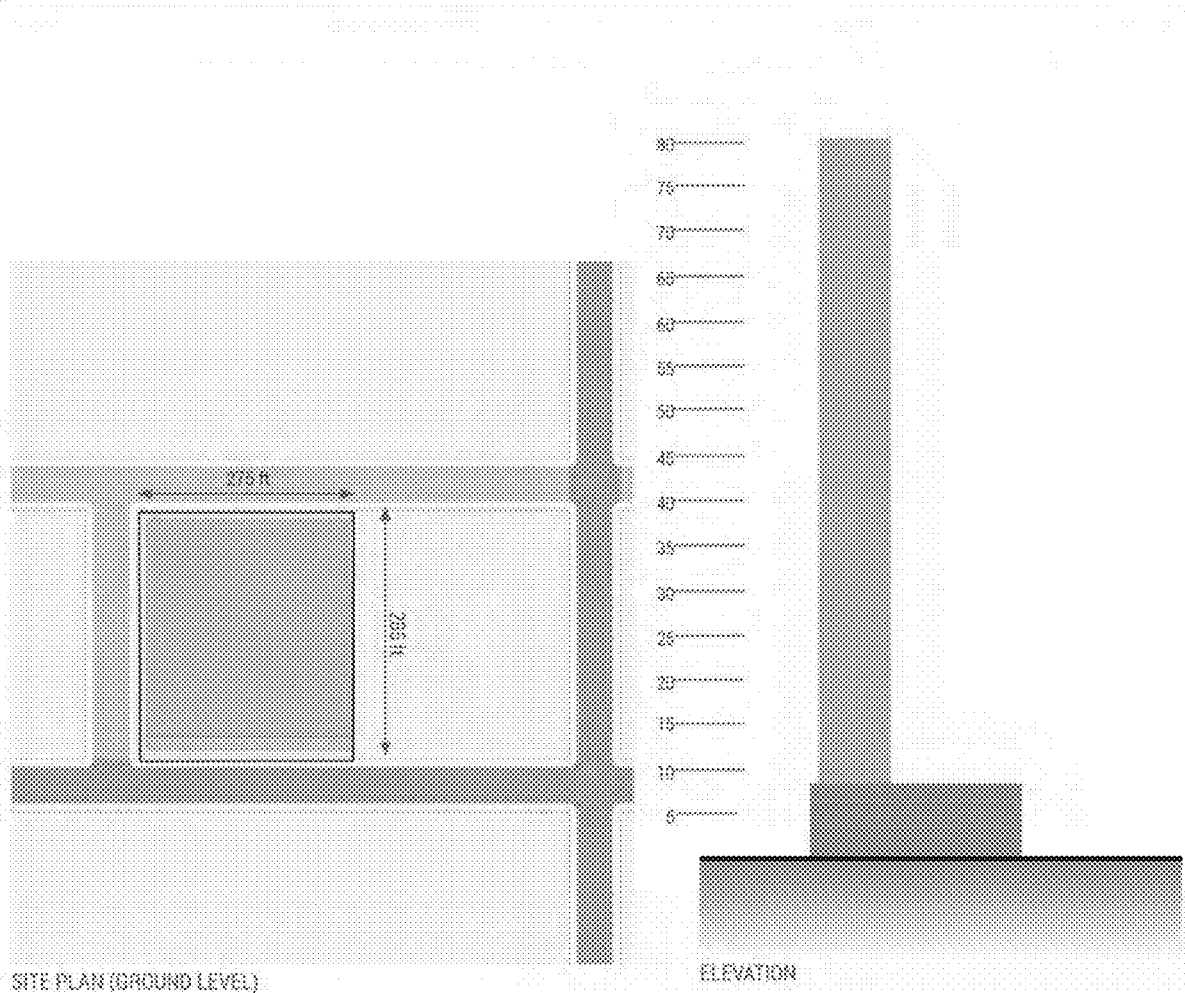

FIGS. 29A-29K illustrate one particular example of a report that can be provided to the user for determining the actual density capacity, and thus, the development potential, of a site or sites, based on the zoning codes and other factors affecting the site or sites. In one particular embodiment of the invention, the report is printed as a hardcopy, although digital copies may and are preferably also provided. As can be seen more particularly from FIGS. 29C-29K, the system 10 analyzes information of a particular site "Address" in the city of Miami, to determine the allowed uses under the applicable zoning code and to perform a maximum capacity analysis for the particular site. As shown in FIG. 29C, the report of the present preferred embodiment includes information about Address obtained from Google® Earth and/or geographic information systems (GIS) and/or another mapping service. As can be seen from FIG. 29D, in addition to the applicable zoning code (i.e., Miami 21 of May 2015), the system additionally considers other ordinances and/or environmental factors that affect the allowable density for the cite. In the example illustrate, the site Address is located a predetermined distance to the Metro rail and Metro Mover, and thus, the capacity is affected by municipal regulations for capacity near these conveyances, in addition to the applicable zoning code for the zone Miami21. Similarly, the property Address is within a CBD density increase "overlay" area (e.g., Parcel Zoning T6-80-O), which permits a much higher residential density than the originally allowed density in this zone. Thus, the CBD density increase regulations overlay (i.e., take precedence over) the general zoning code Miami21 for items governed by the overlay. FIG. 29E (page 3 of the present exemplary report) illustrates the allowed uses for the Address and the coding indicating from where the allowance arises.

Figure 29H:
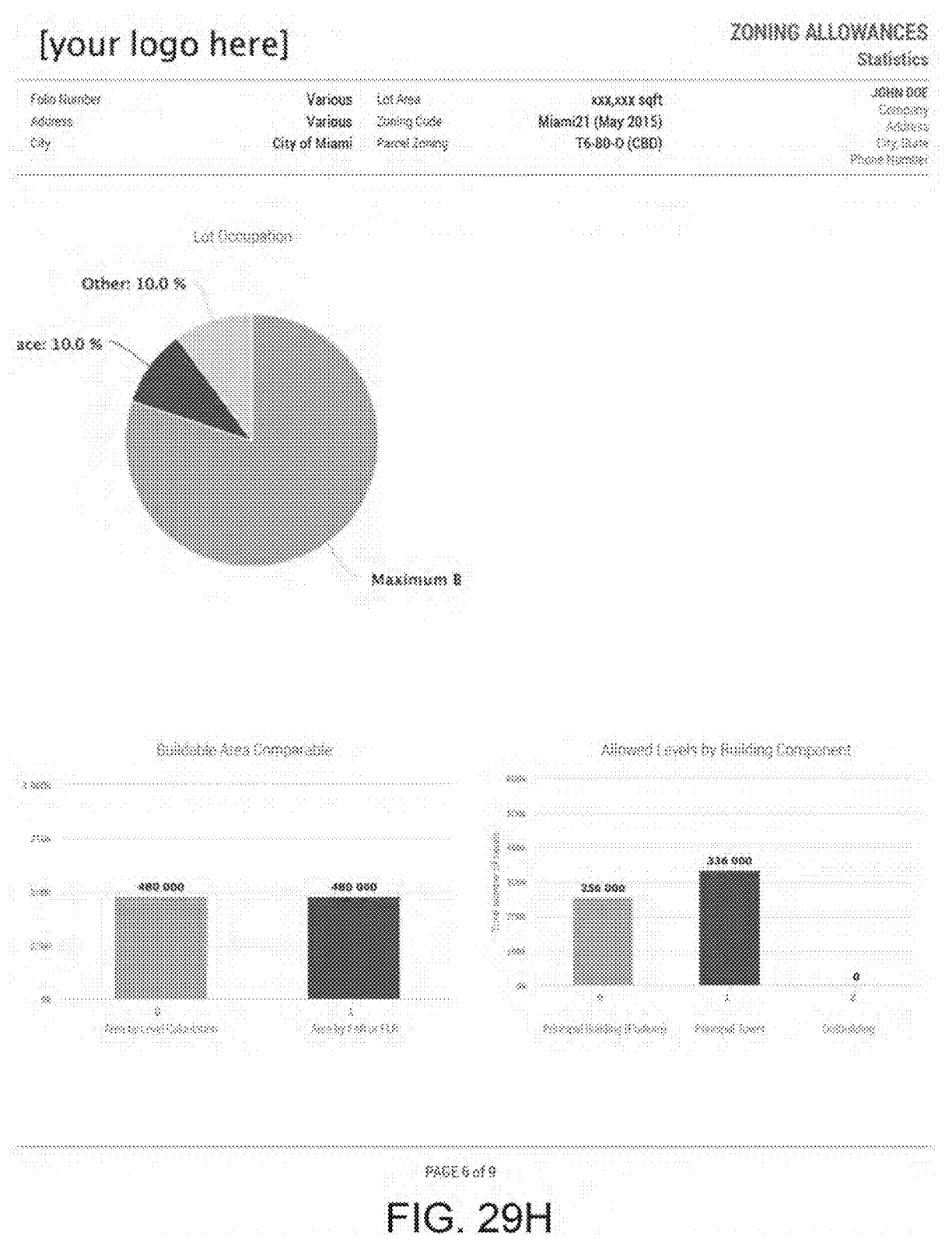

FIG. 29F (page 4 of the present exemplary report) illustrates the maximum lot capacity calculated by the system 10 of FIG. 1 for the Address, as allowed by the zoning regulations. As can be seen, the report can include, among other things, a 3D view of the building envelope generated by the method 100 of FIG. 22. In one particular embodiment, the 3D view 200 is color coded as to the permitted uses. In that embodiment, the analysis portion of the report can be correspondingly color coded, for ease of understanding. Other views, such as the site plan (ground level) and elevation may be included, as illustrated by FIG. 29G. Further, the information can be analyzed to produce other types of graphical display, as illustrated in FIG. 29H.

Figure 29J:
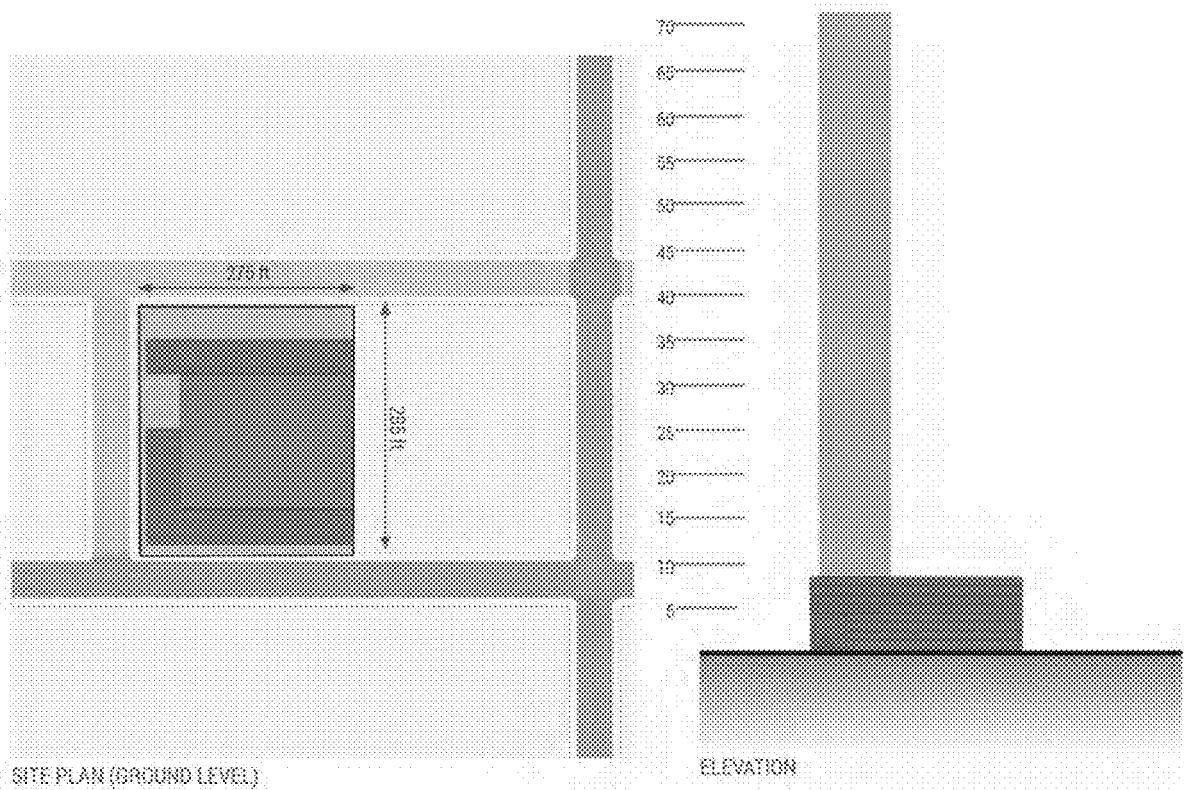

In accordance with the present invention, the system 10 of FIG. 1 additionally calculates the actual maximum capacity density that can be built for the Address, given both the zoning code and the other factors, the according to the above-described method of the invention. For example, FIGS. 29I-29K illustrate a capacity analysis representing one actual possible building use distribution available for the Address given the zoning code and the further regulations. Such a report illustrates the differences between the density capacity available under the zoning code, vs. the actual possible capacity available for the Address. For example, as illustrated by bar graph in FIG. 29K, although a total buildable area under the zoning code alone is 480,000, the actual resulting area possible for the building 210 illustrated in FIG. 29I, is 293,222—a number much less than the area allowed under the zoning code. Thus, the system 10 of FIG. 1 not only finds compliance with the zoning codes affecting the Address, but also goes further, calculating on a floor by floor basis the actual density capacity possible for a building 210 on the Address. Note that, the system 10 provides a simple input interface wherein the different factors (i.e., zoning, environmental, etc.) affecting the address can be easily tweaked to illustrate the effects that changes in zoning regulations or other factors can have on the actual total capacity available for the Address. For example, the system can be used to automatically calculate an actual area possible for the Address if a zoning variance were obtained for one or more variables under the zoning regulations affecting the Address. In particular, a real-estate professional can use the system 10 to see how a simple change in the calibration of the code (i.e., a change in allowable number of floors, for example) would change the actual density capacity for the building, in real time.

The system of the present invention provides a code interpretation and restrictions analysis to determine building massing from the allowances permitted by the zoning regulations and other limitations of external factors, and, using these allowances, calculates building density for the site. In one particular embodiment, the calculations are performed for each building story independently, to obtain the densities permitted for each site. The presently described system advantageously is very flexible. It can be calibrated to any type of zoning code (See, for example, FIGS. 10-14), anywhere in the world (Euclidian vs. form based) without the need for any backend work or reprogramming. It can operate in imperial and metric measurement scales. Additionally, if desired, the system can allow for multiple modifiers or custom modules that can be turned on or off for each zoning code. Additionally, if desired, the system 10 can import pre-drawn polygons or work with a computer aided drawing program, such as AutoCAD®, to import buildings or new or existing neighborhood plans that can then be modeled for capacity and allowable use in accordance with the zoning limitations for the site or sites. It should be understood that the system 10 of the present invention is configured to work with an unlimited number of zones, sub-zones, types and other zoning code regulations and for as few as one lot, assemblage of lots or geographical area (see, for example, 122 of FIG. 22).

The examples and implementations shown herein are in no way to be construed as limiting the inventive concepts included herein.

Thus, computer-implemented methods and systems for determining zoning code compliance are disclosed. While embodiments of this invention have been shown and described, it will be apparent to those skilled in the art that many more modifications are possible without departing from the inventive concepts herein. The invention, therefore, is not to be restricted except in the spirit of the following claims.

I claim:

1. A flexible and customizable system for determining an actual maximum density capacity and a development potential available for a geographic area of interest, which geographic area of interest may be a lot, an assemblage of lots or another site or area, the system, comprising:
    at least one input interface for receiving information about the geographic area of interest;
    wherein the at least one input interface receiving the information about the geographic area of interest includes a graphical user interface (GUI) operable to receive information corresponding to the geographic area of interest;

wherein the at least one input interface receiving the information about the geographic area of interest is operable to electronically import the information from a geographical information system (GIS) accessed by a device, under the direction of at least one computer program, to look at conditions for the geographic area of interest, wherein the device is operable to determine a geolocation of the device, and wherein the information electronically imported is based on the geolocation of the device;

wherein the device is configured by software stored in a non-transitory memory device, and wherein the software is executed by a processor;

wherein the device is operable to generate, using information received via the at least one input interface, at least one building envelope for the geographic area of interest, wherein the at least one building envelope is allowable under all regulations of the zoning code applicable to the geographic area of interest;

the device additionally configured to generate an actual maximum density capacity available for the geographic area of interest based on the zoning code, the building envelope generated, and on additional factors affecting the geographic area of interest;

at least one output interface in communication with the device, wherein the at least one output interface is operable to provide a user with information of the actual maximum density capacity available for the geographic area of interest and at least one 3D view of a building generated in real-time based on the generated actual maximum density capacity available for the geographic area of interest;

wherein the at least one output interface is configured to provide a user with at least one cross section or at least one elevation diagram and at least one site plan based on the information of the actual maximum density capacity available for the geographic area of interest;

wherein the at least one input interface is configured to allow a user to change the zoning code;

wherein the at least one input interface includes sliders; wherein the sliders are configured to enable users to adjust the parameters for the building envelope, and wherein movement of a slider in one direction increases a value of a parameter and movement of the slider in an opposite direction decreases the value of the parameter;

wherein the at least one 3D view of the building is updated in real-time based on the changes in the zoning code and the building envelope;

wherein the at least one output interface includes at least one visual representation of allowable types of building dispositions, an aerial view of the geographic area of interest including a digital translucent overlay of the geographic area of interest on an aerial photograph of the geographic area of interest, a zoning view of the geographic area of interest including a digital translucent overlay of the geographic area of interest on a zoning map; and a GIS view of the geographic area of interest including a digital translucent overlay of the geographic area of interest created from the information from the geographical information system;

wherein the at least one output interface is configured to color code the at least one 3D view of the building based permitted uses; and wherein the at least one 3D view of the building includes a first 3D building view constructed based on setback limitations for the geographic area of interest, a second 3D building view constructed based on a zoning code for the geographic area of interest, a third 3D building view constructed based on the setback limitations, parking requirements, density, and a lot shape for the geographic area of interest.

2. The system of claim 1, wherein the at least one input interface receiving the information about the geographic area of interest also electronically imports the information from an online mapping service.

3. The system of claim 1, wherein the additional factors include zoning calibration information entered into the system via an input interface.

4. The system of claim 1, wherein the additional factors include environmental factors or regulations affecting the geographic area of interest other than the zoning code.

5. The system of claim 1, wherein the actual maximum density capacity and development potential available for the geographic area of interest is calculated on a floor by floor basis; wherein the additional factors include on-site parking, off-site parking, type of parking structure, number of towers, and common area percentage.

6. The system of claim 1, further including a calibration module including an input interface permitting alteration of the zoning code by allowing changes to be made to preset zoning code values or the calibration of a new zoning code.

7. The system of claim 1, wherein said device is additionally configured by software to determine and apply an overlay to the zoning code in accordance with an overlay request or a request to override a portion of the zoning code, the applicability of each overlay being determined by the system depending on information added via an input interface for each overlay.

8. The system of claim 1, wherein the processor is additionally configured to virtually build a building according to the actual maximum density capacity and development potential calculated and provide the virtually built building to an output interface of the system.

9. A computer-implemented method for determining, based on user inputs and/or selections, an actual maximum density capacity and development potential available for a geographic area of interest, the method comprising the steps of:

receiving information about the geographic area of interest through at least one input interface;

importing corresponding information from a geographical information system (GIS);

calculating, with a processor configured by software, an actual maximum density capacity and development potential available for the geographic area of interest based on all the regulations of the zoning code, the corresponding information, and additional factors applicable to the geographic area;

outputting to a user, at least the actual maximum density capacity and development potential available for the geographic area of interest and at least one 3D view of a building generated based on the calculated actual maximum density capacity available for the geographic area of interest;

displaying at least one cross section or at least one elevation diagram and at least one site plan based on the information about the actual maximum density capacity available for the geographic area of interest on at least one output interface;

adjusting the zoning code on the at least one input interface;

adjusting the parameters for the building envelope via sliders on the at least one input interface;

updating the at least one 3D view of the building in real-time based on the changes to the zoning code and the building envelope;

displaying allowable types of building dispositions, an aerial view of the geographic area of interest including a digital translucent overlay of the geographic area of interest on an aerial photograph of the geographic area of interest, a zoning view of the geographic area of interest including a digital translucent overlay of the geographic area of interest on a zoning map; and a GIS view of the geographic area of interest including a digital translucent overlay of the geographic area of interest created from the information about the geographic area of interest and the corresponding information;

color coding the at least one 3D view of the building based on permitted uses; and displaying the at least one 3D view of the building includes a first 3D building view constructed based on setback limitations for the geographic area of interest, a second 3D building view constructed based on a zoning code for the geographic area of interest, a third 3D building view constructed based on the setback limitations, parking requirements, density, and a lot shape for the geographic area of interest.

10. The method of claim 9, wherein information describing at least one of the geographic area of interest, the zoning code and the additional factors can be changed by a user via an input interface.

11. The method of claim 9, wherein the additional factors include calibration information entered into an input interface.

12. The method of claim 9, wherein the additional factors include environmental factors or regulations affecting the geographic area of interest other than zoning code.

13. The method of claim 9, wherein the actual maximum density capacity and development potential available for the geographic area of interest is calculated on a floor by floor basis, based on user inputs and/or selections; wherein the additional factors include on-site parking, off-site parking, type of parking structure, number of towers, and common area percentage.

14. The method of claim 9, further including the step of entering calibration information, via an input interface, to change preset zoning code values of the zoning code or the calibration of a new zoning code used by the processor configured by software.

15. The method of claim 9, additionally comprising the steps of determining and applying an overlay to the zoning code in accordance with an overlay user request or a request to override a portion of the zoning code.

16. The method of claim 9, further comprising the step of virtually building a building according to the actual maximum density capacity and development potential calculated.

* * * * *